United States Patent
Edwin et al.

(10) Patent No.: US 12,124,040 B2
(45) Date of Patent: Oct. 22, 2024

(54) AUGMENTED REALITY DISPLAY COMPRISING EYEPIECE HAVING A TRANSPARENT EMISSIVE DISPLAY

(71) Applicant: Magic Leap, Inc., Plantation, FL (US)

(72) Inventors: Lionel Ernest Edwin, Hollywood, FL (US); Ivan Li Chuen Yeoh, Wesley Chapel, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/343,473

(22) Filed: Jun. 28, 2023

(65) Prior Publication Data

US 2023/0400693 A1 Dec. 14, 2023

Related U.S. Application Data

(63) Continuation of application No. 16/158,041, filed on Oct. 11, 2018, now Pat. No. 11,733,516.

(Continued)

(51) Int. Cl.
  *G02B 27/14* (2006.01)
  *G02B 27/01* (2006.01)
  (Continued)

(52) U.S. Cl.
  CPC ......... *G02B 27/0172* (2013.01); *G09G 3/003* (2013.01); *G02B 3/0006* (2013.01); *G02B 2027/0178* (2013.01); *G02B 2027/0185* (2013.01); *G06T 19/006* (2013.01); *G09G 3/3208* (2013.01); *G09G 2340/10* (2013.01); *G09G 2340/12* (2013.01)

(58) Field of Classification Search
  CPC .............. G02B 3/0006; G02B 27/0172; G02B 2027/0178; G02B 2027/0185; G06T 19/006; G09G 3/3208; G09G 3/003; G09G 2340/12; G09G 2340/10
  USPC .......................... 345/7–9, 633; 359/619, 630
  See application file for complete search history.

(56) References Cited

U.S. PATENT DOCUMENTS

| 6,850,221 B1 | 2/2005 | Tickle |
| 8,094,377 B2 | 1/2012 | Kessler et al. |

(Continued)

FOREIGN PATENT DOCUMENTS

| CN | 103605209 A | 2/2014 |
| CN | 105974589 | 9/2016 |

(Continued)

OTHER PUBLICATIONS

Office Action in Japanese Appln. No. 2023-019715, dated Feb. 16, 2024, 5 pages (with English translation).

(Continued)

*Primary Examiner* — Mahidere S Sahle
(74) *Attorney, Agent, or Firm* — Fish & Richardson P.C.

(57) ABSTRACT

An augmented reality head mounted display system an eyepiece having a transparent emissive display. The eyepiece and transparent emissive display are positioned in an optical path of a user's eye in order to transmit light into the user's eye to form images. Due to the transparent nature of the display, the user can see an outside environment through the transparent emissive display. The transmissive emissive display comprising a plurality of emitters configured to emit light into the eye of the user.

27 Claims, 37 Drawing Sheets

Related U.S. Application Data

(60) Provisional application No. 62/571,203, filed on Oct. 11, 2017.

(51) Int. Cl.
*G09G 3/00* (2006.01)
*G02B 3/00* (2006.01)
*G06T 19/00* (2011.01)
*G09G 3/3208* (2016.01)

(56) References Cited

U.S. PATENT DOCUMENTS

| | | |
|---|---|---|
| 9,081,426 B2 | 7/2015 | Armstrong |
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,055,887 B1 | 8/2018 | Gil et al. |
| 10,670,808 B1 | 6/2020 | Trail |
| 2006/0028436 A1 | 2/2006 | Armstrong |
| 2007/0081123 A1 | 4/2007 | Lewis |
| 2011/0188120 A1 | 8/2011 | Tabirian et al. |
| 2012/0127062 A1 | 5/2012 | Bar-Zeev et al. |
| 2012/0162549 A1 | 6/2012 | Gao et al. |
| 2012/0235886 A1 | 9/2012 | Border et al. |
| 2013/0021226 A1 | 1/2013 | Bell |
| 2013/0082922 A1 | 4/2013 | Miller |
| 2013/0114043 A1 | 5/2013 | Balan et al. |
| 2013/0117377 A1 | 5/2013 | Miller |
| 2013/0125027 A1 | 5/2013 | Abovitz |
| 2013/0141434 A1 | 6/2013 | Sugden et al. |
| 2013/0208234 A1 | 8/2013 | Lewis |
| 2013/0242262 A1 | 9/2013 | Lewis |
| 2014/0071025 A1 | 3/2014 | Lee et al. |
| 2014/0071539 A1 | 3/2014 | Gao |
| 2014/0118829 A1 | 5/2014 | Ma et al. |
| 2014/0153102 A1 | 6/2014 | Chang |
| 2014/0168035 A1 | 6/2014 | Luebke et al. |
| 2014/0168783 A1 | 6/2014 | Luebke et al. |
| 2014/0177023 A1 | 6/2014 | Gao et al. |
| 2014/0218468 A1 | 8/2014 | Gao et al. |
| 2014/0218647 A1 | 8/2014 | Blum et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0177516 A1 | 6/2015 | Blonde et al. |
| 2015/0178939 A1 | 6/2015 | Bradski et al. |
| 2015/0185475 A1 | 7/2015 | Saariko et al. |
| 2015/0185503 A1 | 7/2015 | Tate et al. |
| 2015/0205126 A1 | 7/2015 | Schowengerdt |
| 2015/0206321 A1 | 7/2015 | Scavezze et al. |
| 2015/0222883 A1 | 8/2015 | Welch |
| 2015/0222884 A1 | 8/2015 | Cheng |
| 2015/0235431 A1 | 8/2015 | Schowengerdt |
| 2015/0241705 A1 | 8/2015 | Abovitz et al. |
| 2015/0248046 A1 | 9/2015 | Schowengerdt |
| 2015/0262424 A1 | 9/2015 | Tabaka et al. |
| 2015/0264335 A1* | 9/2015 | Park .............. G02B 7/38 348/49 |
| 2015/0268415 A1 | 9/2015 | Schowengerdt et al. |
| 2015/0301356 A1 | 10/2015 | Tabirian et al. |
| 2015/0302652 A1 | 10/2015 | Miller et al. |
| 2015/0309175 A1 | 10/2015 | Hinderling et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2015/0370074 A1 | 12/2015 | McDowall et al. |
| 2016/0011419 A1 | 1/2016 | Gao |
| 2016/0026253 A1 | 1/2016 | Bradski et al. |
| 2016/0047956 A1 | 2/2016 | Tabirian et al. |
| 2016/0055822 A1 | 2/2016 | Bell |
| 2016/0109730 A1 | 4/2016 | McDowall et al. |
| 2016/0278695 A1 | 9/2016 | Wang et al. |
| 2016/0327798 A1 | 11/2016 | Xiao |
| 2016/0335806 A1 | 11/2016 | Chan et al. |
| 2017/0010469 A1 | 1/2017 | Samec et al. |
| 2017/0168307 A1 | 6/2017 | Itani |
| 2017/0184848 A1 | 6/2017 | Vallius |
| 2017/0219827 A1 | 8/2017 | Pan et al. |
| 2017/0223344 A1 | 8/2017 | Kaehler |
| 2017/0293145 A1 | 10/2017 | Miller et al. |
| 2017/0323615 A1 | 11/2017 | Hazra et al. |
| 2018/0129048 A1 | 5/2018 | Robbins et al. |
| 2018/0180890 A1 | 6/2018 | Baerenrodt et al. |
| 2018/0188528 A1 | 7/2018 | Browy et al. |
| 2018/0188536 A1 | 7/2018 | Bell et al. |
| 2018/0239177 A1 | 8/2018 | Oh |
| 2018/0267222 A1 | 9/2018 | Ambur et al. |
| 2018/0314066 A1 | 11/2018 | Bell et al. |
| 2018/0348524 A1 | 12/2018 | Blum et al. |
| 2018/0356639 A1 | 12/2018 | Schaefer et al. |
| 2019/0265465 A1 | 8/2019 | Wong et al. |
| 2020/0058256 A1 | 2/2020 | Seibert et al. |
| 2020/0379334 A1 | 12/2020 | McDowall et al. |
| 2021/0286183 A1 | 9/2021 | Ouderkirk et al. |
| 2021/0297560 A1 | 9/2021 | Luna et al. |
| 2022/0011578 A1 | 1/2022 | Sinay et al. |
| 2022/0128352 A1 | 4/2022 | Binder |
| 2023/0079929 A1 | 3/2023 | Bradski et al. |

FOREIGN PATENT DOCUMENTS

| | | | |
|---|---|---|---|
| CN | 106662747 | | 5/2017 |
| CN | 107376349 | | 11/2017 |
| EP | 2649485 | | 10/2013 |
| EP | 3914959 | | 12/2021 |
| JP | S 60-010224 A | | 1/1985 |
| JP | S61-156227 | | 7/1986 |
| JP | H02110511 | | 4/1990 |
| JP | H06342129 A | | 12/1994 |
| JP | H08160340 A | | 6/1996 |
| JP | H10232364 | | 9/1998 |
| JP | 2000-249902 | | 9/2000 |
| JP | 2001-290101 | | 10/2001 |
| JP | 2007-240709 | | 9/2007 |
| JP | 2008242134 A | | 10/2008 |
| JP | 2011141316 A | | 7/2011 |
| JP | 2012-505430 | | 3/2012 |
| JP | 2014219621 A | | 11/2014 |
| JP | 2015525365 A | | 9/2015 |
| JP | 2016519327 A | | 6/2016 |
| JP | 2016173570 A | | 9/2016 |
| JP | 2016177232 A | | 10/2016 |
| KR | 10-2009-0051111 | | 5/2009 |
| KR | 10-2013-0130735 | | 12/2013 |
| KR | 10-2014-0066258 | | 5/2014 |
| WO | 2005093493 A1 | | 10/2005 |
| WO | 2005124431 A1 | | 12/2005 |
| WO | WO 2012/067832 | | 5/2012 |
| WO | WO-2013086078 A1 * | 6/2013 | ........... G02B 27/017 |
| WO | WO 2014/199180 | | 12/2014 |
| WO | WO 2016/181108 | | 11/2016 |
| WO | WO 2019/075231 | | 4/2019 |

OTHER PUBLICATIONS

ARToolKit: https://web.archive.org/web/20051013062315/http://www.hitl.washington.edu:80/artoolkit/docu mentation/hardware.htm, archived Oct. 13, 2005, 3 pages.

Azuma, "A Survey of Augmented Reality," Presence: Teleoperators and Virtual Environments, Aug. 1997, 6(4):355-385.

(56) References Cited

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
Extended European Search Report in European Appln. No. 19854491.8, dated Sep. 24, 2021, 8 pages.
Extended European Search Report in European Appln. No. 20738194.8, dated Feb. 7, 2022, 10 pages.
International Preliminary Report for Patentability for PCT Application No. PCT/US2018/055457, issued Apr. 14, 2020 (MLEAP. 183WO), 5 pages.
International Search Report and Written Opinion for PCT Application No. PCT/US2018/055457, mailed Dec. 14, 2018 (MLEAP. 183WO), 10 pages.
Jacob, "Eye Tracking in Advanced Interface Design," Virtual environments and advanced interface design, 1995, 258:288, 50 pages.
Notice of Allowance in Japanese Appln. No. 2019-568041, dated Apr. 17, 2023, 5 pages (with English translation).
Office Action in Australian Appln. No. 2018284089, dated Apr. 21, 2022, 3 pages.
Office Action in Chinese Appln. No. 201980056636.9, dated Sep. 2, 2022, 13 pages (with English translation).
Office Action in Indian Appln. No. 201847037177, dated Aug. 27, 2021, 6 pages.
Office Action in Indian Appln. No. 201947053419, dated Feb. 25, 2022, 6 pages.
Office Action in Japanese Appln. No. 2019-568041, dated Apr. 27, 2022, 12 pages (with English translation).
Office Action in Japanese Appln. No. 2019-568041, dated Oct. 19, 2022, 8 pages (with English translation).
Office Action in Japanese Appln. No. 2020-519432, dated Jul. 11, 2022, 6 pages (with English translation).
Office Action in Japanese Appln. No. 2021-124069, dated Jun. 24, 2022, 6 pages (with English translation).
Office Action in Korean Appln. No. 10-2022-7009492, dated Jun. 7, 2022, 16 pages (with English translation).
Office Action in Korean Appln. No. 2018-7032354, dated Dec. 28, 2021, 4 pages (with English translation).
Office Action in Korean Appln. No. 2018-7032354, dated Oct. 20, 2021, 18 pages (with English translation).
Tanriverdi and Jacob, "Interacting with Eye Movements in Virtual Environments," Proc. of the SIGCHI Conference on Human Factors in Computing Systems, 2000, pp. 265-272.
Chen et al., "Electrically adjustable location of a projected image in augmented reality via a liquid-crystal lens," Opt Express, Nov. 2015, 23(22):28154-62, 9 pages.
Office Action in European Appln. No. 18818480.8, dated Jun. 14, 2023, 6 pages.
Extended European Search Report in European Appln. No. 23191596.8, dated Dec. 15, 2023, 9 pages.
Office Action in Chinese Appln. No. 201880051878.4, dated Feb. 7, 2024, 10 pages (with English translation).
Office Action in Japanese Appln. No. 2021-510460, dated Sep. 13, 2023, 8 pages (with English translation).
Office Action in Japanese Appln. No. 2021-539627, dated Jan. 4, 2024, 6 pages (with English translation).
Office Action in Japanese Appln. No. 2021-539627, dated May 31, 2024, 6 pages (with English translation).
Office Action in Japanese Appln. No. 2022-118559, dated Nov. 14, 2023, 16 pages (with English translation).
Office Action in Japanese Appln. No. 2022-176192, dated Oct. 13, 2023, 4 pages (with English transaltion).
Office Action in Korean Appln. No. 10-2024-7004747, dated Jun. 18, 2024, 6 pages (with English translation).
Notice of Allowance in Japanese Appln. No. 2023-019715, dated Jul. 23, 2024, 5 pages (with English translation).

\* cited by examiner

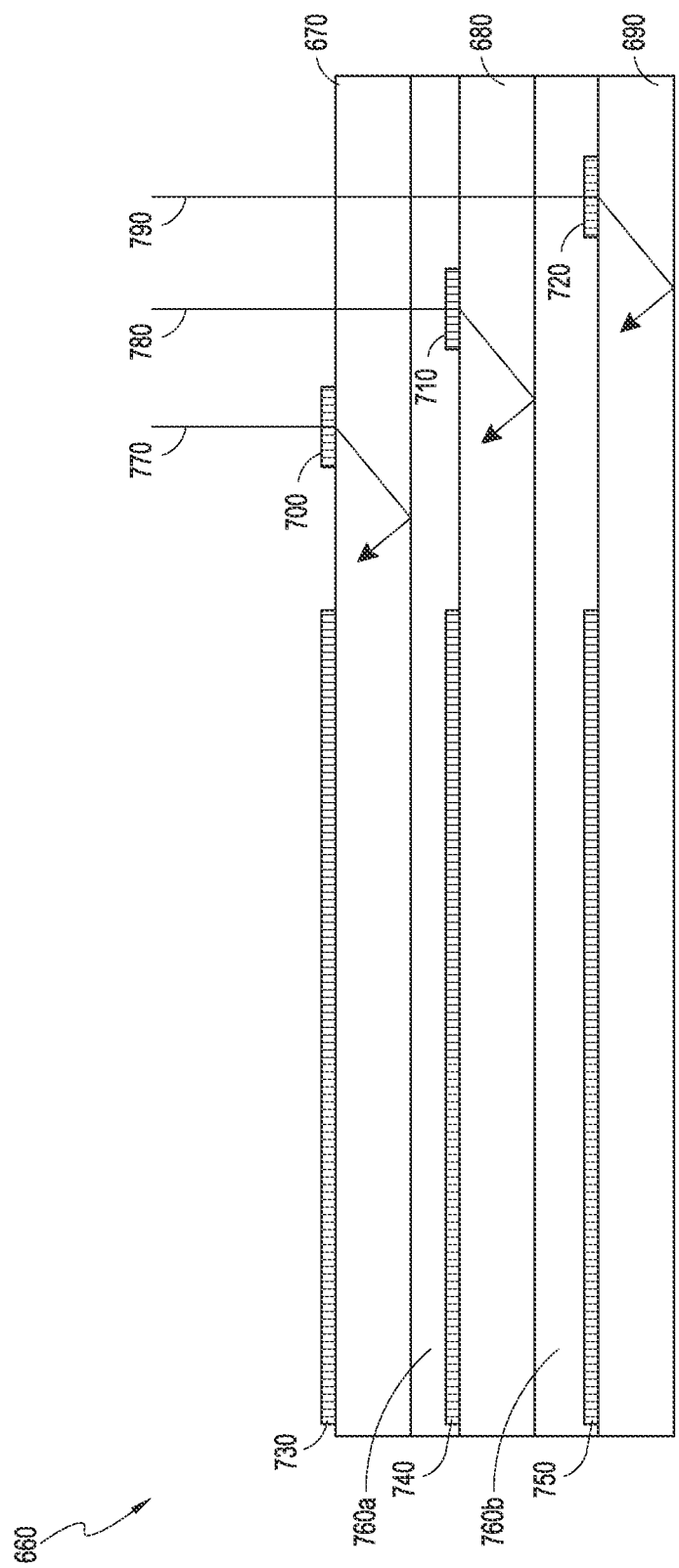

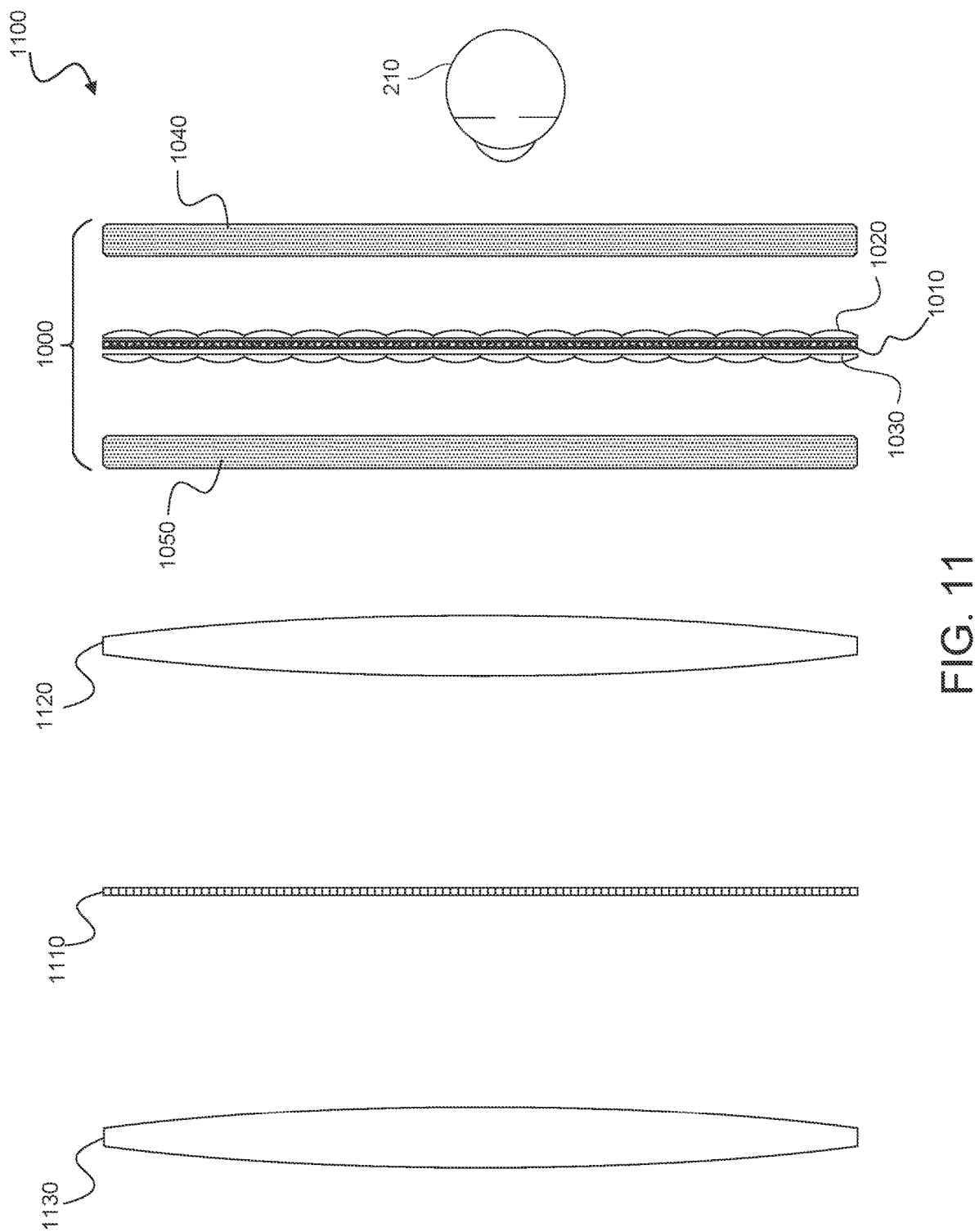

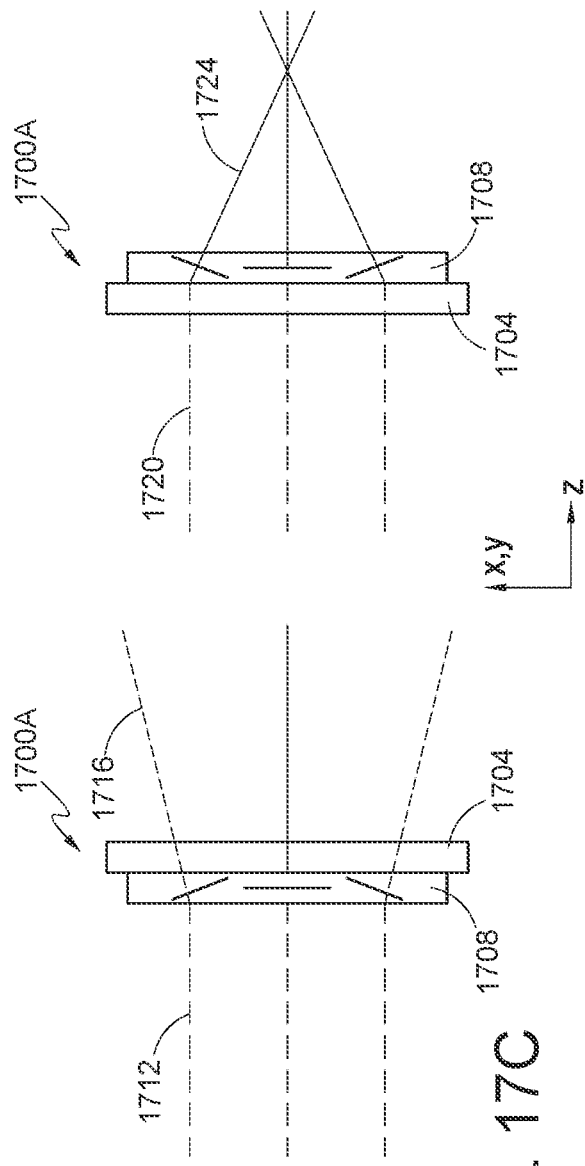
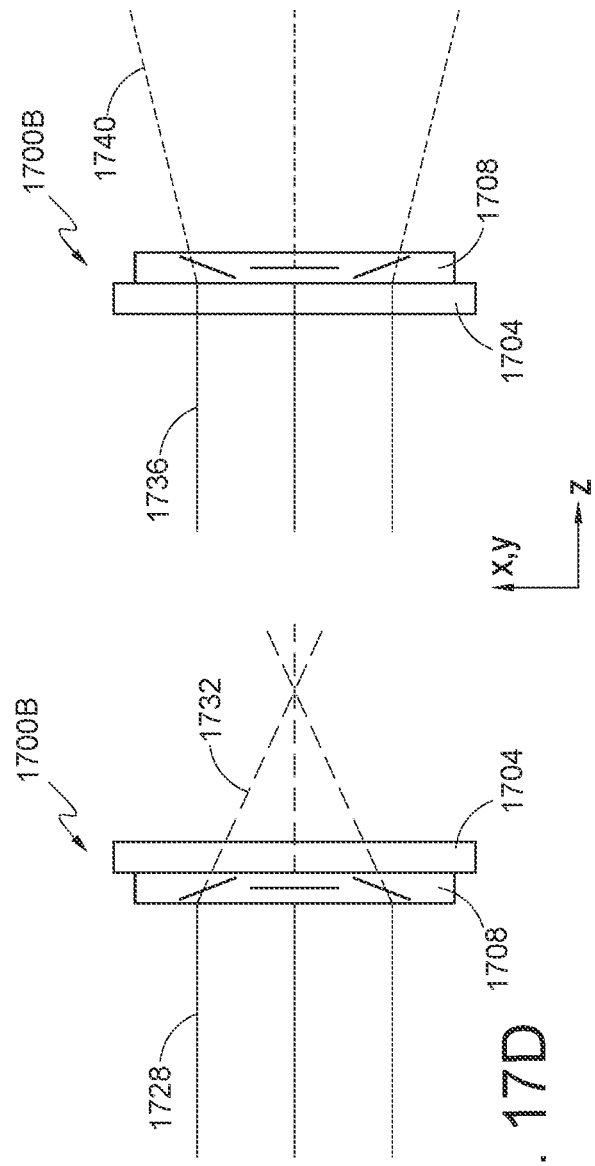
FIG. 17C
FIG. 17D

AUGMENTED REALITY DISPLAY COMPRISING EYEPIECE HAVING A TRANSPARENT EMISSIVE DISPLAY

CROSS-REFERENCE TO RELATED APPLICATIONS

This application is a continuation of U.S. patent application Ser. No. 16/158,041, filed Oct. 11, 2018, entitled "AUGMENTED REALITY DISPLAY COMPRISING EYEPIECE HAVING A TRANSPARENT EMISSIVE DISPLAY", which claims the benefit of priority under 35 U.S.C. § 119(e) to U.S. Provisional Patent Application No. 62/571,203 filed Oct. 11, 2017, entitled "AUGMENTED REALITY DISPLAY COMPRISING EYEPIECE HAVING A TRANSPARENT EMISSIVE DISPLAY", the disclosure of which are hereby incorporated by reference herein in their entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 15/481,255 filed on Apr. 6, 2017, published on Oct. 12, 2017 as U.S. Publication No. 2017/0293145; U.S. Provisional Patent Application No. 62/518,539 filed on Jun. 12, 2017; U.S. patent application Ser. No. 16/006,080 filed on Jun. 12, 2018, published on Dec. 13, 2028 as U.S. Publication No. 2018/0356639 and U.S. patent application Ser. No. 15/902,927 filed on Feb. 22, 2018, published on Aug. 23, 2018 as U.S. Publication No. 2018/0239177.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Various examples of head mounted display systems having eyepieces with transparent emissive displays that can be used for augmented reality are described herein.

Examples—Part I

Example 1: A head mounted display system configured to project light to an eye of a user to display augmented reality image content in a vision field of said user, said head-mounted display system comprising: a frame configured to be supported on a head of the user; and an eyepiece disposed on the frame, at least a portion of said eyepiece being transparent and disposed at a location in front of the user's eye when the user wears said head-mounted display such that said transparent portion transmits light from the environment in front of the user to the user's eye to provide a view of the environment in front of the user, wherein said eyepiece comprises a transparent emissive display comprising a plurality of emitters, said transparent emissive display configured to emit light into said user's eye to display augmented reality image content to the user's vision field, said transparent emissive display being transparent and emissive over an area, said transparent emissive display disposed at a location in front of the user's eye when the user wears said head-mounted display such that said transparent emissive display transmits light from the environment in front of the user through said transparent emissive area to the user's eye to provide a view of the environment in front of the user.

Example 2: The system of Example 1, wherein said transparent emissive display comprises an organic light emitting diode (OLED) display.

Example 3: The system of Example 1 or 2, further comprising a proximal lens array disposed on a proximal side of the transparent emissive display such that said proximal lens array is between the transparent emissive display and the user's eye.

Example 4: The system of Example 3, wherein said proximal lens array is configured to reduce divergence of light emitted by the transparent emissive display.

Example 5: The system of Example 3 or 4, wherein said proximal lens array comprises lenses having positive optical power.

Example 6: The system of any of Examples 3 to 5, wherein said proximal lens array is configured to collimate light emitted by the transparent emissive display.

Example 7: The system of Example 6, wherein said proximal lens array comprises lenses having positive optical power disposed a focal distance from said emitters.

Example 8: The system of any of Examples above, further comprising a distal lens array disposed on a distal side of the transparent emissive display opposite of the proximal side such that said distal lens array is between the transparent emissive display and the environment in front of the user.

Example 9: The system of Example 8, wherein said distal lens array has optical power to counter optical power introduced by said proximal lens array to reduce refraction effects of the proximal lens array on the view of the environment in front of user.

Example 10: The system of any of the Examples above, further comprising a proximal variable focus optical element disposed on the proximal side of the transparent emissive display such that said proximal variable focus optical element is between the transparent emissive display and the user's eye.

Example 11: The system of Example 10, wherein said proximal variable focus optical element has an electrical input configured to receive an electrical signal to alter the state of the variable focus optical element and the focus of said variable focus optical element.

Example 12: The system of Example 10 or 11, wherein said proximal variable focus optical element is configured to alter the divergence of light emitted from the emissive display to cause different image content to appear as if emitted from different distances in front of the eyepiece.

Example 13: The system of any of Examples 10 to 12, wherein said proximal variable focus optical element is configured to vary between two states that introduce different negative optical powers to vary the divergence of light from the transparent emissive display.

Example 14: The system of Example 10 or 11, wherein said proximal variable focus optical element is configured to collimate light from the transparent emissive display when in one state.

Example 15: The system of any of Examples above, further comprising a distal variable focus optical element disposed on the distal side of the transparent emissive display such that said distal variable focus optical element is between the transparent emissive display and the environment in front of the user.

Example 16: The system of Example 15, wherein said distal variable focus optical element has an electrical input configured to receive an electrical signal to alter the state of the distal variable focus optical element and the focus of said distal variable focus optical element.

Example 17: The system of Example 15 or 16, wherein said distal variable focus optical element is configured to provide optical power to counter optical power introduced by said proximal variable focus optical element to reduce refraction effects of the proximal variable focus optical element on the view of the environment in front of the user.

Example 18: The system of any of Examples above, further comprising a pair of occluders disposed on the proximal side of the transparent emissive display such that said pair of occluders is between the transparent emissive display and the user's eye.

Example 19: The system of Example 18, wherein said pair of occluders comprises first and second spatial light modulators each including a plurality of pixels, said first and second spatial light modulators having an electrical input configured to receive an electrical signal to selectively alter the transmissive state of the pixels.

Example 20: The system of Example 19, further comprising electronics electrically coupled to said electrical input of said first and second spatial light modulators to cause one or more pixels on said first spatial light modulator to be transmissive while surrounding pixels are opaque and one or more of said pixels on said second spatial light modulator to be transmissive while surrounding pixels on said second spatial light modulator are opaque such that light of a certain angular direction that is emitted from certain emitters of the transparent emissive display propagates both through said transmissive pixels of said first spatial light modulator and through said transmissive pixels of said second spatial light modulator.

Example 21: The system of any of the Example above, further comprising a distal occluder disposed on the distal side of the transparent emissive display such that said distal occluder is between the transparent emissive display and the environment in front of the user.

Example 22: The system of Example 21, wherein said distal occluder comprises a spatial light modulator comprising a plurality of pixels, said distal occluder having an electrical input configured to receive an electrical signal to selectively alter the transmissive state of the pixels.

Example 23: The system of Example 22, further comprising electronics electrically coupled to said electrical input of said spatial light modulator to cause one or more pixels on said spatial light modulator to be transmissive while surrounding pixels are opaque to selectively block portions of the view of the environment in front of the user.

Example 24: The system of any of the Examples above, wherein said transparent emissive area extends over at least 50% of said transparent portion of said eyepiece.

Example 25: The system of any of the Examples above, wherein said transparent emissive area extends over at least 75% of said transparent portion of said eyepiece.

Example 26: The system of any of the Examples above, wherein said transparent emissive area is at least 4 square centimeters.

Example 27: The system of any of the Examples above, further comprising at least one occluder disposed on the proximal side of the transparent emissive display such that said at least one occluders is between the transparent emissive display and the user's eye.

Example 28: The system of Example 27, wherein said at least one occluder comprises a spatial light modulator including a plurality of pixels, said spatial light modulator having an electrical input configured to receive an electrical signal to selectively alter the transmissive state of the pixels.

Example 29: The system of Example 28, further comprising electronics electrically coupled to said electrical input of said spatial light modulator to cause one or more pixels on said spatial light modulator to be transmissive while surrounding pixels are opaque such that light of a certain angular direction that is emitted from certain emitters of the transparent emissive display propagates both through said transmissive pixels of said spatial light modulator.

Example 30: The system of any of Examples 27 to 29, further comprising a proximal lens or proximal lens array disposed on a proximal side of the transparent emissive display such that said proximal lens or proximal lens array is between the transparent emissive display and the at least one occluder.

Example 31: The system of Example 30, wherein said proximal lens or proximal lens array has a focal length and is disposed a distance corresponding to said focal length away from said at least one occluder such that different angular components of light from the transparent emissive display are focused at said at least one occluder.

Example 32: The system of any of the Examples above, further comprising electronics communicatively coupled to said proximal variable focus optical element.

Example 33: The display system of Example 32, wherein said electronics are configured to adjust the optical power of the proximal variable focus optical element based on a depth for displaying image content.

Example 34: The system of any of the Examples 32 or 33, wherein said electronics are communicatively coupled to said distal variable focus optical element.

Example 35: The system of any of the Examples 32 to 34, wherein said electronics is configured to adjust an optical power of the distal variable focus optical element in response to an optical power of the proximal variable focus optical element.

Example 36: The system of any of the Examples above, further comprising at least one sensor configured to monitor one or more characteristics of the user.

Example 37: The system of Example 36, wherein the at least one sensor comprises at least one camera.

Example 38: The system of Example 36 or 37, wherein the at least one sensor is configured to monitor a positioning of the eye of the user.

Example 39: The system of any of Examples 36 to 38, wherein electronics are communicatively coupled to the transparent emissive display and the at least one sensor and the electronics are configured to: receive output data from the at least one sensor indicating one or more characteristics of the user; and adjust an optical power of the proximal variable focus optical element based on the output data received from the at least one sensor.

Example 40: The system of Example 39, wherein the electronics are configured to adjust an optical power of the distal variable focus optical element based on the output data received from the at least one sensor.

Example 41: The system of any of the Examples above, wherein the transparent emissive display is configured to project divergent light to the user to display image content.

Example 42: The system of any of the Examples above, wherein an optical power of the proximal or distal variable focus optical element or both are configured to be adjusted to provide vision correction for the user's vision.

Example 43: The system of any of the Examples above, wherein an optical power of the proximal or distal variable focus optical element or both are configured to be adjusted in accordance with a prescription for correcting the user's vision at two or more distances.

Example 44: The system of any of the Examples above, wherein an optical power of the proximal or distal variable focus optical element or both are configured to be adjusted in accordance with a prescription for correcting the user's vision.

Example 45: The system of any of the Examples above, wherein the proximal or distal variable focus optical element or both comprise a layer of liquid crystal sandwiched between two substrates.

Example 46: The system of Example 45, wherein the proximal or distal variable focus optical element or both comprise electrodes for altering a refractive index of the liquid crystal layer upon application of a voltage.

Example 47: The system of Example 45 or 46, wherein the substrates comprise glass.

Example 48: The system of any of the Examples above, wherein electronics are configured to vary the refractive index of the proximal or distal variable focus optical element or both by application of an electrical current or voltage.

Example 49: The system of any of Examples 3 to 48, wherein the proximal or distal lens array or both comprises an array of microlenses.

Example 50: The system of any of Examples 3 to 49, wherein the proximal or distal lens array or both comprises an array of waveplate lenses.

Example 51: The system of any of Examples 3 to 50, wherein the proximal or distal lens array or both comprises an array of wavelength-selective lenses.

Example 52: The system of any of Examples 3 to 51, wherein the proximal and distal lens arrays have optical powers with opposite signs.

Example 53: The system of any of the Examples above, further comprising one or more reflective optical elements having optical power disposed on a distal side of said transparent emissive display.

Example 54: The system of any of Examples 53, wherein one or more reflective optical element comprises one or more cholesteric liquid crystal reflective waveplate lenses.

Example 55: The system of any of Examples 53, wherein one or more reflective optical element comprises an array of cholesteric liquid crystal reflective waveplate lenses.

Example 56: The system of any of Examples 53 to 55, further comprising a retarder positioned between the transparent emissive display and said one or more reflective optical elements.

Example 57: The system of Example 56, wherein said retarder comprises a quarter waveplate.

Example 58: The system of any of Examples 3 to 57, wherein the proximal lens array comprises a plurality of lenses, different of said lenses being optically coupled to a respective set of pixels of the transparent emissive display.

Example 59: The system of Example 58, wherein electronics are configured to control two or more sets of pixels of the transparent emissive display optically coupled to two or more respective lenses in the proximal lens array according to a same illumination pattern.

Example 60: The system of Example 58, wherein each set of pixels of the transparent emissive display is configured to display image information from a different perspective.

Example 61: The system of any of the Examples above, further comprising one or more layers of liquid crystal positioned between the transparent emissive display and the proximal or distal variable focus optical elements or both, wherein electronics is configured to apply an electrical current or voltage to pixels of the one or more layers of liquid crystal to selectively occlude portions of incident light.

Example 62: The system of Example 61, wherein the at least one processor is configured to apply a modulated electrical current or voltage to pixels of the one or more layers of liquid crystal, said modulated electrical current or voltage having a modulation frequency.

Example 63: The system of Example 62, wherein the modulation frequency is at least 60 Hz.

Example 64: The system of any of the Examples above, wherein the proximal or distal variable lens elements, or both, comprise:
  one or more waveplate lenses configured to provide a first optical power for light having a first polarization, and to provide a second optical power for light having a second polarization; and one or more switchable waveplates in an optical path, the one or more switchable waveplates configured to selectively alter a polarization state of light passing therethrough, wherein the proximal or distal variable lens elements, or both, are configured to provide a respective optical power that is adjustable upon application of a respective electrical signal.

Example 65: The system of any of the examples above, wherein electronics are configured to cause the proximal or distal variable lens elements, or both, to synchronously switch between different states in a manner such that the first and second variable focus lens assemblies impart a substantially constant net optical power to ambient light from the surrounding environment passing therethrough.

Example 66: The system of any of Examples above, further comprising a at least one occluder disposed on the proximal side of the transparent emissive display such that said at least one occluder is between the transparent emissive display and the user's eye.

Example 67: The system of Example 66, wherein said at least one occluder comprises first and second spatial light modulators each including a plurality of pixels, said first and second spatial light modulators having an electrical input configured to receive an electrical signal to selectively alter the transmissive state of the pixels.

Example 68: The system of Example 67, further comprising electronics electrically coupled to said electrical input of said first and second spatial light modulators to cause one or more pixels on said first spatial light modulator to be transmissive while surrounding pixels are opaque and one or more of said pixels on said second spatial light modulator to be transmissive while surrounding pixels on said second spatial light modulator are opaque such that light of a certain angular direction that is emitted from certain emitters of the transparent emissive display propagates both through said transmissive pixels of said first spatial light modulator and through said transmissive pixels of said second spatial light modulator.

Example 69: The system of any of the Examples above, further comprising one or more reflective optical elements disposed on a distal side of said transparent emissive display.

Example 70: The system of Example 69, wherein the reflective optical element is disposed to receive light from the transparent emissive display and reflect said light to the eye of the user.

Example 71: The system of Examples 69 or 70, wherein one or more reflective optical element comprises one or more liquid crystal reflective lenses.

Example 72: The system of Examples 69 or 70, wherein one or more reflective optical element comprises an array of liquid crystal reflective lenses.

Example 73: The system of any of Examples 69 to 72, further comprising a retarder positioned between the transparent emissive display and said one or more reflective optical element.

Example 74: The system of Example 73, wherein said retarder comprises a quarter-wave retarder.

Example 75: The system of any of the Examples above, further comprising a proximal lens disposed on a proximal side of the transparent emissive display such that said proximal lens is between the transparent emissive display and the user's eye.

Example 76: The system of Example 75, wherein said proximal lens comprises a single lens.

Example 77: The system of Example 75 or 76, wherein said proximal lens is configured to reduce divergence of light emitted by the transparent emissive display.

Example 78: The system of any of Examples 75 to 77, wherein said proximal lens comprises a lens having positive optical power.

Example 79: The system of any of Examples 75 to 78, wherein said proximal lens is configured to collimate light emitted by the transparent emissive display.

Example 80: The system of Example 79, wherein said proximal lens comprises a lens having positive optical power disposed a focal distance from said emitters.

Example 81: The system of any of Examples 75 to 79, further comprising a distal lens disposed on a distal side of the transparent emissive display opposite of the proximal side such that said distal lens is between the transparent emissive display and the environment in front of the user.

Example 82: The system of Example 81, wherein said distal lens comprises a single lens.

Example 83: The system of Example 81 or 82, wherein said distal lens has optical power to counter optical power introduced by said proximal lens to reduce refraction effects of the proximal lens on the view of the environment in front of user.

Example 84: The system of Example 69 or 70, wherein the reflective optical element comprises liquid crystal.

Example 85: The system of any of the Examples above, further comprising a waveplate lens.

Example 86: The system of any of the Examples above, wherein the waveplate lens comprises liquid crystal.

Example 87: The system of any of the Examples above, wherein the waveplate lens is reflective.

Example 88: The system of any of the Examples above, further comprising a waveplate lenslet array.

Example 89: The system of any of the Examples above, wherein the waveplate lenslet array comprises liquid crystal.

Example 90: The system of any of the Examples above, wherein the waveplate lenslet array is reflective.

Example 91: The system of Examples 69 to 90, wherein the one or more reflective optical element comprises one or more liquid crystal reflective waveplate lenses.

Example 92: The system of Examples 69 to 90, wherein the one or more reflective optical element comprises an array of liquid crystal reflective waveplate lenses.

Example 93: The system of any of Examples 69 to 91, wherein the one or more reflective optical element comprises one or more cholesteric liquid crystal reflective waveplate lenses.

Example 94: The system of any of Examples 69 to 92, wherein the one or more reflective optical element comprises an array of cholesteric liquid crystal reflective waveplate lenses.

Example 95: The system of any of the Examples above, wherein the proximal lens array comprises liquid crystal.

Example 96: The system of any of the Examples above, wherein the distal lens array comprises liquid crystal.

Example 97: The system of any of the Examples above, further comprising a proximal lens on the proximal side of the transparent emissive display.

Example 98: The system of any of the Examples above, further comprising a distal lens on the distal side of the transparent emissive display.

Examples—Part II

Example 1: A display system comprising:
a head-mountable display configured to project light to a viewer to display image information on one or more depth planes, the display comprising:
a light-emitting panel configured to produce the light, wherein the light-emitting panel is further configured to allow light from objects in a surrounding environment to pass therethrough to the viewer;
a first variable focus lens assembly between the light-emitting panel and a first eye of the viewer;
a second variable focus lens assembly between the light-emitting panel and the surrounding environment; and
at least one sensor configured to monitor one or more characteristics of the viewer;
at least one processor communicatively coupled to the light-emitting panel and the at least one sensor, wherein the at least one processor is configured to:
receive output data from the at least one sensor indicating one or more characteristics of the viewer; and
adjust an optical power of the first and second variable focus lens assemblies based on the output data received from the at least one sensor.

Example 2: The display system of Example 1, wherein the at least one processor is configured to adjust the optical power of the first and second variable focus lens assemblies depending on a depth plane for displaying the image information.

Example 3: The display system of Example 1 wherein the at least one processor is configured to adjust an optical power of the second variable focus lens assembly in response to an optical power of the first variable focus lens assembly.

Example 4: The display system of Example 1, wherein one or more emitters in the light-emitting panel are configured to project divergent light to the viewer to display the image information.

Example 5: The display system of Example 1, wherein the at least one sensor comprises at least one camera configured to monitor a positioning of the first eye of the viewer.

Example 6: The display system of Example 1, wherein an optical power of the first and/or second variable focus lens assembly is adjusted in accordance with a prescription for correcting the viewer's vision at two or more distances.

Example 7: The display system of Example 1, wherein the first and/or second variable focus lens assemblies comprises a layer of liquid crystal sandwiched between two substrates.

Example 8: The display system of Example 7, wherein the first and/or second variable focus lens assemblies comprise electrodes for altering a refractive index of the liquid crystal layer upon application of a voltage.

Example 9: The display system of Example 7, wherein the substrates comprise glass.

Example 10: The display system of Example 1, wherein the at least one processor is further configured to vary the refractive index of the first and/or second variable focus lens assembly by application of an electrical current or voltage.

Example 11: The display system of Example 1, wherein the light-emitting panel comprises an organic light-emitting diode (OLED) film.

Example 12: The display system of Example 11, wherein the display further comprises an array of lenses optically coupled to the OLED film.

Example 13: The display system of Example 12, wherein the lens array is positioned between the OLED film and the first variable focus lens assembly.

Example 14: The display system of Example 13, wherein the lens array comprises an array of microlenses.

Example 15: The display system of Example 13, wherein the lens array comprises an array of waveplate lenses.

Example 16: The display system of Example 13, wherein the lens array comprises an array of wavelength-selective lenses.

Example 17: The display system of Example 13, wherein the display further comprises another array of lenses positioned between the OLED film and the second variable focus lens assembly, wherein the two lens arrays have optical powers with opposite signs.

Example 18: The display system of Example 12, wherein the lens array is positioned between the OLED film and the second variable focus lens assembly.

Example 19: The display system of Example 13, wherein the lens array comprises an array of cholesteric liquid crystal reflective waveplate lenses.

Example 20: The display system of Example 13, wherein the display further comprises a quarter waveplate positioned between the OLED film and the array of cholesteric liquid crystal reflective waveplate lenses.

Example 21: The display system of Example 12, wherein each lens in the lens array is optically coupled to a respective set of pixels of the OLED film.

Example 22: The display system of Example 21, wherein the at least one processor is configured to control two or more sets of pixels of the OLED film optically coupled to two or more respective lenses in the lens array according to a same illumination pattern.

Example 23: The display system of Example 21, wherein each set of pixels of the OLED film is configured to display image information from a different perspective.

Example 24: The display system of Example 1, wherein the display further comprises one or more layers of liquid crystal positioned between the light-emitting panel and the first variable focus lens assembly, wherein the at least one processor is configured to apply an electrical current or voltage to pixels of the one or more layers of liquid crystal to selectively occlude portions of incident light.

Example 25: The display system of Example 24, wherein the at least one processor is configured to apply pulses of electrical current or voltage to pixels of the one or more layers of liquid crystal at a particular modulation frequency.

Example 26: The display system of Example 25, wherein the particular modulation frequency is at least 60 Hz.

Example 27: The display system of Example 1, wherein the first and second variable focus lens assemblies comprise:
one or more waveplate lenses configured to provide a first optical power for light having a first polarization, and to provide a second optical power for light having a second polarization; and
one or more switchable waveplates in an optical path, wherein each of the one or more switchable waveplates is configured to selectively alter a polarization state of light passing therethrough, and
wherein the first and second variable focus lens assemblies are configured to provide a respective optical power that is adjustable upon application of a respective electrical signal.

Example 28: The display system of Example 27, wherein the at least one processor is configured to cause the first and second variable focus lens assemblies to synchronously switch between different states in a manner such that the first and second variable focus lens assemblies impart a substantially constant net optical power to ambient light from the surrounding environment passing therethrough.

BRIEF DESCRIPTION OF THE DRAWINGS

FIG. 9A illustrates a cross-sectional side view of an example of a set of stacked waveguides that each includes an incoupling optical element.

FIG. 10D illustrates a first mode of operation of the augmented reality display, wherein a similar (or same) pattern of pixels is illuminated behind respective lenses of the array of lenses. As a result, FIG. 10D show that the angle of light output from the plurality of lenses in the array is the same. Such a configuration enables increased tolerance in the positioning of the eye without loss of image content.

FIG. 11 illustrates the augmented reality display of FIG. 10, further comprising an occluder configured to block light from certain objects in the outside world. The occluder comprises a plurality of pixels, each capable of switching between transparent and opaque in response to electrical signals.

FIG. 17C illustrates an example of a waveplate lens that provides different optical power to diverge or converge light passing therethrough depending on the polarization of light and the side on which the light is incident.

FIG. 17D illustrates an example of a waveplate lens that provides different optical power to diverge or converge light passing therethrough depending on the polarization of light and the side on which the light is incident.

DETAILED DESCRIPTION

Figure 1:
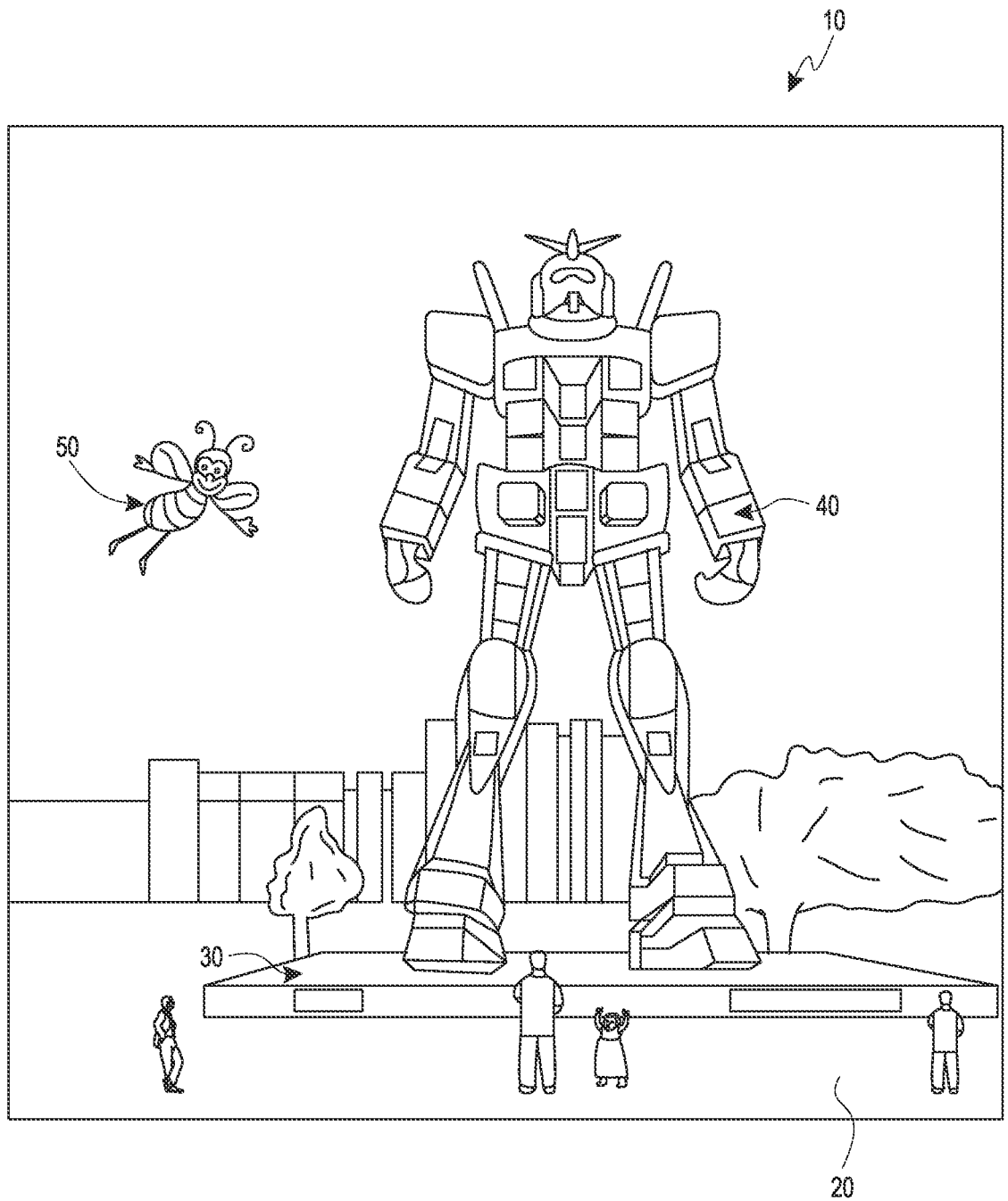
FIG. 1 illustrates a user's view of augmented reality (AR) through an AR device.

Reference will now be made to the drawings, in which like reference numerals refer to like parts throughout. Unless indicated otherwise, the drawings are schematic not necessarily drawn to scale.

Figure 2:
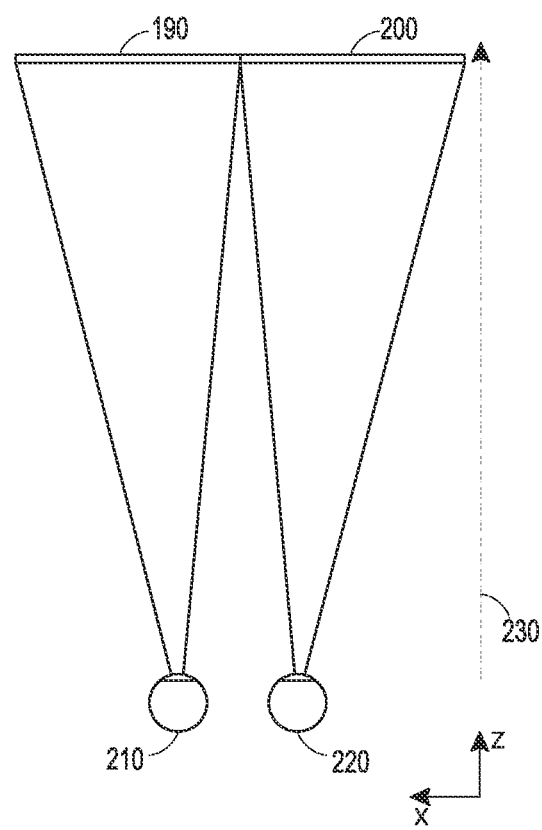
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
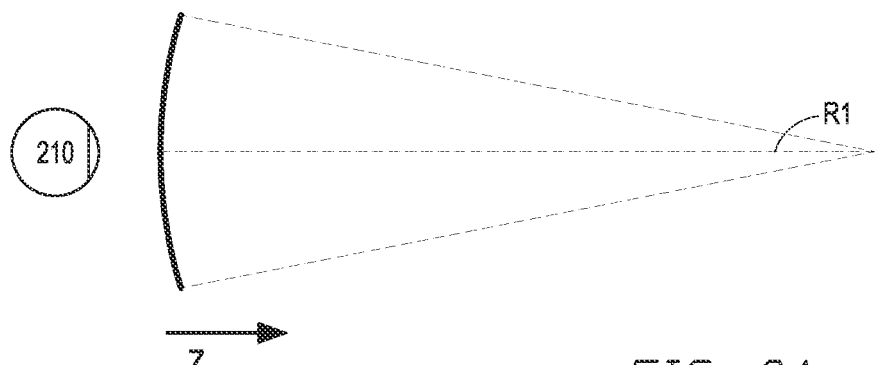
FIGS. 3A-3C illustrate relationships between radius of curvature and focal radius.
Figure 3B:
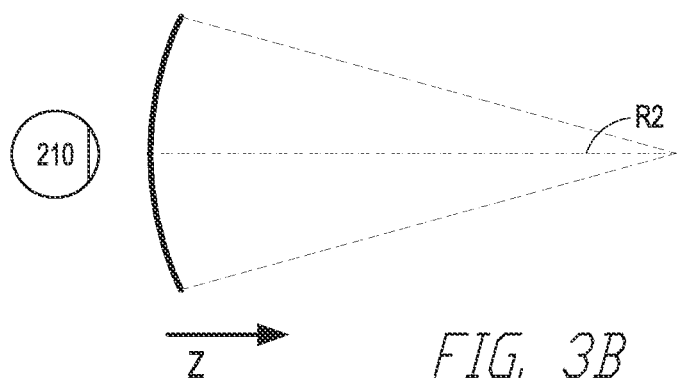
Figure 3C:
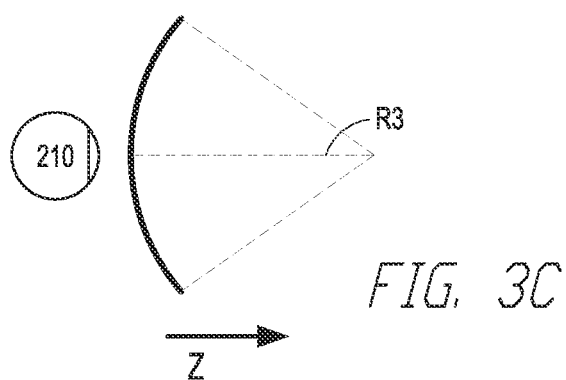

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
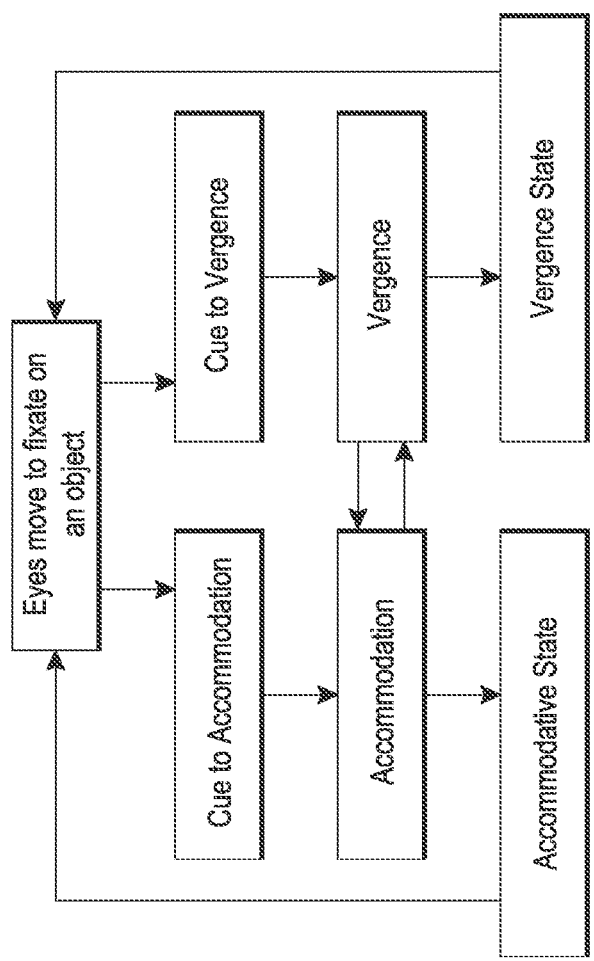
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
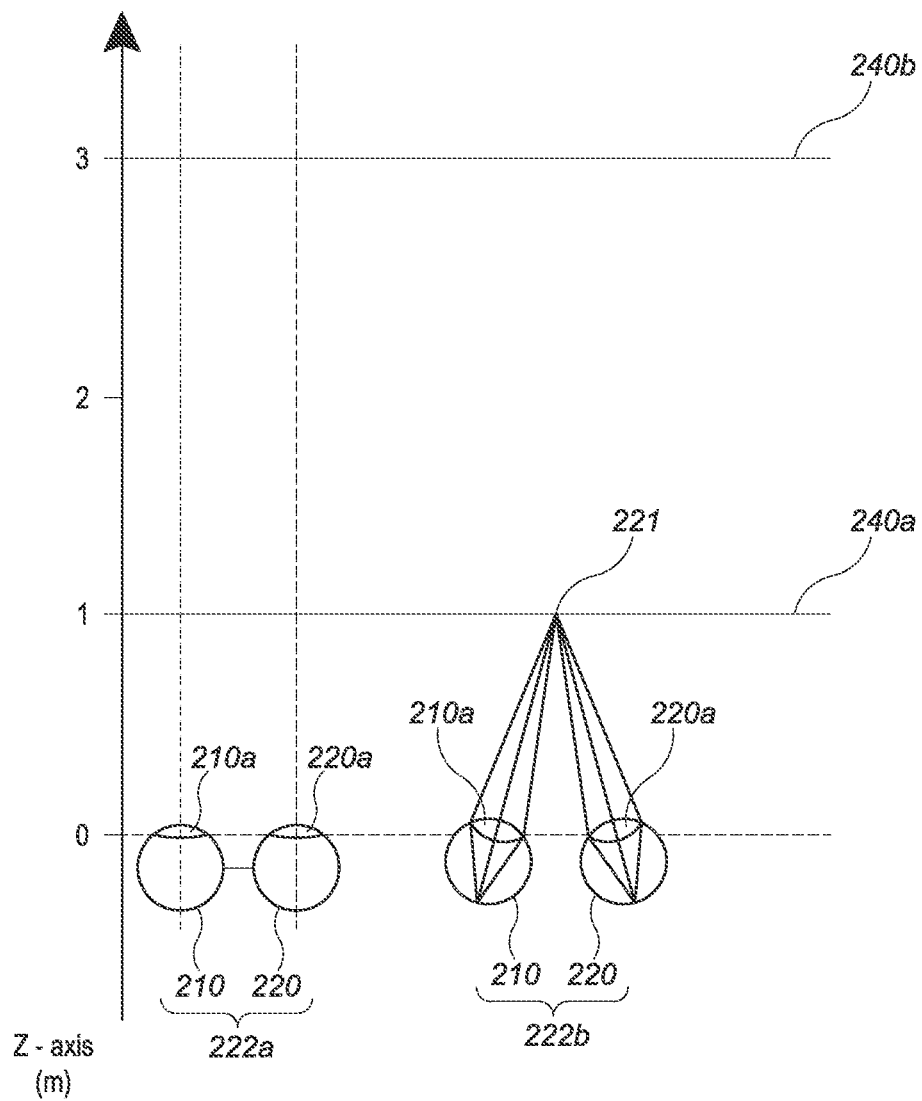
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
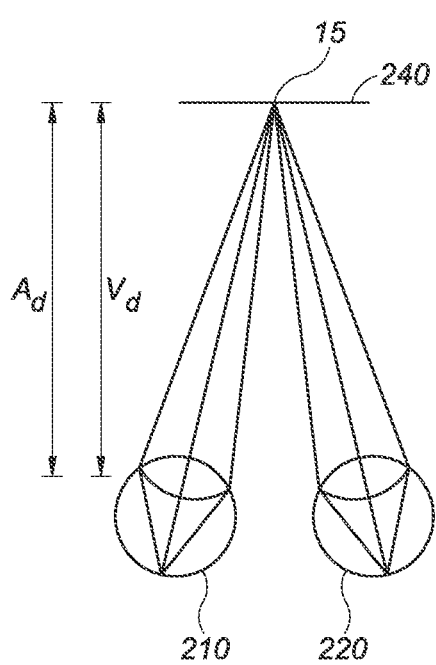
FIG. 4C illustrates an example of a representation of a top-down view of a user viewing content via a display system.
Figure 4D:
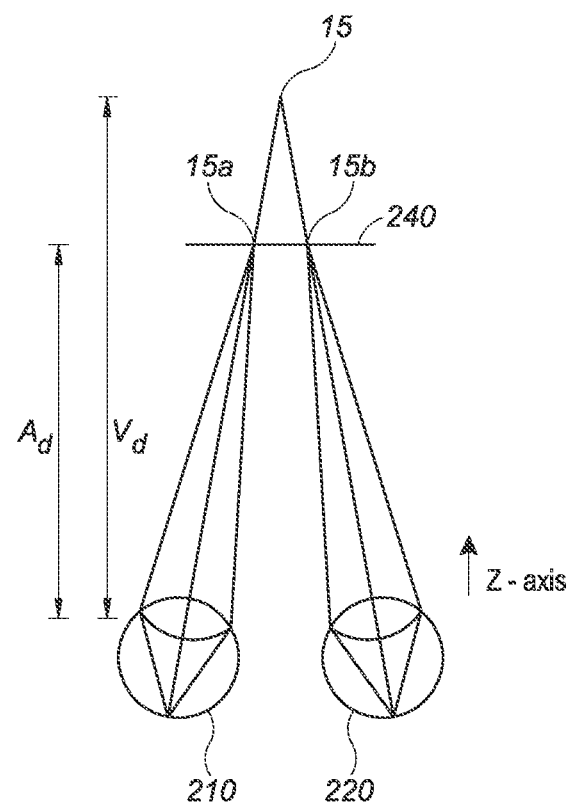
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
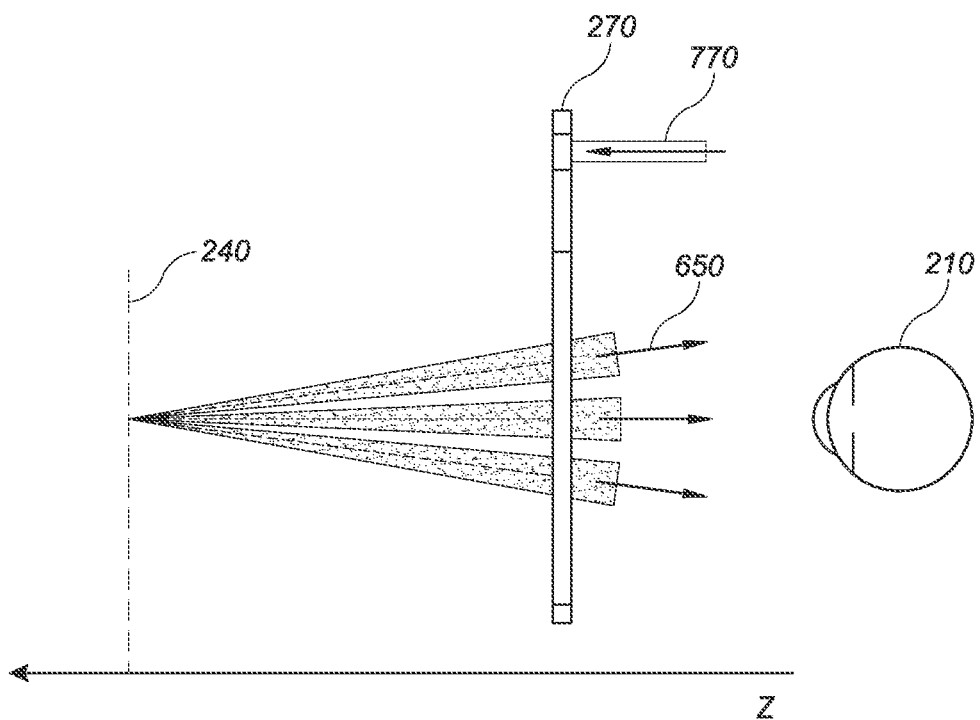
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
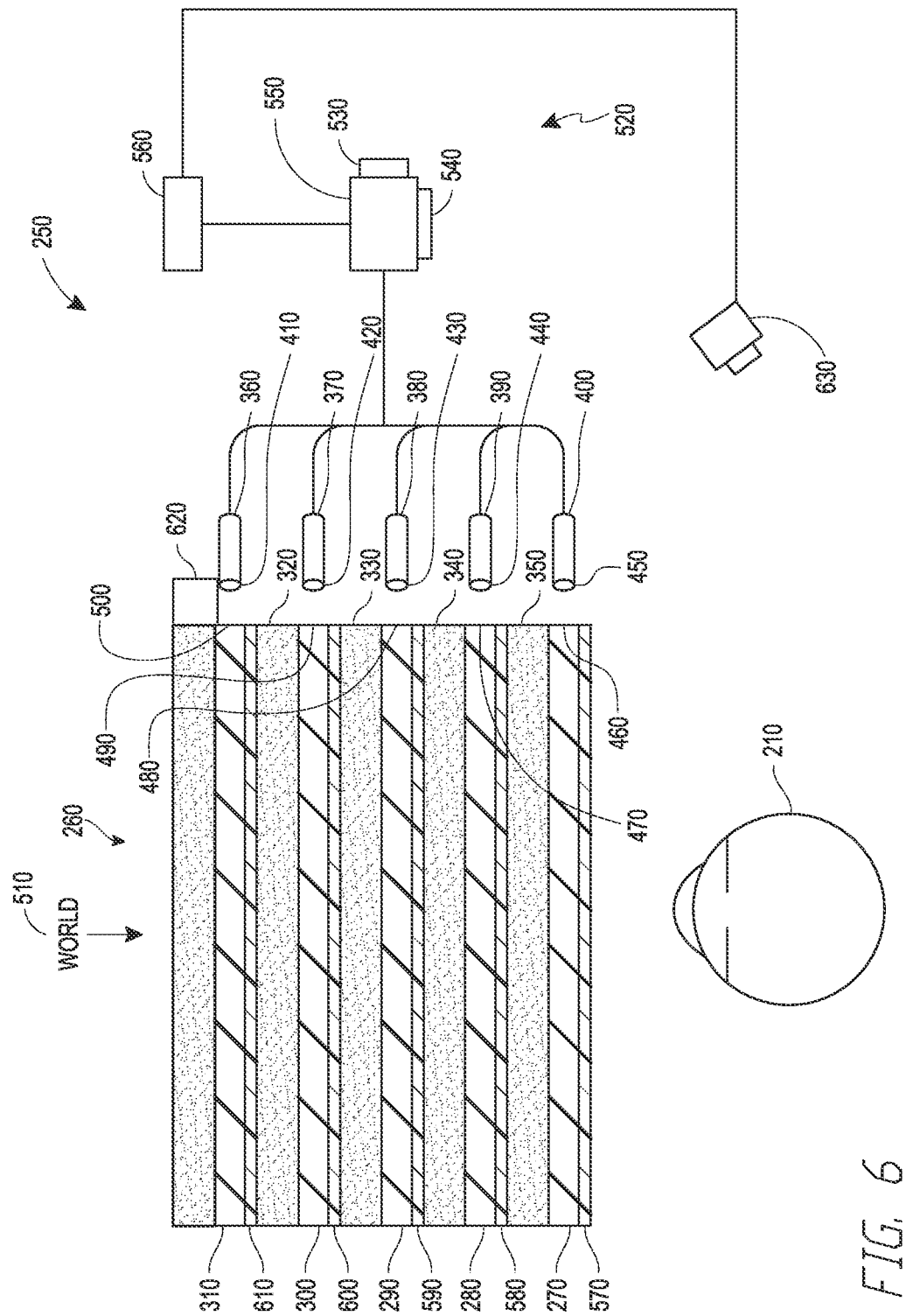
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
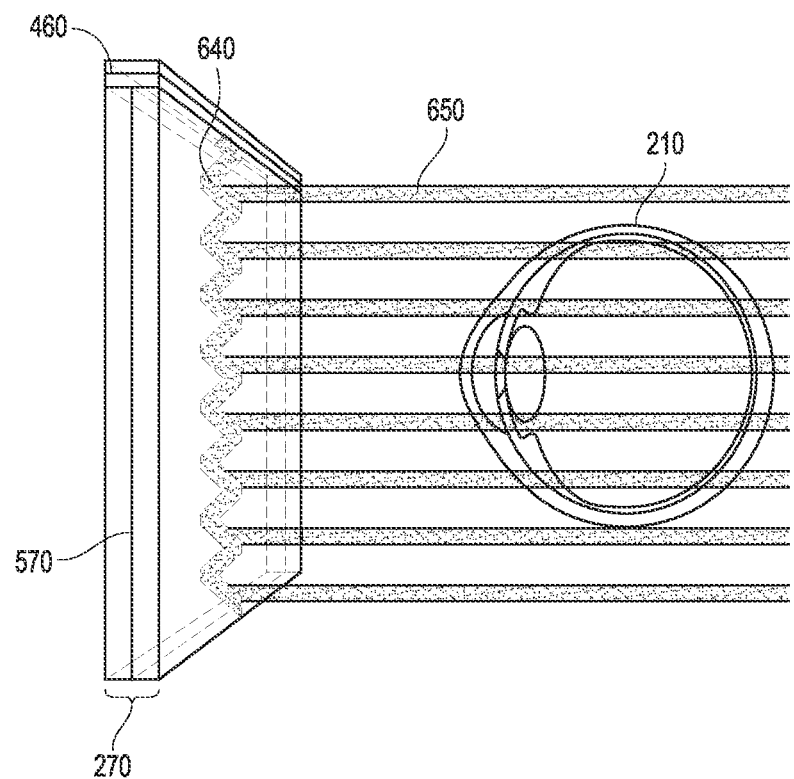
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
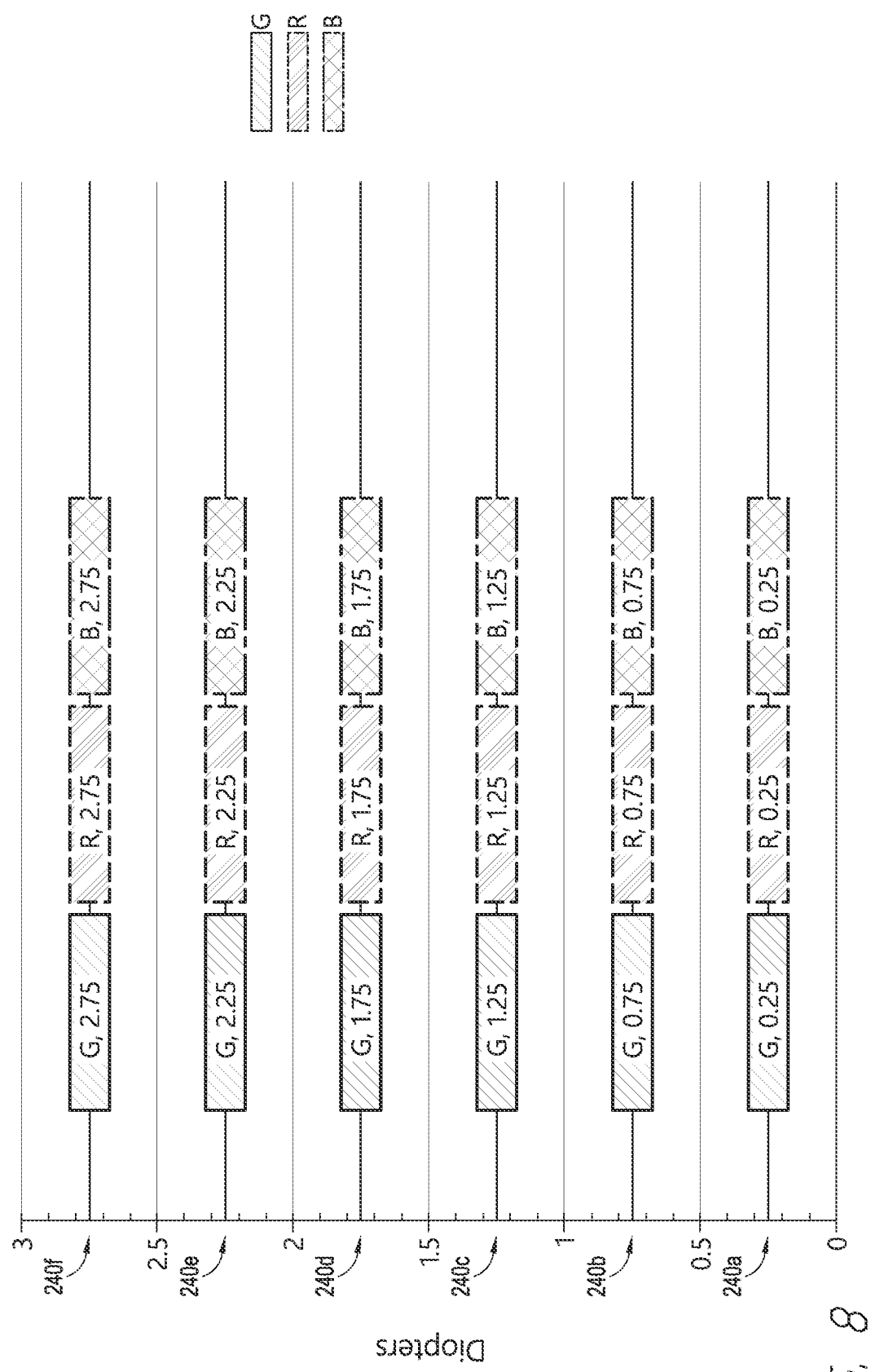
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
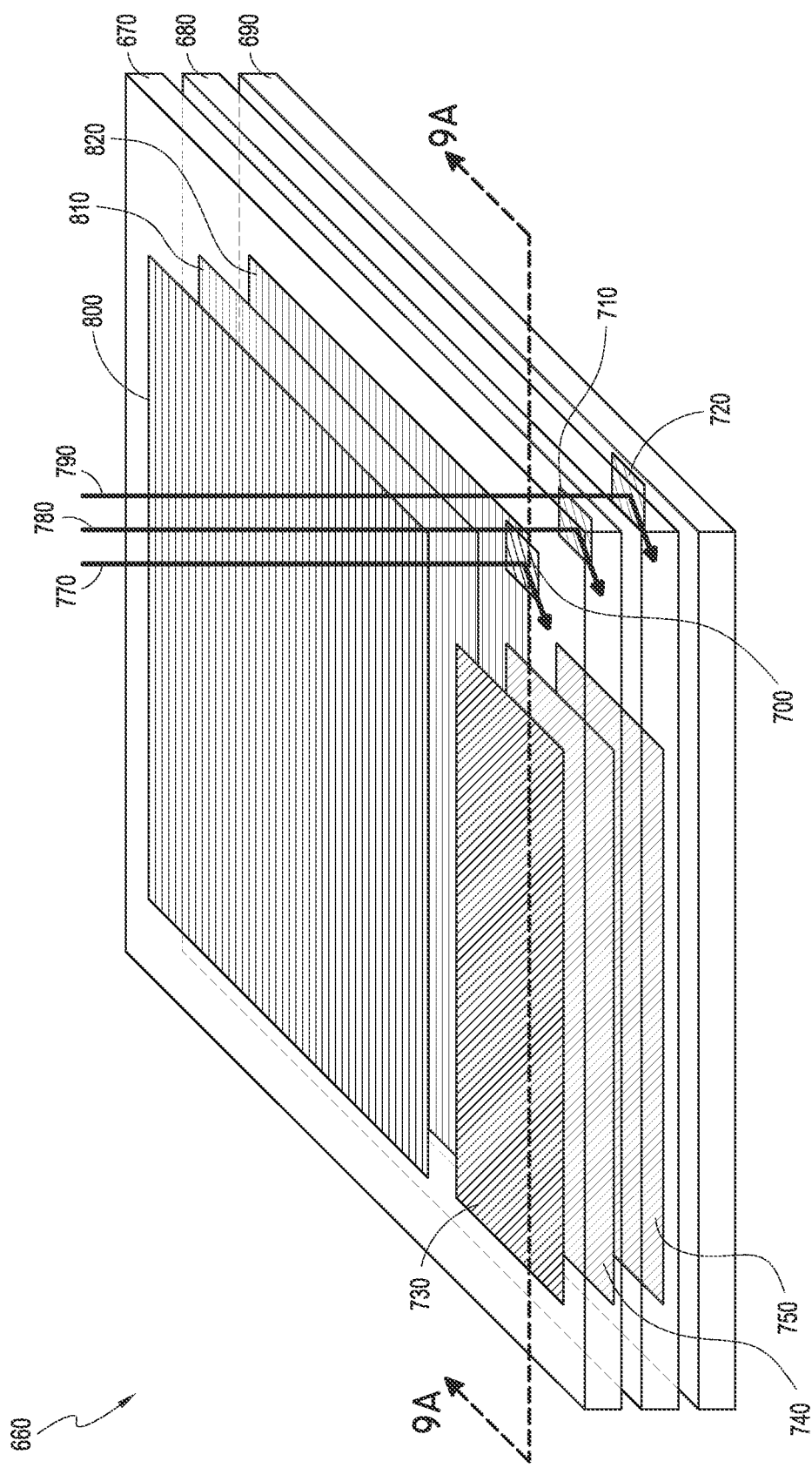
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790 are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
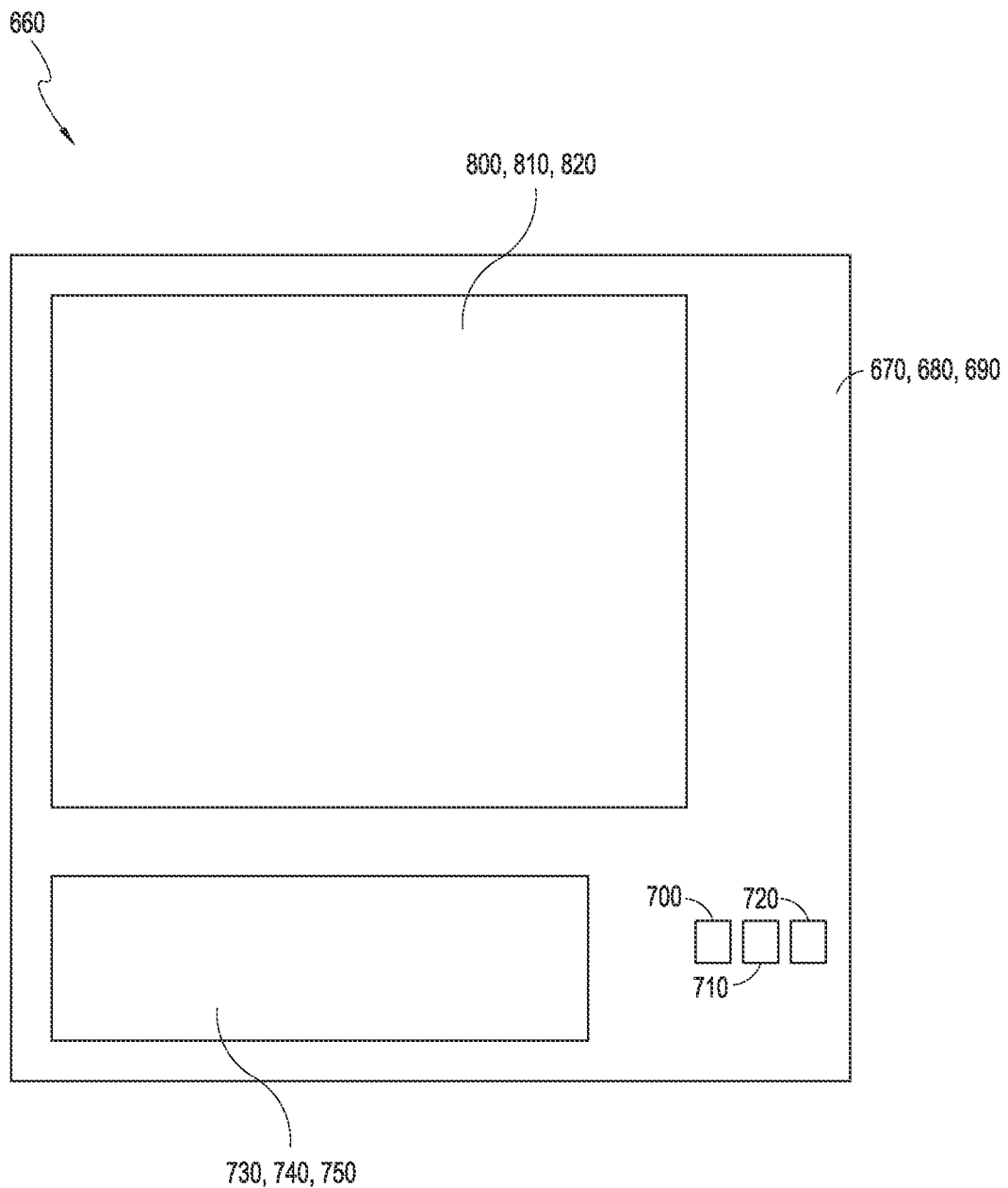
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
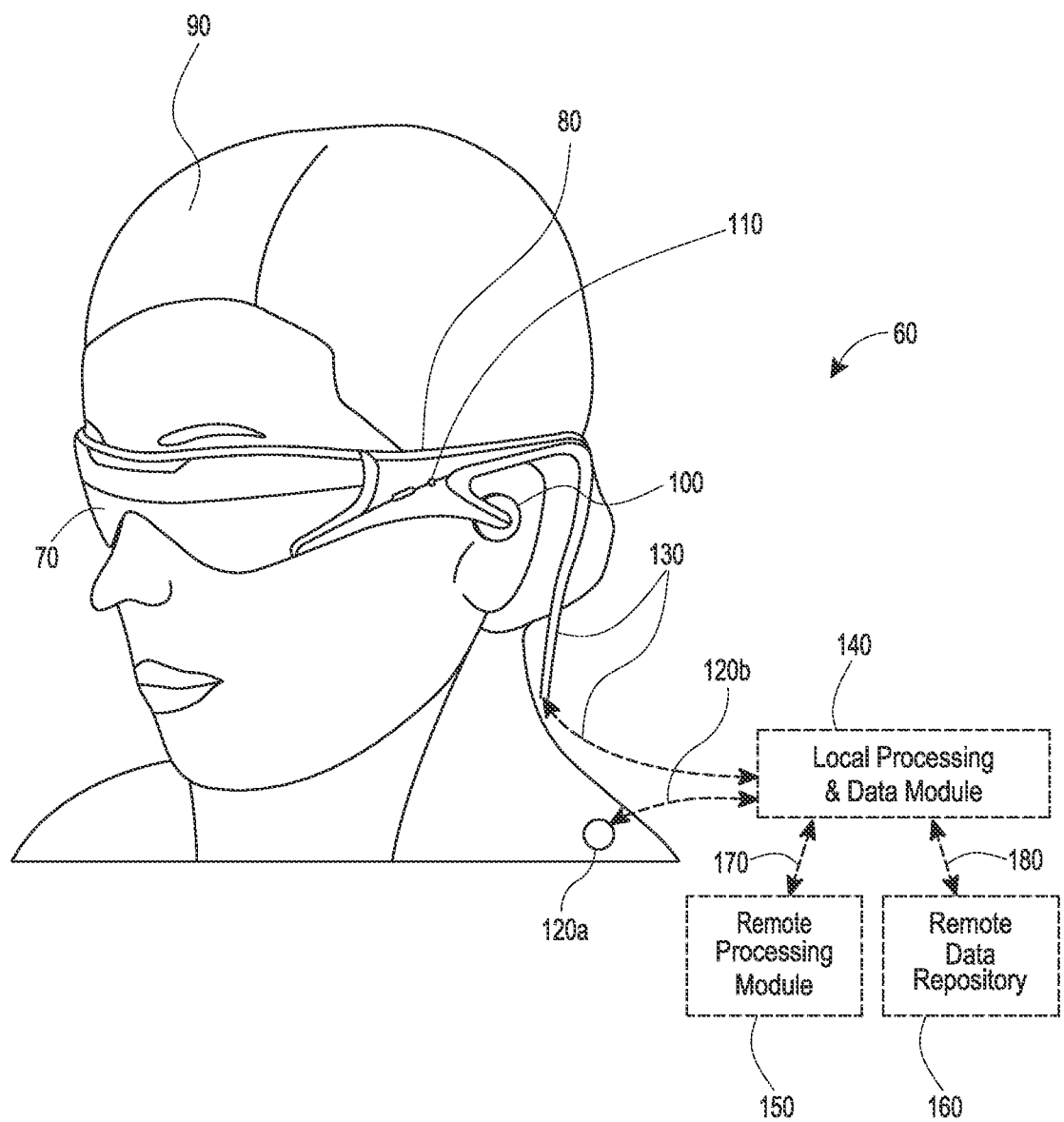
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Figure 10A:
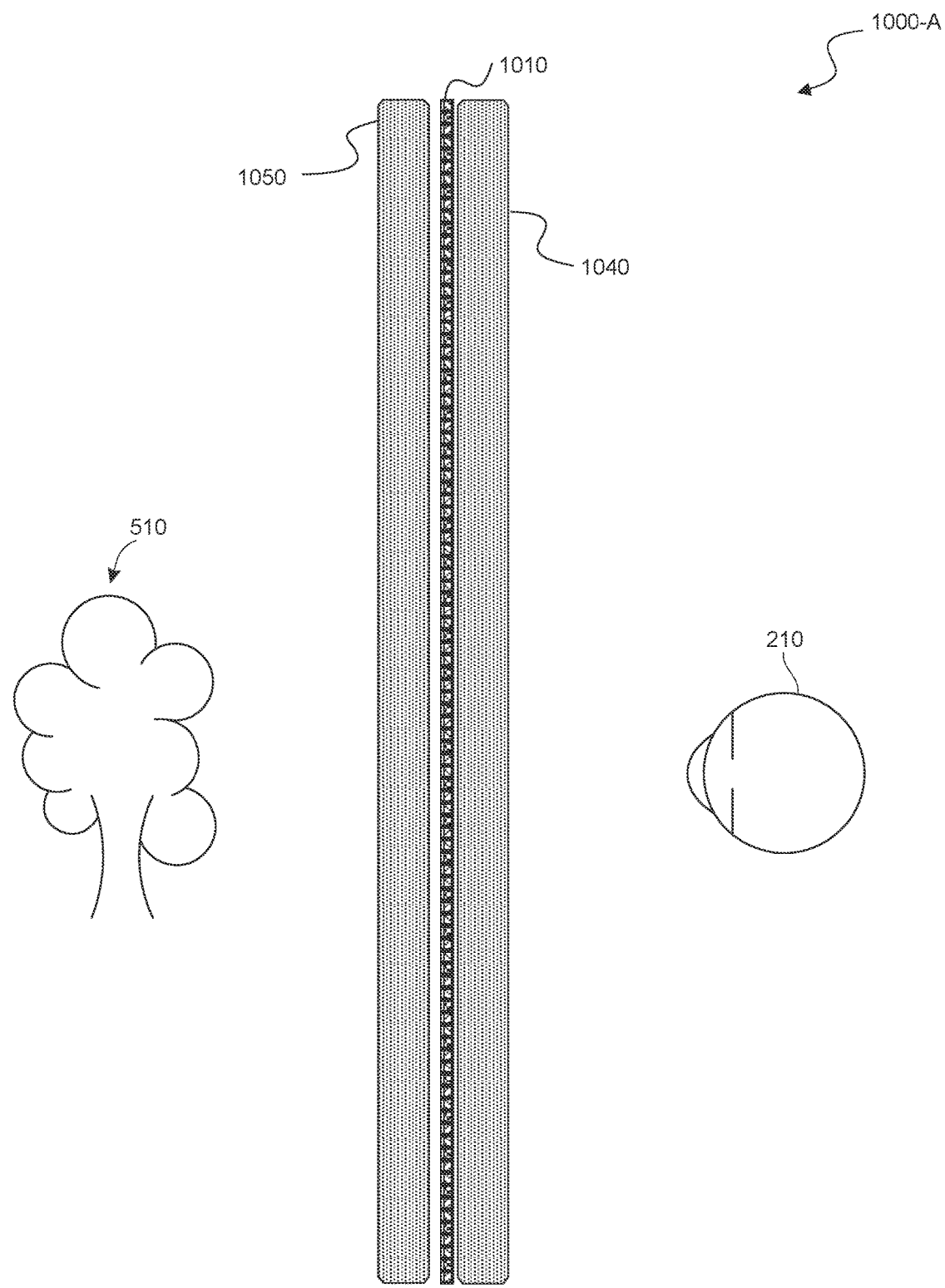
FIG. 10A illustrates an example of an augmented reality display including an eyepiece having a transparent emissive display instead of a waveguide stack such as shown in FIGS. 9A-9D. The transparent emissive display is shown located between a pair of variable focus optical elements. The variable focus optical elements are configured to modify the divergence and/or convergence of light emitted from the transparent emissive display and/or the environment.

Referring now to FIG. 10A, in some embodiments the eyepiece includes a system 1000-A that comprises a transparent emissive display 1010. FIG. 10 illustrates an example of an augmented reality display including an eyepiece having a transparent emissive display 1010 instead of a waveguide stack such as shown in FIGS. 9A-9D.

The transparent emissive display 1010 comprises a plurality of emitters, for example, arranged in an array. In some cases, for example, the transparent emissive display 1010 may comprise sufficient pixels to produce a resolution of 720p, 1080p, 4K, or 8K. The resolution and number of pixel may be in any ranges defined by any of these values. Values outside these ranges are also possible. The number of pixels in the transparent emissive display 1010 may depend on the size of the eyepiece and/or the desired optical quality of the image content.

The transparent display 1010 may comprise a transparent film spatial light modulator. The transparent display 1010 may comprise a transparent Organic Light Emitting Diodes (OLED) display. The plurality of emitters may comprise a plurality of organic light emitting diodes (OLED's). In some designs, the OLED display may comprise an OLED film, which is relatively thin and flexible. In some designs, the transparent display 1010 may comprise a quantum-dot light-emitting diode (QLED or QD-LED) display. Other types of transparent displays are also possible.

The transparent emissive display 1010 may be included in an eyepiece that is positioned in an optical path of the eye 210. Accordingly, the transparent emissive display 1010 may be positioned in an optical path of the eye 210. The eyepiece and transparent emissive display 1010 may be supported by a frame that is configured to be disposed on the head such that the eyepiece and transparent emissive display 1010 are in the optical path of the eye 210. Because the transparent emissive display 1010 is transparent, objects 510 in the environment in front of the user may be viewed through the transparent emissive display.

The eyepiece and the transparent emissive display 1010 may have a proximal side and a distal side. The proximal side is closer to the eye than the distal side. The distal side is closer to the object than the proximal side.

A proximal variable focus optical element 1040 may be disposed in an optical path between the transparent emissive display 1010 and the user's eye 210. More specifically, the proximal variable focus optical element 1040 may be disposed between a proximal lens array 1020 and the user's eye 210 (see, e.g., FIG. 10B). The proximal variable focus optical element 1040 may comprise an optical element having variable or switchable optical power. The optical power of the proximal variable focus optical element may be switched from a first optical power to a second optical power and to possibly a third optical power (or more). The proximal variable focus optical element may include electrical inputs that are configured to control the optical power provided by the variable focus optical element. In some implementations, the proximal variable focus optical element 1040 comprises a switchable liquid crystal lens assembly. In some implementations, diffraction patterns may be rendered/displayed on variable liquid crystal (LC) lens assemblies such that the LC lens assemblies impart optical power to light interacting therewith, e.g., passing therethrough.

The proximal variable focus optical element 1040 may be configured to provide the appropriate optical power to cause images formed by light from the transparent emissive display in the user's eyes to appear as if originating from different depths. For example, the proximal variable focus optical element 1040 may be configured to vary the divergence of light projected from the transparent emissive display 1010 to the viewer. In one state, for example, the proximal variable focus optical element 1040 may be configured to collimate the light emitted from the transparent emissive display as if propagating from an object at a large distance away from the user (e.g., optical infinity). In another state, the proximal variable focus optical element 1040 may be configured to diverge the light emitted from the transparent emissive display as if propagating from an object at a closer distance to the user. Likewise, another lens assembly may be configured such that in one state the proximal variable focus optical element 1040 may be configured to diverge the light emitted from the transparent emissive display as if propagating from an object at a close distance to from the user. While in another state, the proximal variable focus optical element 1040 may be configured to cause the light emitted from the transparent emissive display to diverge more as if propagating from an object at that is a closer distance to the user. Other configurations are also possible.

The distal variable focus optical element 1050 may be disposed in an optical path between the transparent emissive display 1010 and the environment 510. More specifically, the distal variable focus optical element 1050 may be disposed between the distal lens array 1030 and the environment 510. In various designs, the distal variable focus optical element 1050 comprises a liquid crystal lens assembly. The distal variable focus optical element 1050 may be substantially similar to the proximal variable focus optical element 1040 as described above. The distal variable focus optical element 1050 may be configured to vary the optical power and hence the convergence and/or divergence of light from the environment 510 so as to counter the effects of the proximal variable focus optical element 1040. As a result, objects in the environment may not appear as if imaged through an optical element having the power of the proximal variable focus optical element 1050. The user may, for example, not need optical correction and viewing his or her environment through lenses having optical power may be uncomfortable and/or inappropriate for the user.

Use of variable focus lens elements are disclosed in U.S. patent application Ser. No. 15/481,255 filed on Apr. 6, 2017, published on Oct. 12, 2017 as U.S. Publication No. 2017/0293145, which is incorporated herein by reference in its entirety as well as discussed below, for example, in the section under the heading Lenses, Variable Focus Lens Elements, and Other Configurations for Providing Optical Power.

The proximal or distal variable focus optical elements 1040, 1050 or both may comprise a wide range of optical elements having adjustable optical power. The variable focus optical elements 1040, 1050 may comprise for example different types of liquid crystal lenses such as tunable or switchable liquid crystal lenses, waveplate lenses and switchable retarders, etc. These may include diffractive lenses in various implementation. Examples of tunable or switchable liquid crystal lenses include liquid crystal disposed between two electrode substrates wherein application of an electrical signal to the electrodes can change the refractive index of the liquid crystal. In some implementations, the variable focus optical element may comprise a diffractive waveplate lens. In some implementations, one or more diffractive waveplate lens may be included with one or more switchable waveplates such as in a stack. For example, the variable focus lens may comprise diffractive waveplate lenses alternatingly stacked with switchable half waveplates. Examples of switchable lenses including liquid crystal based lenses and other lens technology are discussed below, for example, in the section under the heading Lenses, Variable Focus Lens Elements, and Other Configurations for Providing Optical Power as well as in U.S. Patent Application No. 62/518,539 filed on Jun. 12, 2017, and U.S. patent application Ser. No. 16/006,080 filed on Jun. 12, 2018, published on Dec. 13, 2018 as U.S. Publication No. 2018/0356639, which are incorporated herein by reference in their entirety.

Figure 10B:
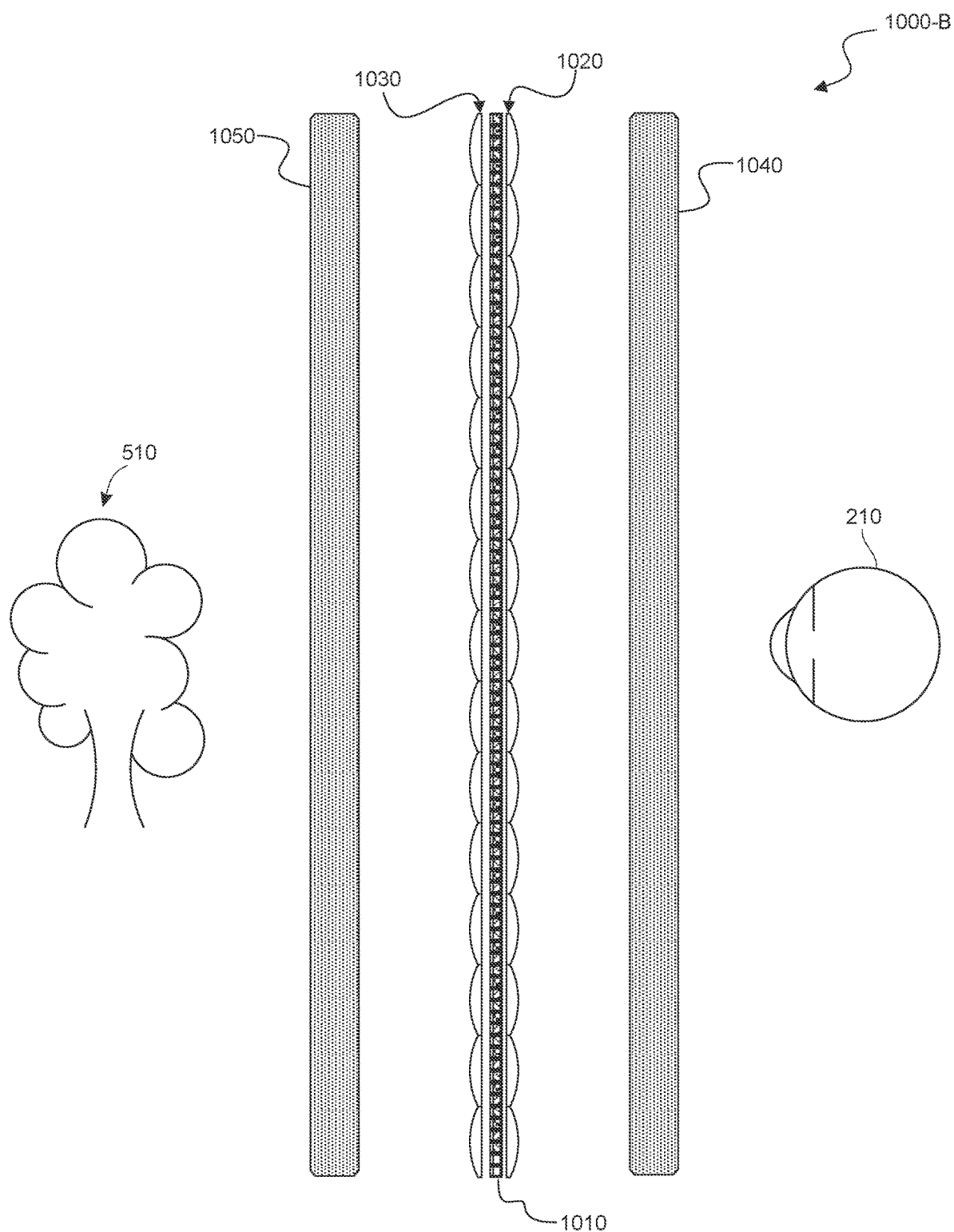
FIG. 10B illustrates a transparent emissive display similar to that shown in FIG. 10A that is disposed between a pair of lens arrays, the lens arrays located between a pair of variable focus optical elements.

FIG. 10B illustrates another system 1000-B comprising a transparent emissive display 1010, a proximal variable focus optical element 1040, and a distal variable focus optical element 1050. These elements can be substantially similar to (or different from) those described above with reference to FIG. 10A. Additionally, however, the system 1000-B further comprises a proximal lens array 1020 and a distal lens array 1030 disposed in an optical path between the transparent emissive display 1010 and the environment 510 in front of the user. In the example shown in FIG. 10B, the transparent emissive display is surrounded on opposite sides by a proximal lens array 1020 and a distal lens array 1030 as well as a proximal variable focus optical element 1040, and a distal variable focus optical element 1050. Accordingly, the proximal lens array 1020 may be disposed in an optical path between the transparent emissive display 1010 and the user's eye 210.

The proximal lens array 1020 may comprise a plurality of lenses or lenslets such as microlenses. In some cases, the proximal lens array 1020 may comprise a plurality of lenses having positive optical power. These lenses may be convex lenses such as by plano-convex or bi-convex lens. An array of fewer, larger lenses may be employed so as, for example, to increase or maximize the resolution of virtual content. Similarly, an array with many, smaller lenses may be employed, for example, so as to produce a denser light field (with more beamlets) and thus increase the likelihood that each angular component represented in the light field will reach the appropriate region of the user's retina. For some designs, the number of lenses or lenslets in the proximal lens array 1020 may correspond to the number of emitters in the transparent emissive display 1010. In some implementations, a plurality of lenses or lenslets are associated with a plurality of respective emitters. In some designs, the proximal lens array 1020 is positioned at a distance away from the transparent emissive display 1010 such that light from a one pixel does not cross paths with light from a different pixel prior to being incident on the lenslet array or lenses. For this reason, the distance between the transparent emissive display 1010 and the proximal lens array 1020 may be selected based on the divergence properties of the pixels of the transparent emissive display 1010. In some designs, the proximal lens array 1020 is disposed at a focal distance from the transparent emissive display 1010. Accordingly, in some designs, the proximal lens array 1020 is configured to collimate the light emitted from the emitters in the transparent emissive display 1010. In some implementations, the proximal lens array 1020 may be layered directly on top of the plurality of emitters, so as to reduce or minimize the distance between the pixels of the transparent emissive display 1010 and the lenses of the proximal lens array 1020 and thus also reduce or minimize the extent to which light emitted by the pixels diverges before being subjected to the optical power of lenses in the proximal lens array 1020. In some of these implementations, the proximal lens array 1020 may, for example, effectively serve as the outermost substrate layer of the transparent emissive display 1010.

Figure 10C:
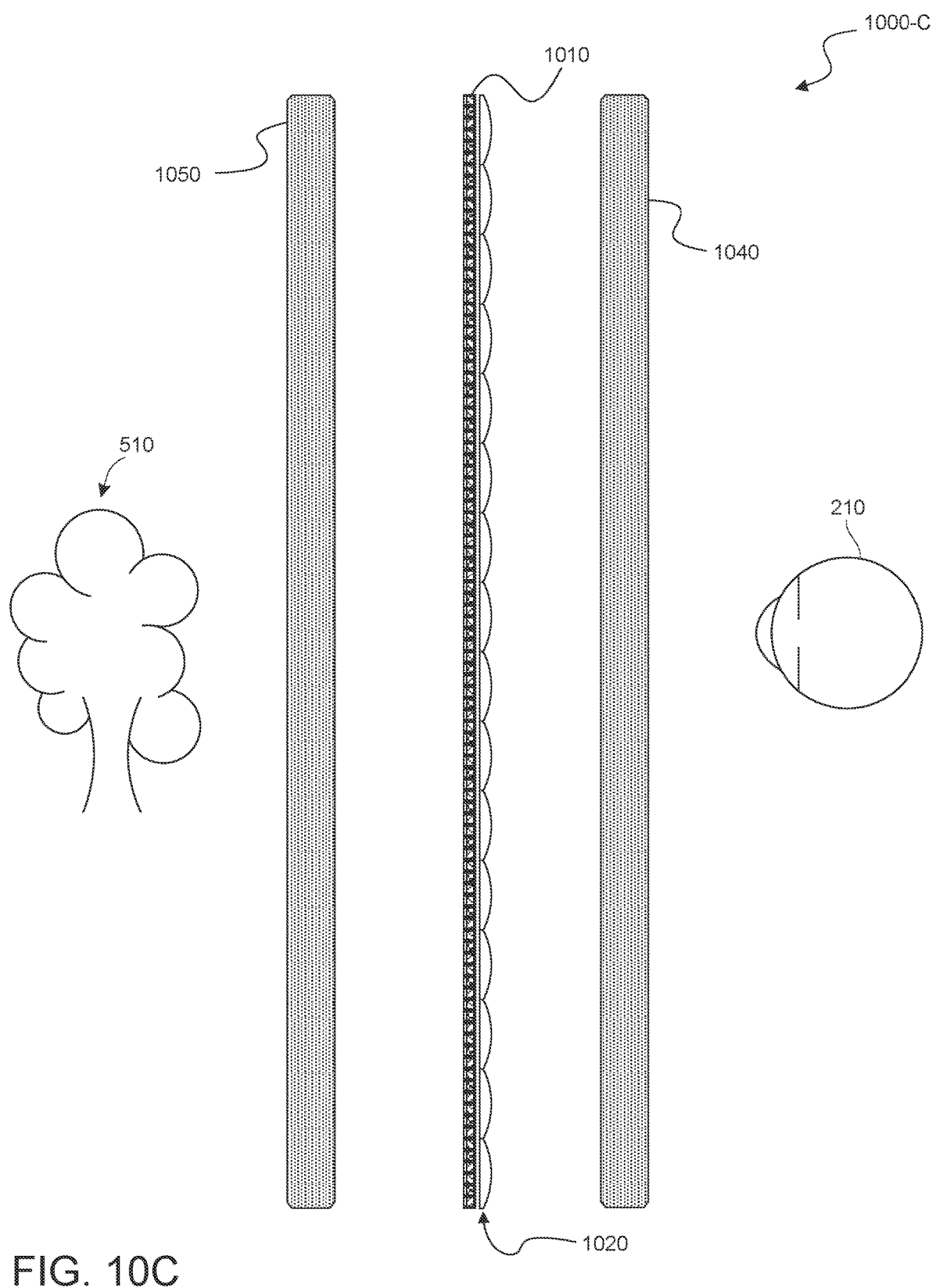
FIG. 10C illustrates an example of an augmented reality display including an eyepiece having a transparent emissive display such as illustrated in FIG. 10B except that instead of the transparent emissive display being located between a pair of lens arrays, a single lens array is disposed on a proximal side of the transparent emissive display between the transparent emissive display and the user's eye.

The distal lens array 1030 may be disposed in an optical path of the user's eye 210 between the transparent emissive display 1010 and the environment 510. The distal lens array 1030 may comprise a plurality of lenses or lenslets having negative optical power. The distal lens array 1030 may comprise concave lenses, such as for example, plano-concave or bi-concave lenses (although FIG. 10B shows convex lenses). An array of fewer, larger lenses may be employed, for example, so as to increase or maximize the resolution of virtual content. Similarly, an array with many, smaller lenses may be employed, for example, so as to produce a denser light field (with more beamlets) and thus increase the likelihood that each angular component represented in the light field will reach the appropriate region of the user's retina. In some embodiments, the number of lenses or lenslets in the distal lens array 1030 corresponds to or is equal to the number of lenses or lenslets in the proximal lens array 1020. The number of lenslets in the distal lens array 1030 may also corresponds to the number of emitters in the transparent emissive display 1010. The optical power of the distal lens array 1030, may have an optical power that counter the optical power of the proximal lens array 1020 thereby reducing the effect of the proximal lens array on the view of objects in the environment in front of the user. In some implementations, the distal lens array 1030 is excluded, as shown in FIG. 10C, while the proximal lens array 1020 remains between the transparent emissive display 1010 and the eye 210.

Although various figures herein (e.g., FIGS. 10A-10G and 11-16) show a single eyepiece for a single eye of the user, an eyepiece, a transparent emissive display, and any other components, such as proximal or distal variable focus optical elements or proximal or distal lens arrays, may be provided for each of the user's eyes.

The system 1000-B shown may operate to inject light into the eyes of the user to present image content to the user. As the eyepiece and transparent emissive display 1010 are transparent, the user may also be able to see objects in the environment in front of the user. Accordingly, the system 1000 may be used to display augmented reality image content to the user. Specifically, the plurality of emitters in the transparent emissive display 1010 may emit light that produces an image in the eyes 210 of the user. After light is emitted from the transparent emissive display 1010, the light passes through the proximal lens array 1020, which may, in some designs, cause a reduction in divergence of the light. The emitters may for example emit a diverging beam of light. The proximal lens array 1020 may cause the beam to be less diverging and in some cases may collimate the light. The light may then enter the proximal variable focus optical element 1040, which alters the divergence of the light, causing image content to appear as if emitted from different distances in front of the eyepiece depending on the state of the variable focus optical element and its resultant optical power.

The transparent nature of the transparent emissive display 1010 allows the user to observe the outside environment while also simultaneously observing the emitted light from the transparent emissive display 1010. As discussed above, in various implementations, however, the proximal lens array 1020 is located in an optical path of the user between the transparent emissive display 1010 and the user's eye 210 and may have sufficient optical power, for example, to collimate the light emitted by the transparent emissive display 1010. Accordingly, as illustrated, the proximal lens array 1020 may also be in the path of light propagating from the surrounding environment 510 to the user's eye 210. As a result, the proximal lens array 1020 may modify the wavefront of the light from the surrounding environment 510 and, thereby adversely affect the user's view of the world. To counter such effect, the distal lens array 1030 may be positioned between the transparent emissive display 1010 and the environment 510 to adjust the wavefront of light from real-world objects. In this manner, the distal lens array 1030 may be configured to compensate for the optical power introduced by the proximal lens array 1020 and the resultant effect of this optical power on the images of the objects in the environment formed in the user's eye.

The proximal variable focus optical element 1040 may provide an appropriate adjustment to the wavefront of the light outputted by the transparent emissive display 1010, to allow this light to form images in the user's eye that appear to be from the proper distance from the user. As discussed above, the transparent emissive display 1010 in combination with the proximal lens array 1020 may output collimated light. In such a case, the proximal variable focus optical element 1040 may be configured to modify the wavefront of light emitted and to provide the appropriate amount of divergence such that the eye accommodates to focus an image of the projected image content on the retina. The brain may sense and associate this amount of accommodation with a certain distance from the user. Accordingly, the image content will be associated by the brain with a particular distance from the user. In this manner, selection of the suitable divergence can associate image content with a specific distance. To that end, variable focus elements 1040, 1050 can be analogous to some of the lenses described above as well. For instance, the proximal variable focus optical element 1040 may be seen as playing a role similar to that of one or more of lenses 320, 330, 340, 350 (as described above with reference to FIG. 6), and the distal variable focus may be seen as playing a role similar to that of compensating lens layer 620 (also described above with reference to FIG. 6).

As illustrated and discussed above, however, the proximal variable focus optical element 1040 is also in the path of light propagating from the surrounding environment 510 to the viewer's eye 210. As a result, the proximal variable focus optical element 1040 may modify the wavefront of the light from the surrounding environment 510 and, thereby cause user's view of the world to be adversely affected. To correct such effects, the distal variable focus optical element 1050 may be disposed on the opposite side of the transparent emissive display 1010 from the proximal variable focus optical element 1040; that is, the distal variable focus optical element 1050 may be between the transparent emissive display 1010 and the surrounding real world to adjust the wavefront of light from real-world objects in the surrounding environment 510. The distal variable focus optical element 1050 may be configured to compensate for the optical power introduced by the proximal variable focus optical element 1040. In some implementations, the optical power of the distal variable focus optical element 1050 may be inverse or opposite the optical power of the proximal variable focus optical element 1040. For example, if the proximal variable focus optical element 1040 has a positive optical power, then the distal variable focus optical element 1050 may have a negative optical power, which may be of similar magnitude. In some designs, the distal variable focus optical element 1050 may also be configured to compensate for aberrations caused by the transparent emissive display 1010 and/or the lens arrays. For example, to compensate for both the optical power of the proximal variable focus optical element 1040 and a possible optical power of the intervening transparent emissive display 1010, the optical power of the distal variable focus optical element 1050 may be opposite to and of similar magnitude as the aggregate optical power of the proximal variable focus optical element 1040 and the transparent emissive display 1010.

Figure 10D:
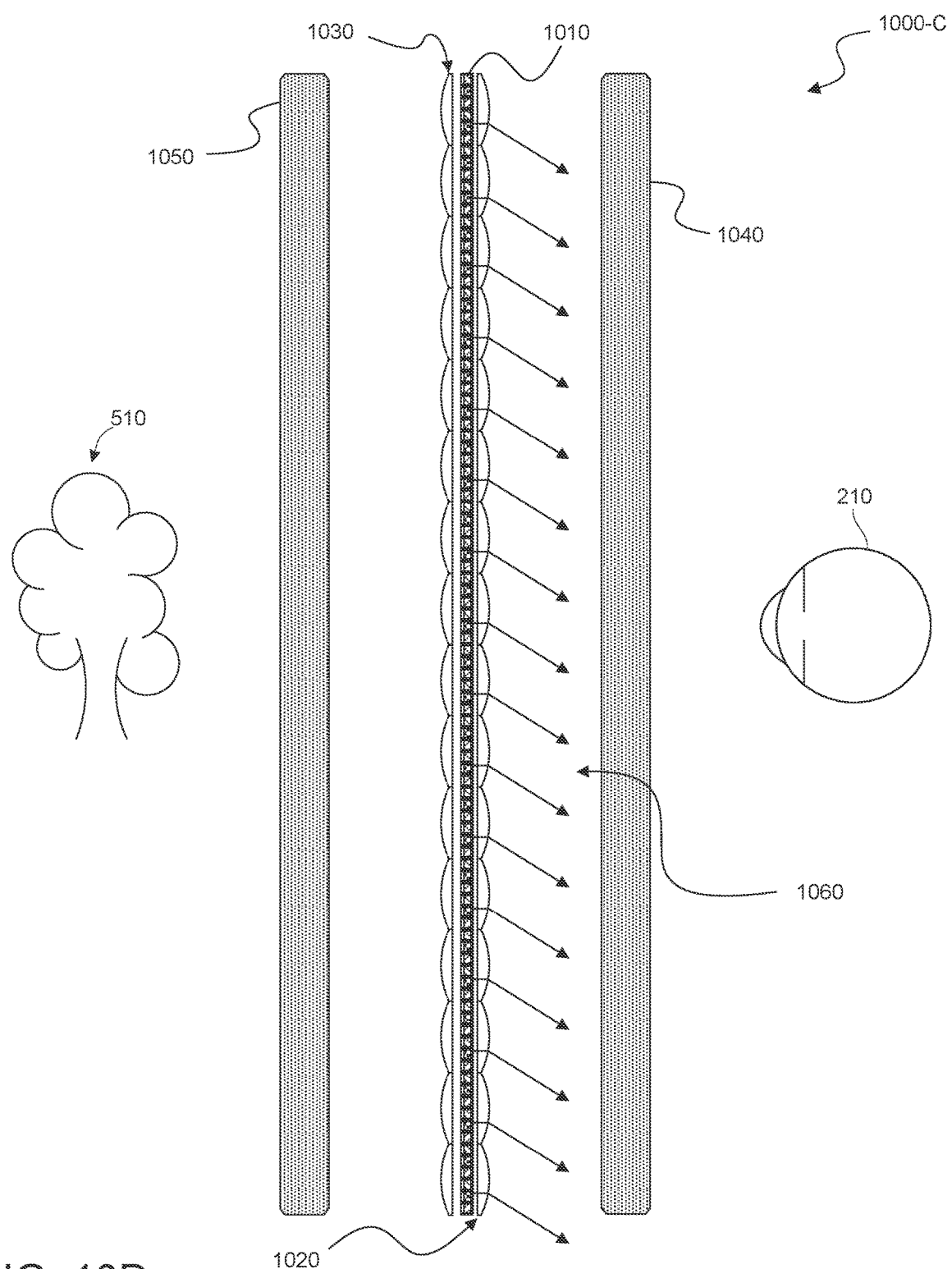
FIG. 10D illustrates a eyepiece similar to that shown in FIG. 10B wherein the transparent emissive display is disposed between a pair of lens arrays as well as a pair of variable focus optical elements.

As illustrated in FIG. 10D, the system 1000-B may include a first mode of operation in which an array of output beamlets 1060 are produced by illuminating the same pattern of pixels behind respective lenslets or lenses of the proximal lens array 1020. As a result, the angle of light output from the plurality of lenses in the array is the same and an entire grid or array of similar angled beamlets 1060 may be produced for each angular component. This approach is similar to the wavefront produced by the waveguide-based eyepiece shown in FIGS. 7 and 9A-9D. Such a configuration enables increased tolerance in the positioning of the eye without loss of image content.

Figure 10E:
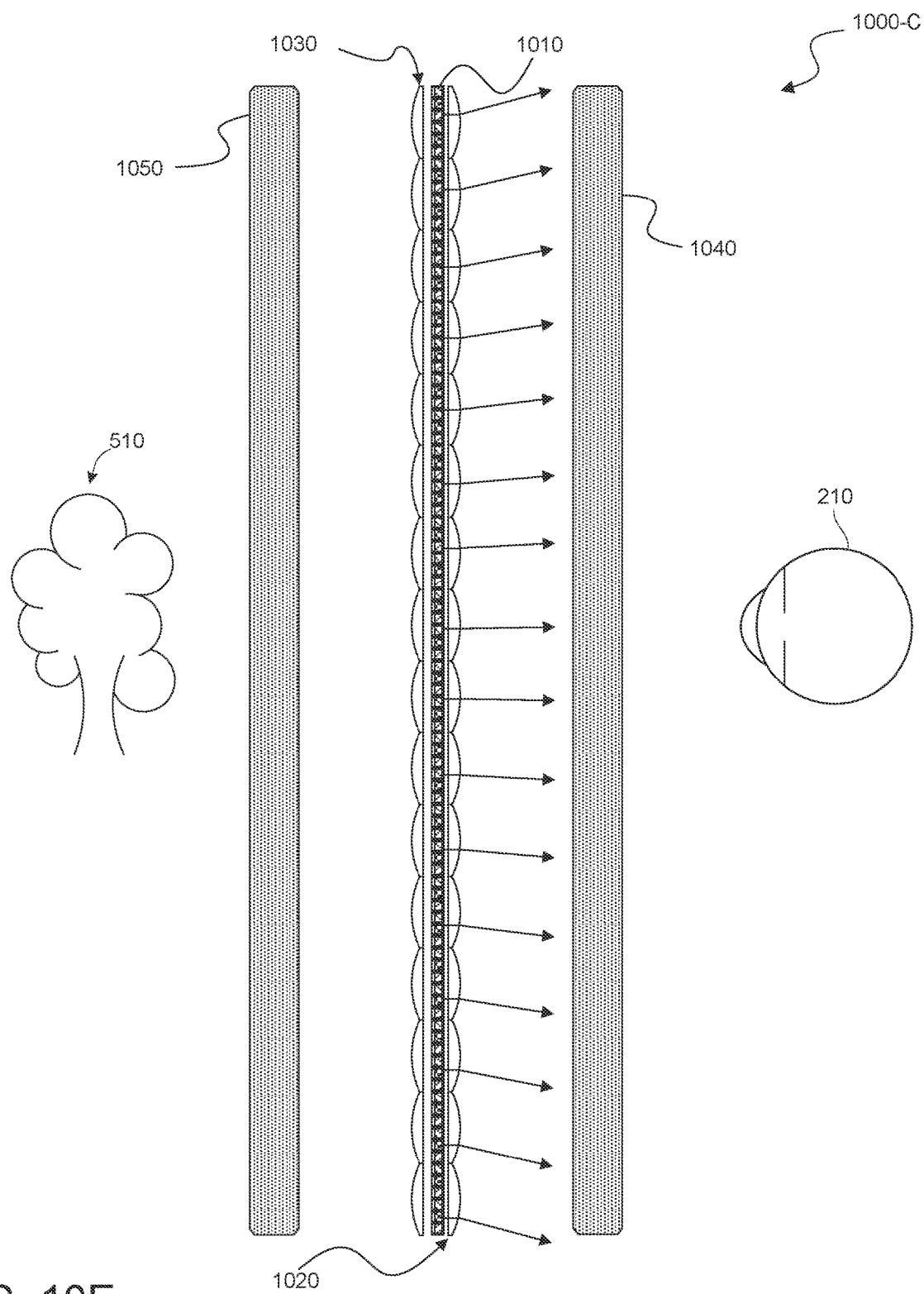
FIG. 10E shows a second different mode of operation of the augmented reality display of FIG. 10E, wherein a different pattern of pixels is illuminated behind respective lenses of the array of lenses. As a result, FIG. 10E show that the angle of light output from the plurality of lenses in the array is not the same. Instead, angular components vary across the array of lenslets. The system is configured, however, such that the different lenses provide a different perspectives of the image content presented.

Further, as illustrated in FIG. 10E, the system 1000-B may include a second or alternative mode of operation in which a different pattern of pixels are illuminated behind respective lenslets. As a result, the angle of light output from the plurality of lenses in the array is not the same. Instead, angular components vary across the array of lenslets. The system is configured, however, such that the different lenses provide different perspectives of the image content presented. A given point in 3D space may be represented using angular components that vary across the proximal lens array 1020. The system may be considered to produce a "4D" light field.

Figure 10F:
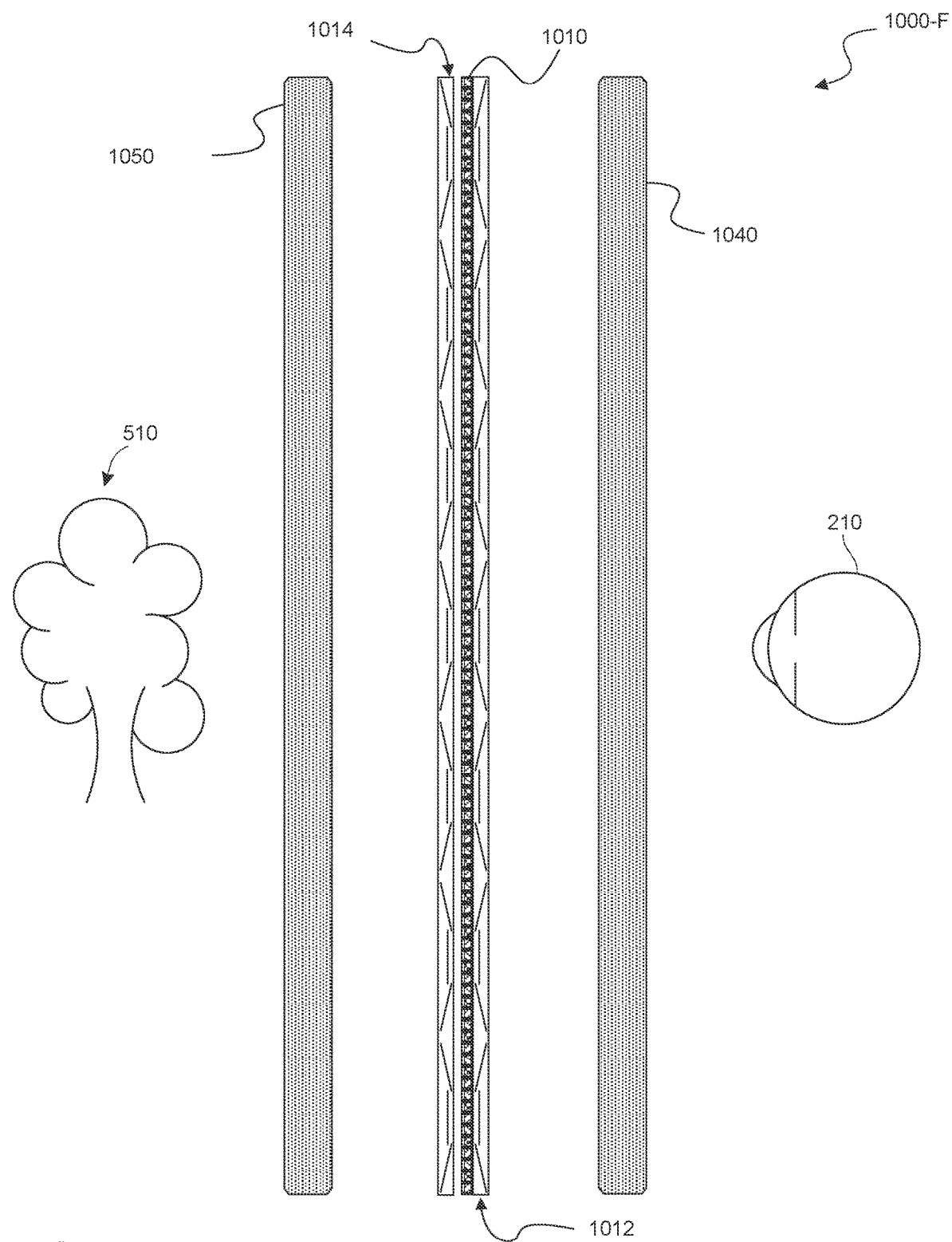
FIG. 10F illustrates an example of an augmented reality display including an eyepiece having a transparent emissive display located between a pair of waveplate lens arrays, the waveplate lens arrays located between a pair of variable focus optical elements.

Referring to FIG. 10F, in some designs, the eyepiece includes a system 1000-F that includes an inner (or proximal) diffractive waveplate lens or lenslet array 1012 and an outer (or distal) diffractive waveplate lens or lenslet array 1014. Similar to examples discussed above, FIG. 10F shows an eyepiece that comprises a transparent emissive display 1010, a proximal variable focus optical element 1040, and a distal variable focus optical element 1050. In FIG. 10F, however, the eyepiece has inner and outer diffractive waveplate lens arrays 1012, 1014 instead of a proximal and distal lens arrays 1020, 1030 such as shown in FIG. 10B. Some examples of diffractive waveplate lenses or lens arrays comprise liquid crystal. Diffractive waveplate lenses or lens arrays may provide optical power and thus cause the divergence or convergence of polarized light. In some cases the diffractive waveplate lenses or lens array converge light of one polarization and diverge light of another polarization because the diffractive waveplate lenses have different (e.g., opposite) optical power for different polarizations. The diffractive waveplate lenses or lenslets may also transform (e.g., rotate) the polarization of light incident thereon. Diffractive waveplate lenses are discussed below, for example, in the section under the heading Lenses, Variable Focus Lens Elements, and Other Configurations for Providing Optical Power and also in U.S. Provisional Patent Application No. 62/518,539 filed on Jun. 12, 2017, and U.S. patent application Ser. No. 16/006,080 filed on Jun. 12, 2018, published on Dec. 13, 2018 as U.S. Publication No. 2018/0356639, which are incorporated herein by reference in their entirety. The inner lens 1016 may be positioned in an optical path of the user between the transparent emissive display 1010 and proximal variable focus optical element 1040. The inner lens 1016 may be configured to modify the divergence of light emitted from the transparent emissive display 1010. For example, the inner lens 1016 may have a focal length, f, and may be disposed a this focal distance, f, away from the transparent emissive display 1010 such that light emitted from the emitters in the transparent emissive display are collimated.

The outer (or distal) waveplate lens or lenslet array 1014 may be positioned in an optical path of the user between the transparent emissive display 1010 and the distal variable focus optical element 1050. The outer waveplate lens array 1014 may be substantially similar to the inner waveplate lens array 1012. For example, the inner waveplate lens array 1012 may have positive optical power that will modify the wavefront of the light from the surrounding environment 510 and, thereby adversely affect the user's view of the world. To reduce such effects, the outer waveplate lens array 1014 may be positioned between the transparent emissive display 1010 and the environment 510. In some implementations, for example, the outer waveplate lens array 1014 has equal and opposite optical power as the inner waveplate lens array 1014. For instance, if the inner waveplate has a focal length, f, and is disposed a distance, f, from the transparent emissive display as discussed above, the outer waveplate lens array may also have a focal length, f. The outer waveplate lens array may also be disposed a focal length away from the transparent emissive display in some cases. Accordingly, the outer waveplate lens array and the inner waveplate lens array may form an afocal system. Accordingly, as used herein, in some cases, the outer waveplate lens array may be referred to as an afocal lens array. Similarly, the inner waveplate lens array may be referred to as an afocal lens array.

Figure 10G:
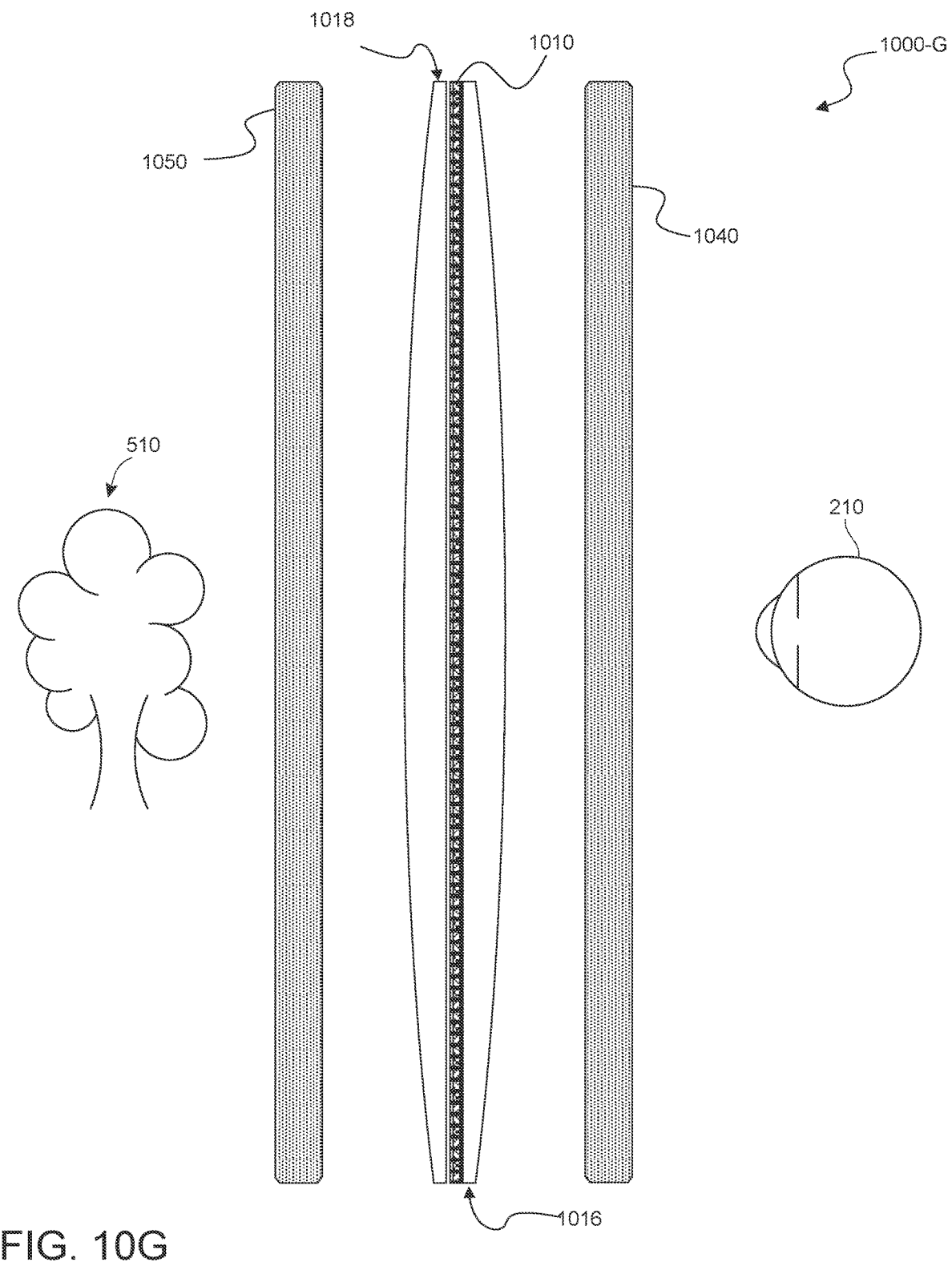
FIG. 10G illustrates an example of an augmented reality display including an eyepiece having a transparent emissive display located between a pair of lenses (e.g. afocal lenses). The pair of lenses (e.g., afocal lenses) are located between a pair of variable focus optical elements.

Referring to FIG. 10G, for some designs, the eyepiece includes a system 1000-G that includes an inner (or proximal) lens 1016 and an outer (or distal) lens 1018 instead of a proximal and distal lens arrays 1020, 1030 such as shown in FIG. 10B. The system 1000-G includes a transparent emissive display 1010, a proximal variable focus optical element 1040, and a distal variable focus optical element 1050 substantially similar to (or different than) those described above with reference to FIG. 10A. However, instead of lenslet arrays comprising, for example, microlenses, a larger (e.g., single) lens may be used on the proximal and distal sides of the transparent emissive display. As shown, the inner (or proximal) lens 1016 may be positioned in an optical path of the user between the transparent emissive display 1010 and proximal variable focus optical element 1040. The inner lens 1016 may be configured to modify the divergence of light emitted from the transparent emissive display 1010.

The outer (or distal) lens 1018 may be positioned in an optical path of the user between the transparent emissive display 1010 and the distal variable focus optical element 1050. The outer lens 1018 may be substantially similar to the inner lens 1016. The inner lens 1016 may modify the wavefront of the light from the surrounding environment 510 and, thereby affect in the user's view of the world. To compensate for such effects, the outer lens 1018 may be positioned between the transparent emissive display 1010 and the environment. In various examples, the inner lens 1016 will be positive and the outer lens 1018 will be negative. Accordingly, the outer lens 1018 may be concave (although it is shown as convex in FIG. 10G). In various implementations, the inner lens 1016 can comprise a single lens. Similarly, in various implementations the outer lens 1018 can comprise a single lens. In some implementations, the inner lens 1016 and/or outer lens 1018 may be disposed a focal length from the transparent emissive display and may form an afocal lens system such as described above. Accordingly, as used herein, in some cases, the outer lens may be referred to as an afocal lens. Similarly, the inner lens may be referred to as an afocal lens.

Although a lens, for example, single lens (e.g., single refractive lens), is shown on each side of the transparent emissive display, as discussed above with regard to FIG. 10C, the outer lens may be excluded in some designs. Also different types of lenses may be employed.

Accordingly, the lenses closest to the transparent emissive display, for example, the proximal (or inner) lens, lenses, or lenslet array as well as the distal (or outer) lens, lenses, or lenslet array may either or both comprise refractive lenses, diffractive lenses, waveplate lenses, metamaterial lenses, liquid crystal lenses (e.g., cholesteric liquid crystal lenses), etc. For example, these lenses may comprise, diffractive/metamaterial lenses, diffractive lens or lenslet arrays, diffractive waveplate lenses, diffractive waveplate lens or lenslet arrays, diffractive liquid crystal lenses, diffractive liquid crystal lens or lenslet arrays, diffractive liquid crystal waveplate lenses, diffractive liquid crystal waveplate lens or lenslet arrays, reflective liquid crystal lenses, reflective waveplate lenses, reflective liquid crystal waveplate lenses, reflective lens or lenslet arrays, reflective liquid crystal lens or lenslet arrays, reflective waveplate lens or lenslet arrays, reflective liquid crystal waveplate lens or lenslet arrays, cholesteric liquid crystal reflective waveplate lens or lenslets arrays, cholesteric liquid crystal reflective waveplate lenses etc.). In some cases, these lenses may be wavelength selective and may selectively operate (e.g., reduce divergence, collimate, etc.) on wavelengths matched to or corresponding to the wavelength of the emitters in the transparent emissive display.

Figure 10H:
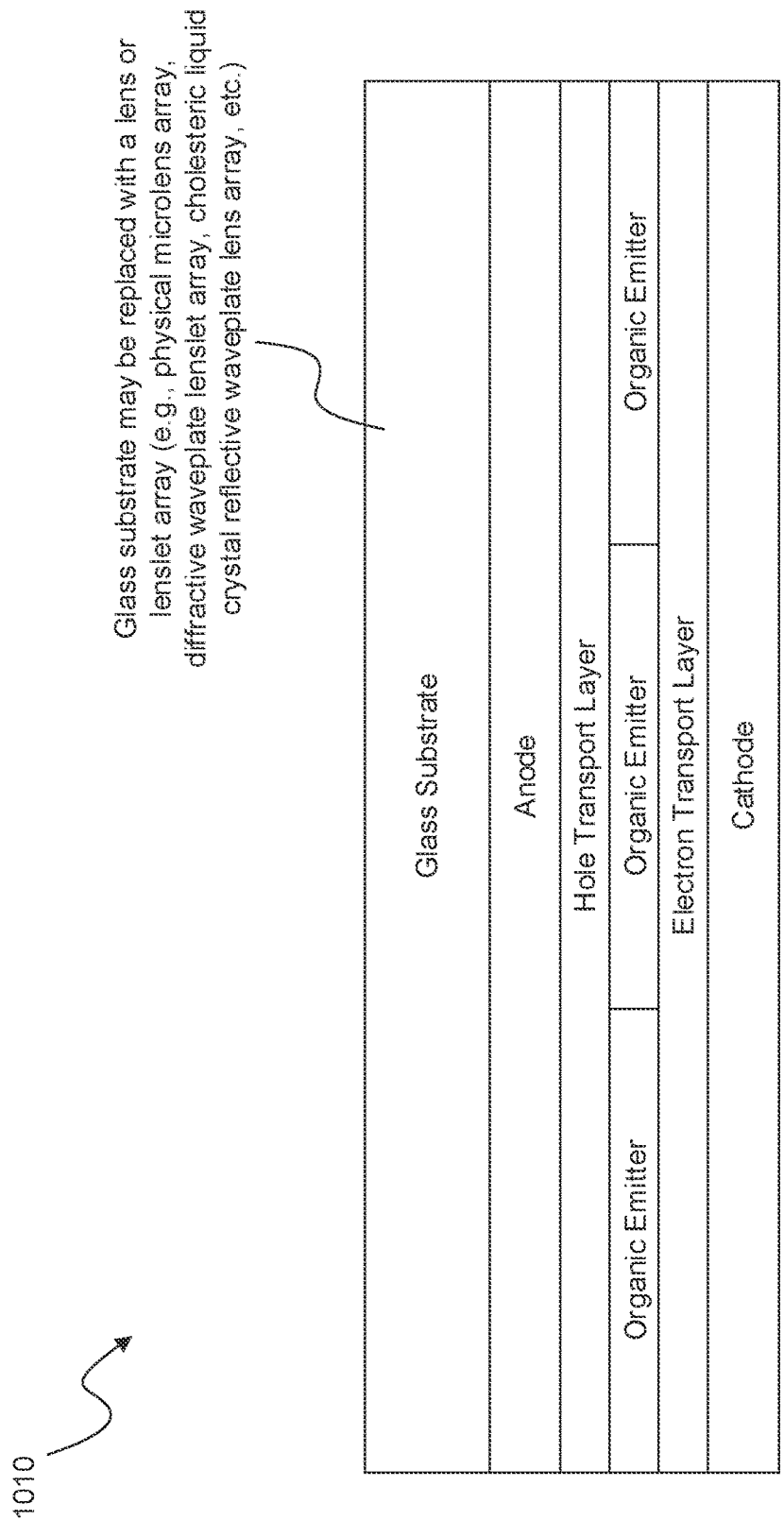
FIG. 10H illustrates an example portion of a transparent emissive display such as shown in FIGS. 10A-10G.

FIG. 10H illustrates a cross-sectional view of an example portion of a transparent emissive display such as shown in FIGS. 10A-10G. Referring to FIG. 10H, in some implementations, the transparent emissive display comprises electrodes such as an anode and cathode on either side of the emitters. One or both of these electrodes may, in some examples, each comprise one or more layers of indium tin oxide ("ITO") or other transparent conductive material. These electrodes provide electrical connection to the transparent emissive display 1010 and in particular to the emitters. In some designs, the emitters may further be surrounded on either side by a hole transport layer and an electron transport layer. The transparent emissive display 1010 may further comprise a glass substrate, for example, for structural support. The glass substrate may be replaced with other elements such as an optical element that can provide structural support such as a lens or lenslet array (e.g., physical microlens array, diffractive waveplate lenslet array, cholesteric liquid crystal reflective waveplate lens array, or lenses etc.). In some implementations, the transparent emissive display 1010 of FIG. 10H may further include one or more reflective or partially reflective optical elements layered adjacent the outer surface of the cathode. In some embodiments, the cathode may, itself, be reflective or partially reflective.

FIG. 11 illustrates another system 1100 comprising a transparent emissive display 1010, a proximal lens array 1020, a distal lens array 1030, a proximal variable focus optical element 1040, and a distal variable focus optical element 1050. These elements can be substantially similar to those described above with reference to FIG. 10. Additionally, however, the system 1100 further comprises a distal occluder 1110 disposed in an optical path between the transparent emissive display 1010 and the environment 510 in front of the user. More specifically, the distal occluder 1110 may be positioned between the distal variable focus optical element 1050 and the environment 510. In some embodiments, the distal occluder 1110 comprises a spatial light modulator comprising a plurality of pixels. For instance, the distal occluder 1110 may comprise a liquid crystal spatial light modulator. The distal occluder 1110 may have an electrical input configured to receive an electrical signal to selectively alter the transmissive state of the pixels. In certain configurations, the system 1110 further comprises electronics electrically coupled the electrical input of the spatial light modulator to cause one or more pixels on the spatial light modulator to be transmissive while other pixels are opaque to selectively block portions of the view of the environment in front of the user. The electronics may therefore be able to modify the view of the environment seen by the user, controlling, for example, what of objects in the environment are visible to the user. Additionally, image content can be presented to the user using the transparent emissive display.

In some implementations, the system 1110 further comprises a proximal lens 1120 and a distal lens 1130. The distal lens 1130 may be configured to focus light from the environment onto pixels of the distal occluder 1110. The distal lens 1130 may have a focal length and the distal occluder 1110 may be positioned a distance from the distal lens 1130 corresponding to the focal length, that is, the distal occluder 1110 may be positioned at or along the focal plane of lens 1130. In this way, the system can selectively occlude specific angular components of incoming light from the environment. The purpose of the proximal lens 1120 is to form an afocal lens pair with distal lens 1130. The optical power of proximal lens 1120 may be the same as that of distal lens 1130 and the distal occluder 1110 and distal lens 1130 may be separated from each other by the focal length of the distal lens (such that the distal occluder is also positioned at or along the focal plane of lens 1130). In some implementations, the distal occluder 1110 and proximal lens 1120 may be separated from each other by the focal length of the proximal lens (such that the distal occluder is also positioned at or along the focal plane of lens 1120). In this way, the system, for example, the distal occluder 1110, can simply strip light from the environment of specific angular components (without modifying the light from the environment in other ways) before the light reaches system 1000. The proximal lens 1120 may be positioned in an optical path between the distal occluder 1110 and the distal variable focus optical element 1050. The distal lens 1130 may be positioned between the distal occluder 1110 and the environment 510. These lenses may have positive optical power. As illustrated, these lenses may be convex such as bi-convex or possible plano convex. Alternative types of lenses may be used. Other combinations of lenses (different types, optical powers, spacing between lenses) can be used. In various implementations, the selections are such that the lenses form an afocal system. In some implementations, it may be desirable to fold this afocal system or otherwise reconfigure this system for the purposes of saving space. For instance, one or more mirrors or reflectors may be employed so as to redirect incoming light from and/or toward optical elements along a folded optical path.

Figure 12A:
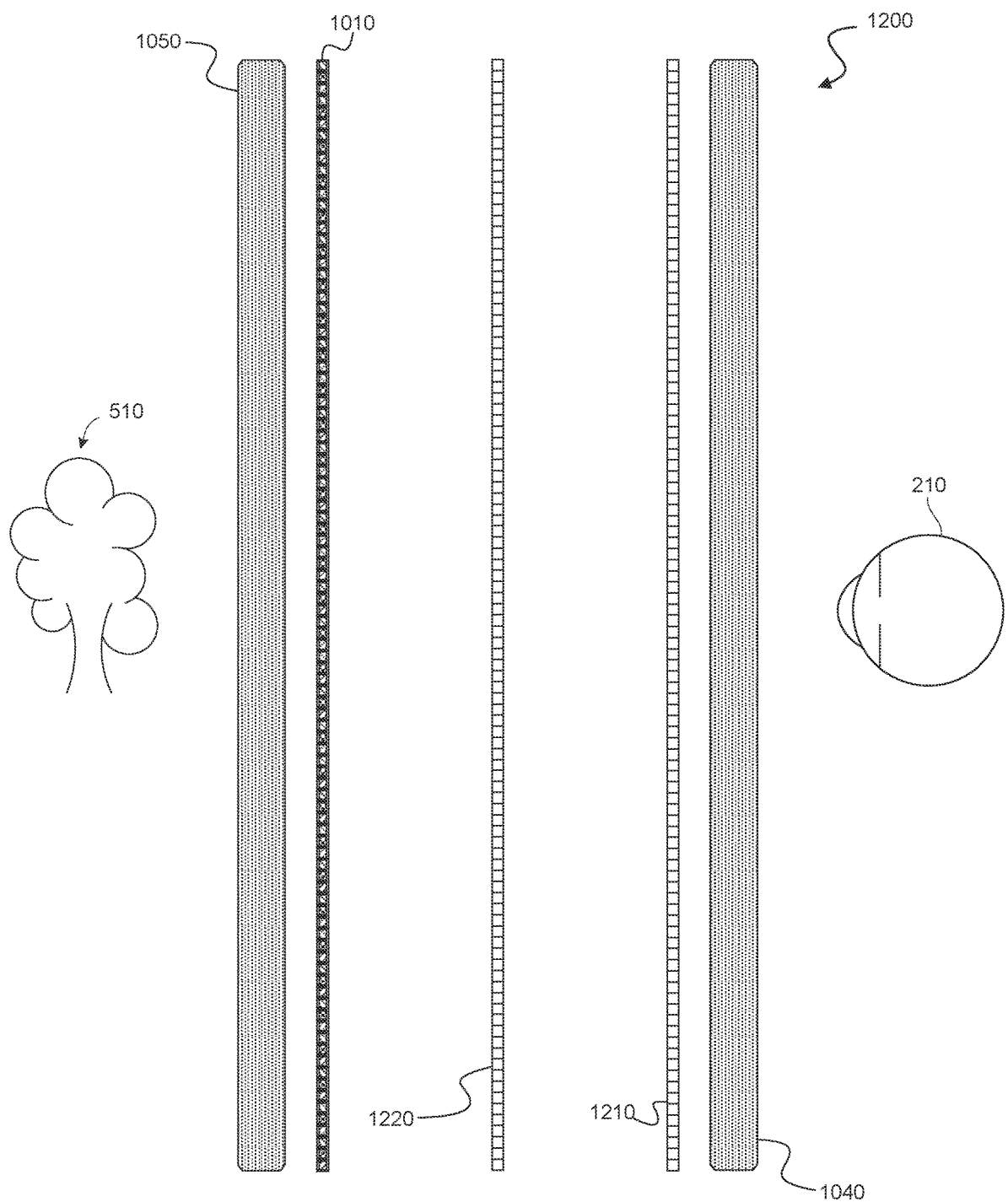
FIG. 12A illustrates an example of an augmented reality display including a transparent emissive display and a pair of occluders configured to select angles of light emitted from the transparent emissive display that correspond to desired image locations. The occluders comprise a plurality of pixels, each capable of switching between transparent and opaque in response to electrical signals.

Other configurations are possible. FIG. 12, for example, shows a system 1200 including plurality of occluders 1210, 1220 that are used to select light of the proper angle to form the desired image in the user's eye. Similar to the systems discussed above, the system 1200 shown in FIG. 12 comprises a transparent emissive display 1010, a proximal variable focus optical element 1040, and a distal variable focus optical element 1050. The transparent emissive display 1010, proximal variable focus optical element 1040, and distal variable focus optical element 1050, can be substantially similar to (or different from) those described above with reference to FIG. 10. As referred to above, the system 1200 further comprises a pair of occluders, for instance, a first occluder 1210 and a second occluder 1220. The structure of the occluders may be substantially similar to the distal occluder 1110 described above with reference to FIG. 11. For example, the occluder 1110 may comprise a spatial light modulator comprising a plurality of pixel elements that can be selectively altered to either transmit light or reduce transmission of light (e.g., block transmission of light). The spatial light modulator may comprise, for example, a liquid crystal spatial light modulator. This spatial light modulator may be configured to vary the intensity of light transmitted through different pixel elements. The spatial light modulators may include electrical inputs to control the state of the individual pixel elements and the intensity level of light transmitted therethrough. Accordingly, by using electronics electrically coupled to the electrical inputs on the first spatial light modulators 1210, 1220, one or more pixel elements on the first spatial light modulator 1210 may be made transmissive while surrounding pixels are pixel elements are opaque and one or more pixel elements on the second spatial light modulator 1220 may be made transmissive while surrounding pixels on the second spatial light modulator 1220 are opaque. The one or more pixel elements on the first spatial light modulator 1210 that are made transparent (and that are surrounded by opaque pixel elements) as well as the one or more pixel elements on the spatial light modulator 1220 that are made transparent (and that are surrounded by opaque pixel elements) may be aligned along a linear optical path that is disposed to receive light from one or more pixels or emitters on the transparent emissive display that are set to emit light. As a result of the alignment of these pixel elements on the first and second spatial light modulators 1210, 1220, with each other and with light emitted from emitting pixels in the transparent emissive display, light of a certain angular direction emitted from the transparent emissive display 1010 propagates both through the aligned transmissive pixels of the first spatial light modulator 1210 and second spatial light modulator 1220. These particular angles may map to specific locations in the eye, e.g., certain locations on the retina, and thus may correspond to certain positions on image formed in the eye (e.g., on the retina). Accordingly, by coordinating the color and intensity of light from selected pixels/emitters in the transparent emissive display with the one or more pixel elements on the first and second spatial light modulators 1210, 1220 that are made transparent and properly aligned to collect light of a particular angle from the transparent emissive display, the color and brightness of specific portions of the image may be established in the image formed in the eye. The electronics in communication with the transparent emissive display and the first and second occluders 1210, 1220, can be configured to cycle through different pixels/emitters in the transparent emissive display as well as properly selected pixel elements on the first and second occluders, to selectively propagate light from the emitting pixel(s) of particular angles that correspond to specific locations on the image formed in the eye. Likewise, the color and intensity of light emitted from the different pixels on the transparent emissive display may be varied to produce the corresponding variation in color and intensity on respective conjugate image locations on the image to formed in the eye. The desired image may thus be presented into the eye. Accordingly, the electronics may be configured to properly coordinate the emission of selected pixels/emitters on the transparent emissive display with transmission of light through the appropriate pixel elements on the first and second occluders 1210, 1220 at the proper sequence in time to create the desired image.

In addition to blocking light from emitters on the transparent emissive display, the opaque pixel elements in the occluders may also block light from the environment 510. Thus, in some implementations, the occluders' pixels may be operated at a frequency sufficiently high that light from the environment 510 is visible to the user while the occluders also selectively transmit light of the appropriate angles of light from the transparent emissive display 1010 at the proper time to form images in the user's eye. This frequency may be higher than can be detected by the human eye. This frequency may, for example, be 60 Hz or more. The frequency at which the transmissive state of the pixels (as well as the frequency at which the emitters in the transparent emissive display are emitting light) can be sufficiently high such that objects in the environment are visible and the user has the impression that the image is in the environment amid these objects in the environment. In some implementations, therefore, the frequency of operation of the occluders and the transparent emissive display may be selected to provide the desired level of visibility to the environment as well as of image content superimposed thereon. Likewise, the transparent emissive display 1010 is coordinated with the pair of occluders 1210, 1220 such that the transparent emissive display emits from the appropriate pixel(s)/emitter(s) at the same time that the appropriate pixel elements in the occludes are in transparent states. At other times, however, the emitters in the emissive display may be set to reduce emission or not emit visible light while the pixel elements in the occluders are set to a transparent state so that the user can see the environment.

In some configurations, a single occluder may be used as opposed to a pair of occluders. In this approach (or some other time-multiplexing-based approach), the occluder may be positioned relatively close to the transparent emissive display. To the extent that multiple regions of pixels are to be illuminated simultaneously, those regions of pixels may be substantially separated from each other (e.g., regions of pixels that are positioned at least a predetermined Euclidean distance from each other). In some implementations, the occluder has a relatively high resolution.

Figure 12B:
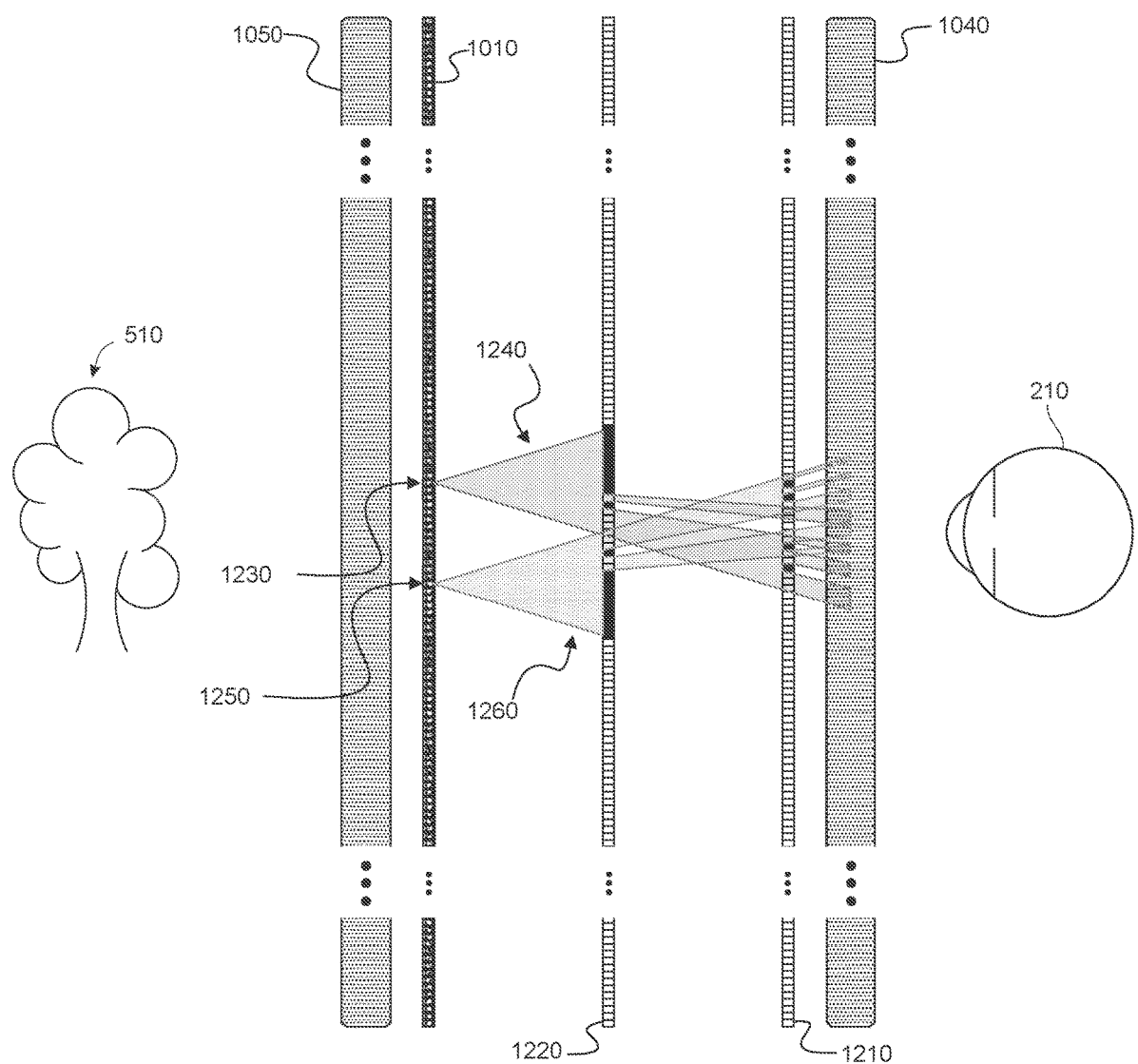
FIG. 12B illustrates an example path of rays emitted by the transparent emissive display of FIG. 12A. Some of the light rays are blocked pixels in the occluders that are in an opaque state while some of the rays are propagated through pixels in the occluders that are in a transparent state.

FIG. 12B illustrates an example of light emitted from pixels in the transparent emissive display 1010 being selectively transmitted through transparent pixels in the occluders. First and second emitters 1230, 1250, for example, emit light in the direction of the user's eye 210, however, are incident on occluders 1220, 1210. In this example, the first and second occluders 1220, 1230 each comprise opaque and transparent pixels. As illustrated, at least a portion of the emissions from the first and second emitters 1230, 1250 is blocked by opaque pixels in the first and second occluders 1220, 1210. However, some of the light is transmitted through transparent pixels. As such, light with the appropriate angle is selectively allowed to pass the pair of occluders 1220, 1210 and reach the proximal variable focus optical element 1040 while light of other angles is blocked. As discussed above, these angles may correspond to light from particular portions of an object and also to similar locations on the conjugate image on the retina.

Figure 13:
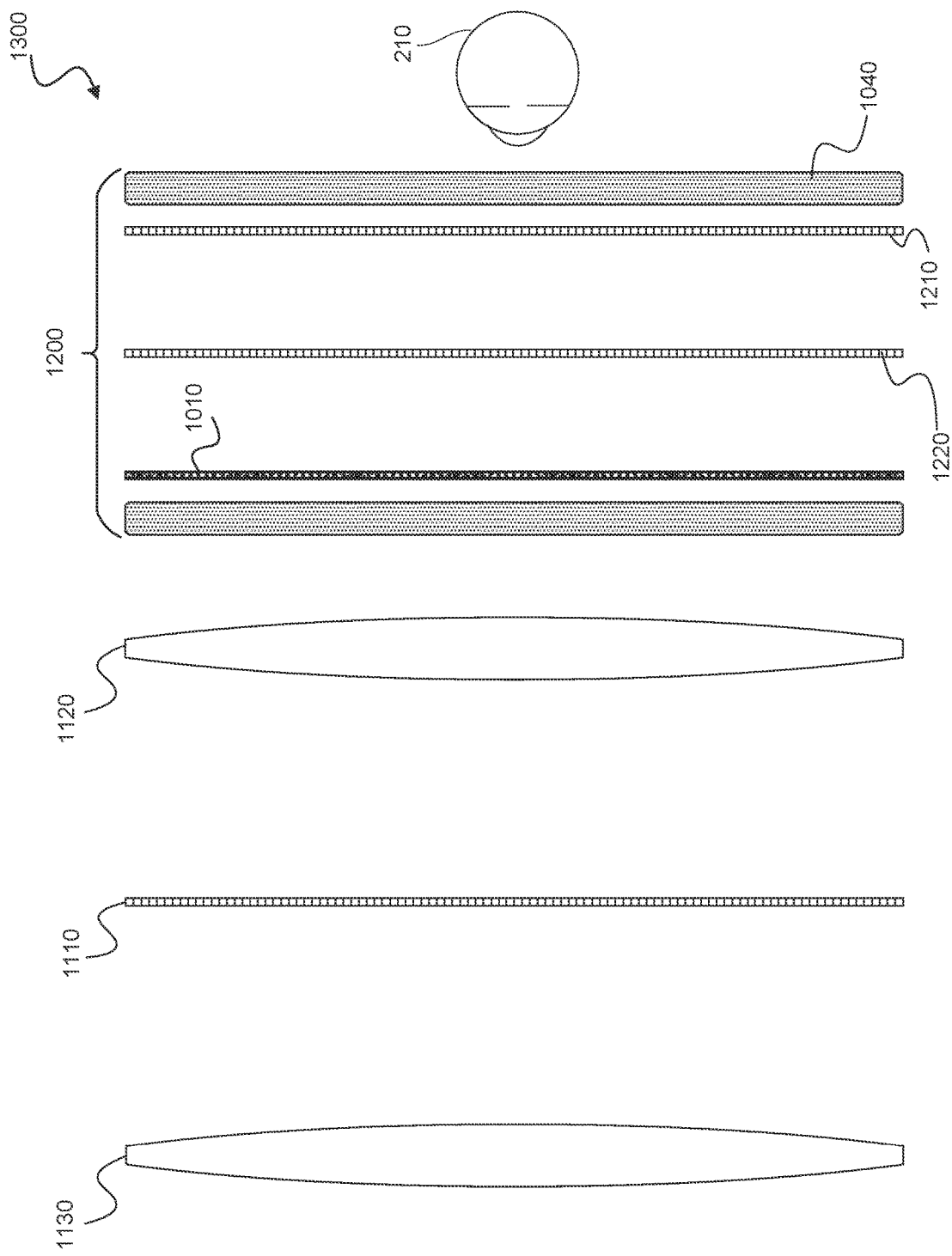
FIG. 13 illustrates the augmented reality display of FIG. 12, further comprising an occluder configured to block light from certain objects in the outside world.

An additional occluder 1110 similar to that shown in FIG. 11 can be added to the system such as shown in FIG. 13. FIG. 13 illustrates a system 1300 similar to that shown in FIG. 12 that comprises a transparent emissive display 1010, a proximal variable focus optical element 1040, a distal variable focus optical element 1050, a first occluder 1210 and a second occluder 1220. These elements can be substantially similar to (or different than) those described above with reference to FIG. 12. The system 1300 may, however, further comprise a distal occluder 1110 on the distal side of the transparent emissive display 1010 (e.g., between the transparent emissive display and the environment in front of the user). This distal occluder 1110 may comprise a spatial light modulator having a plurality of pixel elements that can be selectively set to either a transparent or transmissive optical state or alternatively, an opaque non-transmissive or non-transparent state. In some implementations, in situations where the occluders 1210 and 1220 of system 1300 are operated at a particular frequency (e.g., 60 Hz or more), for example, faster than the human eye can discern, the occluder 1110 of system 1300 may be operated using DC or non-PWM control signals such that occluder 1100 may be held in a relatively steady state (e.g., does not flicker). Accordingly, certain pixel elements may be selected to be transparent while other pixel elements may be set to be opaque so as to allow certain portions of the environment to be visible while the view of other portion(s) of the environment are blocked. Accordingly, in some implementations, the distal occluder 1110 can be substantially similar to the distal occluder described in FIG. 11. In some implementations, the distal occluder 1110 may comprise a liquid crystal spatial light modulator.

In some configurations such as shown, the system may further comprise a distal lens 1130 and a proximal lens 1120 on opposite sides of the distal occluder 1110. The distal and proximal lenses 1120, 1130 may be substantially similar to those described above. These lenses 1130, 1120 may have positive optical power. In some implementations, these lenses 1130, 1120 may be convex lenses such as bi-convex lenses. The distal and proximal lenses 1130, 1120 may comprise other types of lenses as described above.

Figure 14:
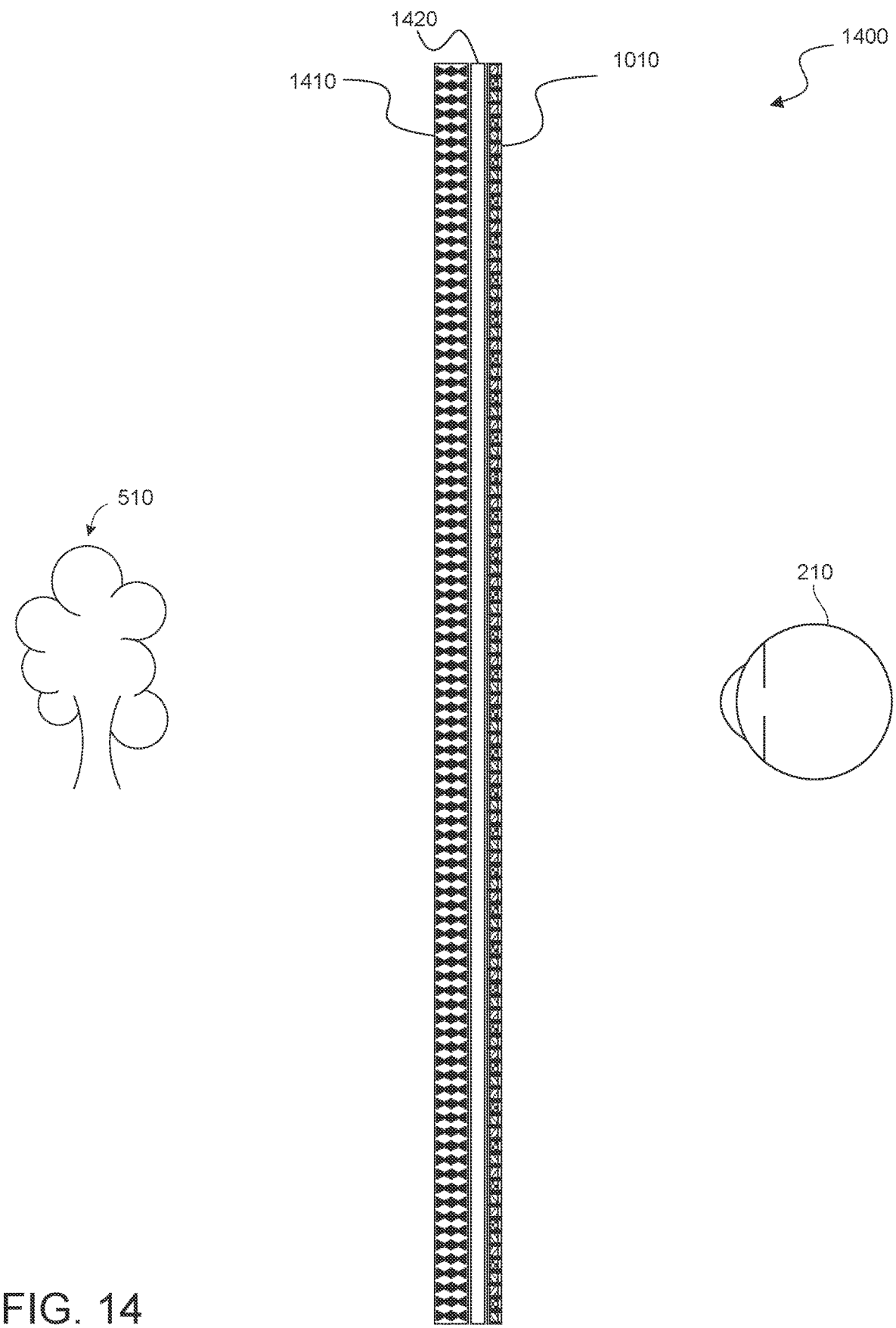
FIG. 14 illustrates an example of an augmented reality display including an eyepiece having a backward-facing transparent emissive display, a quarter waveplate or quarter-wave retarder, and a reflective waveplate lenslet array.

FIG. 14 illustrates another augmented reality display system 1400 comprising a backward-facing transparent emissive display 1010 and a reflective waveplate lens or lenslet array 1410. The backward-facing transparent emissive display can be substantially similar to the transparent emissive display 1010 described above with reference to FIG. 10A except that the backward-facing transparent emissive display is oriented such that light is emitted toward the environment instead of toward the user. The reflective waveplate lenslet array 1410 may be disposed in an optical path between the transparent emissive display 1010 and the environment 510 in front of the user such that light emitted by the transparent emissive display is reflected from the reflective waveplate lenslet array 1410 back to the transparent emissive display. Some or virtually all of this light is transmitted through the transparent emissive display 1010 to the eye 210.

As discussed above, some examples of diffractive waveplate lenses or lens arrays comprise liquid crystal. Diffractive waveplate lenses or lens arrays may provide optical power and thus cause the divergence or convergence of polarized light. In some cases, the diffractive waveplate lenses or lens array converge light of one polarization and diverge light of another polarization because the diffractive waveplate lenses have different (e.g., opposite) optical power for different polarizations. The diffractive waveplate lenses or lenslets may also transform (e.g., rotate) the polarization of light incident thereon. Diffractive waveplate lenses are discussed below, for example, in the section under the heading Lenses, Variable Focus Lens Elements, and Other Configurations for Providing Optical Power and also in U.S. Provisional Patent Application No. 62/518,539 filed on Jun. 12, 2017, and U.S. patent application Ser. No. 16/006,080 filed on Jun. 12, 2018, published on Dec. 13, 2018 as U.S. Publication No. 2018/0356639, which are incorporated herein by reference in their entirety. In some implementations, the reflective waveplate lenslet array 1410 may comprise a cholesteric liquid crystal (CLC) reflective waveplate lenslet array. Alternatively, a CLC reflective waveplate lens may be used. Reflective liquid crystal lenses are discussed below, for example, in the section under the heading Lenses, Variable Focus Lens Elements, and Other Configurations for Providing Optical Power and also in U.S. patent application Ser. No. 15/902,927 filed on Feb. 22, 2018, published on Aug. 23, 2018 as U.S. Publication No. 2018/0239177, which is incorporated herein by reference in its entirety.

Accordingly, the reflective waveplate lens or lenslet array 1410 may have optical power, such as positive optical power, for example, to reduce divergence of light emitted by the emitters in the transparent emissive display. In some designs, for example, the reflective waveplate lenslet array 1410 may have a focal length and the emitters of the transparent emissive display may be disposed a distance away from the reflective waveplate lenslet array corresponding to this focal length such that light emitted by the emitters is collimated by the reflective waveplate lenslet array.

As discussed above, the waveplate lenses or lens array converge light of one polarization and diverge light of another polarization because the waveplate lenses have different (e.g., opposite) optical power for different polarizations. The waveplate lenses or lenslets may also transform (e.g., rotate) the polarization of light incident thereon. Accordingly, retarders may be included in the system to control the polarization. In the system shown in FIG. 14, for example, an optional quarter waveplate 1420 or quarter-wave retarder is disposed between the transparent emissive display 1010 and the reflective waveplate lenslet array 1410. (As used herein, a waveplate comprises a retarder and does not need to be a plate such as a rigid plate but can be thin and/or flexible, and may comprise, for example, one or more thin films or layers.)

Figure 15:
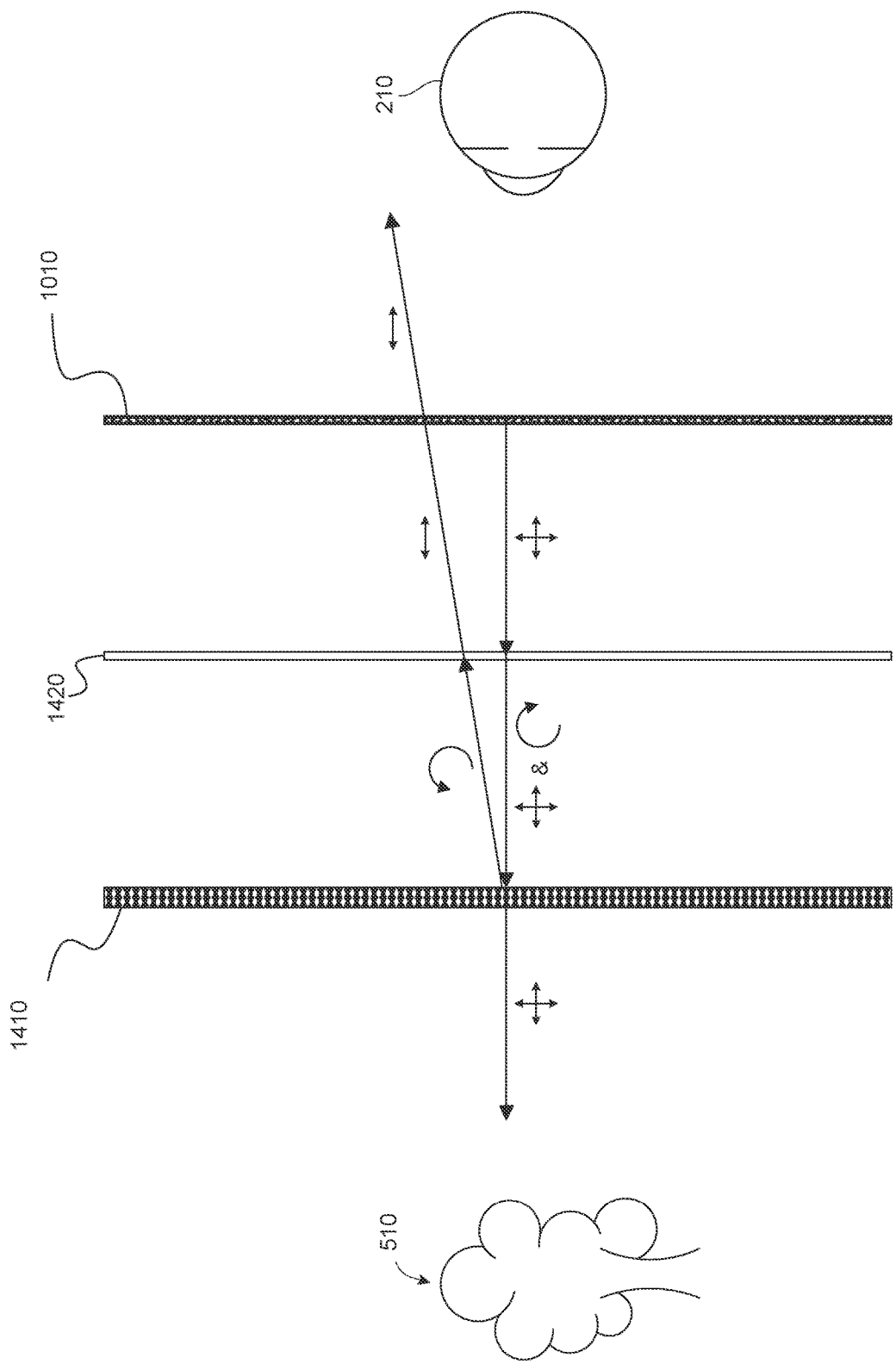
FIG. 15 illustrates an example operation of the augmented reality display of FIG. 14.

As illustrated in FIG. 15, the light emitted from the transparent emissive display will pass through the optional quarter waveplate 1420 twice, adding, a quarter wave of retardance on each pass or a total of a full wave of retardance on two passes. In this system, for example, linearly polarized light (e.g., horizontally polarized light) emitted from the emitters in the transparent emissive display 1010 upon passing through the optional quarter waveplate 1420 is transformed into circularly polarized light. This light is incident on the reflective waveplate lenslet array 1410 which exhibits positive optical power for circularly polarized light of this orientation. The reflective waveplate lenslet array 1410 transforms the reflected light into circularly polarized light of the opposite orientation. This circularly polarized light passes through the optional quarter waveplate 1420 again and is transformed back to linearly polarized light (e.g., vertically polarized light). The full wave of retardance introduced by the two passes through the optional quarter waveplate 1420 causes a rotation of the linear polarization. The light or a substantial portion thereof is transmitted through the transparent emissive display toward the user's eye.

Figure 16:
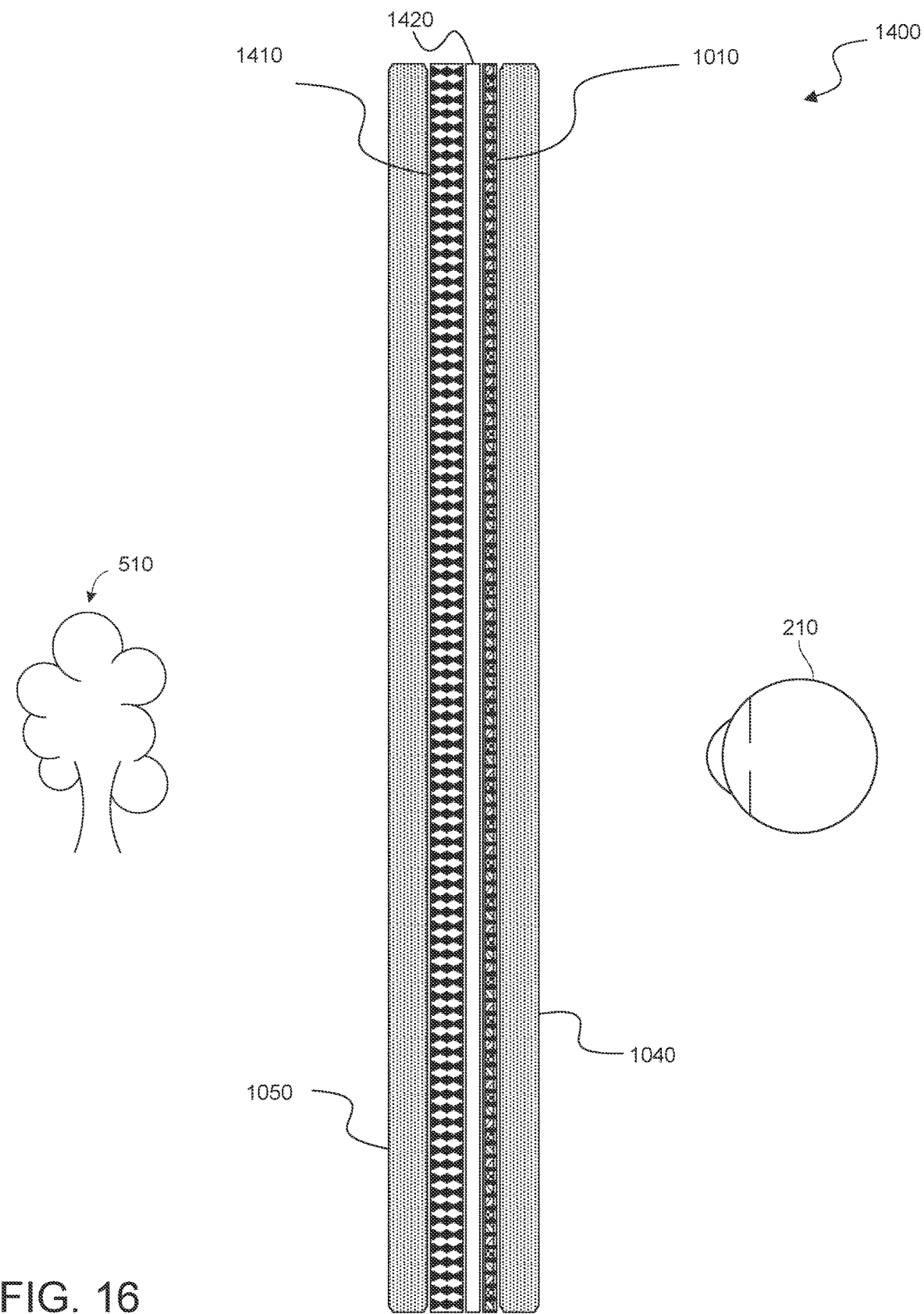
FIG. 16 illustrates the augmented reality display of FIG. 14 sandwiched between a pair of variable focus optical elements.

FIG. 16 illustrates the augmented reality display system 1400 similar to that shown in FIG. 15 further comprising a proximal and distal variable focus optical elements 1040, 1050 disposed in an optical path of the user on either side of the system 1400. The proximal and distal variable focus optical elements 1040, 1050 sandwich reflective waveplate lenslet array 1410, the optional quarter waveplate 1420, and the transparent emissive display 1010. The proximal and distal variable focus optical elements 1040, 1050 may be substantially similar to those described above.

Lenses, Variable Focus Lens Elements, and Other Configurations for Providing Optical Power In some embodiments, the variable focus lens elements may be adaptable optical elements. The adaptable optical elements may be dynamically altered, for example, by applying an electrical signal thereto, to change the shape of a wavefront that is incident thereon. In some embodiments, the adaptable optical elements may comprise a transmissive optical element such as a dynamic lens (e.g., a liquid crystal lens, an electro-active lens, a conventional refractive lens with moving elements, a mechanical-deformation-based lens, an electrowetting lens, an elastomeric lens, or a plurality of fluids with different refractive indices). By altering the adaptable optics' shape, refractive index, or other characteristics, the wavefront incident thereon may be changed, for example, to alter the focus of the light by the viewer's eyes, as described herein.

In some embodiments, the variable focus lens elements may comprise a layer of liquid crystal sandwiched between two substrates. The substrates may comprise an optically transmissive material such as, for example, glass, plastic, acrylic, etc. In some embodiments, the substrates may be flat. In some embodiments, the substrates may have curved regions such that portions of the substrates may have fixed optical power.

In some embodiments, the optical power of the variable focus lens elements may be varied by adjusting an electrical signal (e.g., current and/or voltage) applied to the liquid crystal layer via, e.g., one or more thin film transistors (TFTs) and/or electrodes integrated with the liquid crystal layer and/or the substrates. In some implementations, the orientations of liquid crystal species in the liquid crystal layer determines the refractive index of the layer. In various implementations, the applied electrical signal sets the orientation of the liquid crystal species, thereby allowing the refractive index of the liquid crystal layer to be varied as desired by altering the applied electrical signal.

Figure 17A:
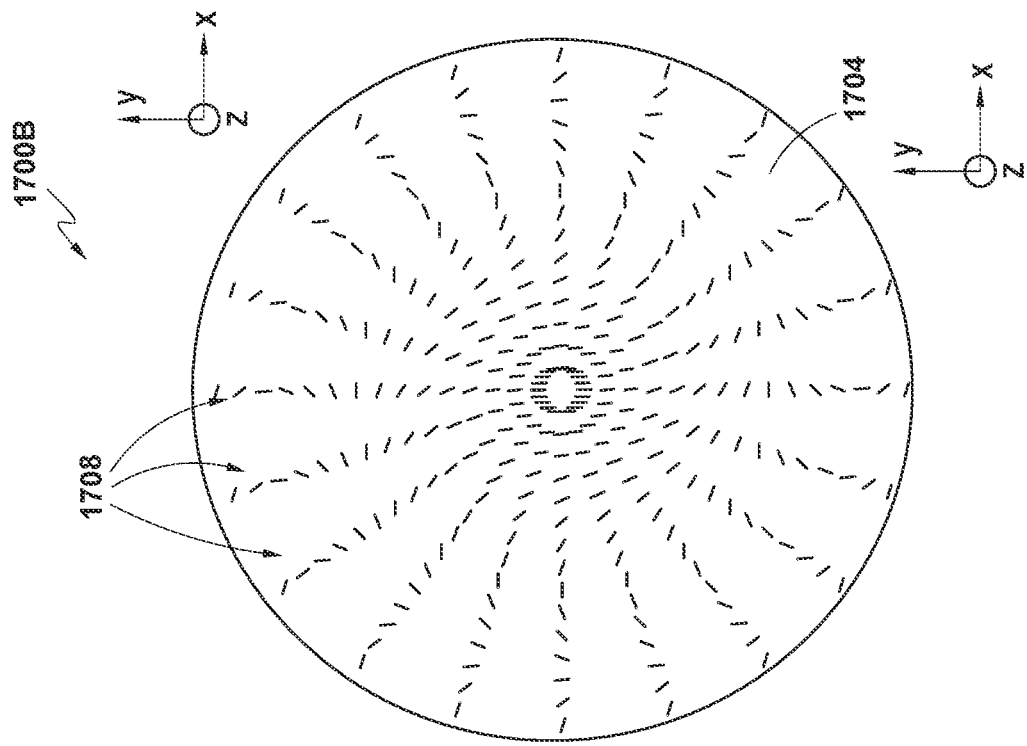
FIG. 17A illustrates an example of a waveplate lens comprising liquid crystals.
Figure 17B:
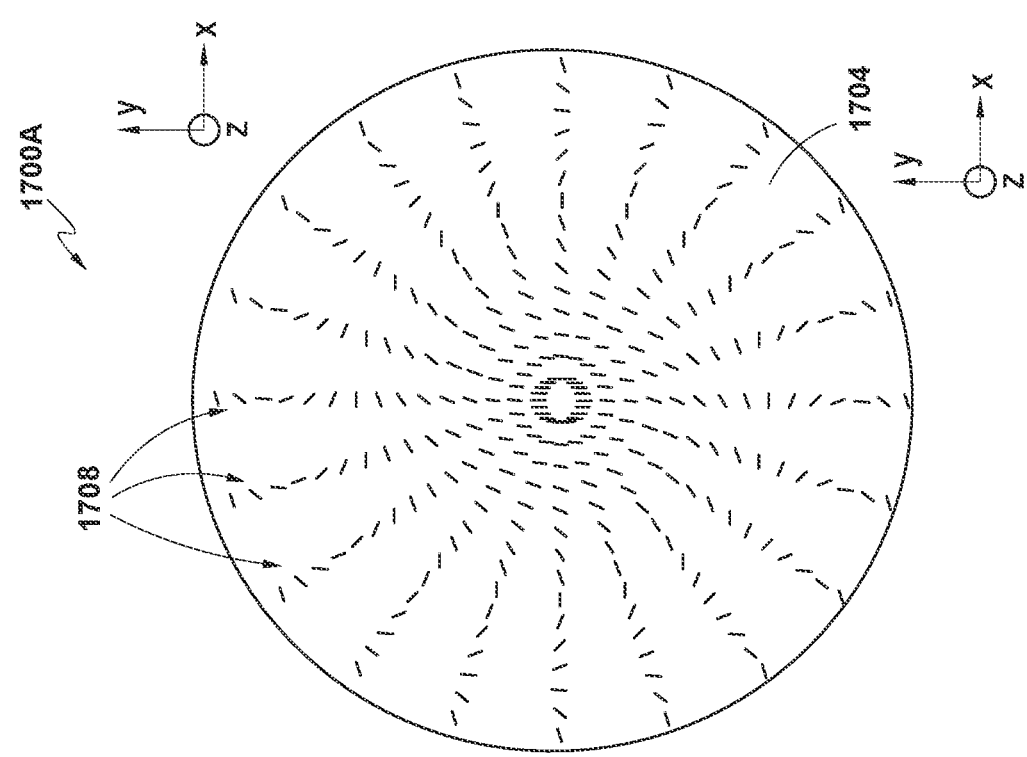
FIG. 17B illustrates another example of a waveplate lens comprising liquid crystals.

Example of liquid crystal-based waveplate lenses are illustrated with respect to FIGS. 17A and 17B.

FIGS. 17A and 17B illustrate examples of waveplate lenses 1700A and 1700B, respectively, each comprising a transparent substrate 1704, e.g., a glass substrate, having formed thereon liquid crystal molecules 1708 elongated along different elongation directions relative to a direction parallel to an axial direction (e.g., x-direction or y-direction) along a major surface of the substrate 1704. That is, the liquid crystal molecules 1708 are rotated about a direction (e.g., z-direction) normal to a major surface of the substrate 1704 by different angles ($\phi$) of rotation, where $\phi$ is described as the angle between the direction of elongation of the liquid crystal molecules relative to a direction parallel to the layer normal (e.g., x-direction or y-direction).

In the illustrated implementations, the liquid crystal molecules 1708 at a given radius from a central axis C have the same angle ($\phi$) of rotation. As arranged, the liquid crystal molecules 1708 are configured to focus a collimated beam of light to a point at a focal length. Without being bound to any theory, the angle ($\phi$) of rotation of liquid crystal molecules 1708 may be proportional to $+/-k_0 r^2/f$, $r^2$ where r is the radial distance from C and $k_0 = 2\pi/\lambda$, is the wavenumber of the light that is to be focused by the diffractive waveplate lens, l is the wavelength of the light, f is the focal length of the waveplate lenses 1700A, 1700B. The + and − sign can correspond to the direction of rotation of the liquid crystal molecules 1208 relative to the liquid crystal molecules 1708 nearest to the center C of the waveplate lenses 1700A, 1700B.

The patterns of liquid crystal molecules 1708 of waveplate lenses 1700A and 1700B represent flipped images of each other. That is, one of the waveplate lenses 1700A and 1700B may be obtained by rotating the other of the waveplate lenses 1700B and 1700B around an axial direction (e.g., x-direction or y-direction) by 180 degrees. As configured, focal lengths and optical powers of the waveplate lenses 1700A and 1700B are the same in magnitude but opposite in sign.

In some implementations, each of waveplate lenses 1700A and 1700B may serve as half waveplate lenses. When configured as a half-waveplate lens, each of the waveplate lenses 1700A and 1700B rotates the plane of a linearly polarized light by an angle 2a with respect to the polarization of an input beam, where a is the angle between the input polarization direction and the waveplate axis. For a circular polarized beam, this change in angle translates into a phase shift and reversal of the polarization handedness. Thus, a ±2α phase shift may be generated in a circularly polarized beam with the sign of the phase shift depending on the polarization handedness.

FIG. 17C illustrates examples of a waveplate lens that diverges or converges light passing therethrough depending on the polarization of light and the side on which the light is incident, according to some embodiments. When configured as a half-waveplate lens, the illustrated waveplate lens 1700A may be configured to diverge a right-hand circular polarized (RHCP) light beam 1712 incident on a first side into a left-hand circular polarized (LHCP) beam 1716. On the other hand, the waveplate lens 1700A may be configured to converge a RHCP light beam 1720 incident on a second side opposite to the first side into a left-hand circular polarized (LHCP) beam 1724.

For waveplate lens 1700B, the situation is reversed. As illustrated in FIG. 17D, when configured as a half-waveplate, the waveplate lens 1700B may be configured to converge a LHCP light beam 1728 incident on a first side into a RHCP beam 1732. On the other hand, the waveplate lens 1700B may be configured to diverge a LHCP light beam 1736 incident on a second side opposite the first side into a RHCP beam 1740.

Thus, by controlling the direction of angle of rotation and the radial distribution of the liquid crystals 1708, the waveplate lens may be configured to converge or diverge circularly polarized light having either handedness. Based on the relationship between the angles of rotation of the liquid crystals, the optical power may be increased or decreased. In addition, in some embodiments, the liquid crystals may be aligned and unaligned by applying an electric field. Thus, in the limit where the optical power is near zero, the waveplate lenses may be used as waveplates, e.g., switchable waveplates.

Figure 18A:
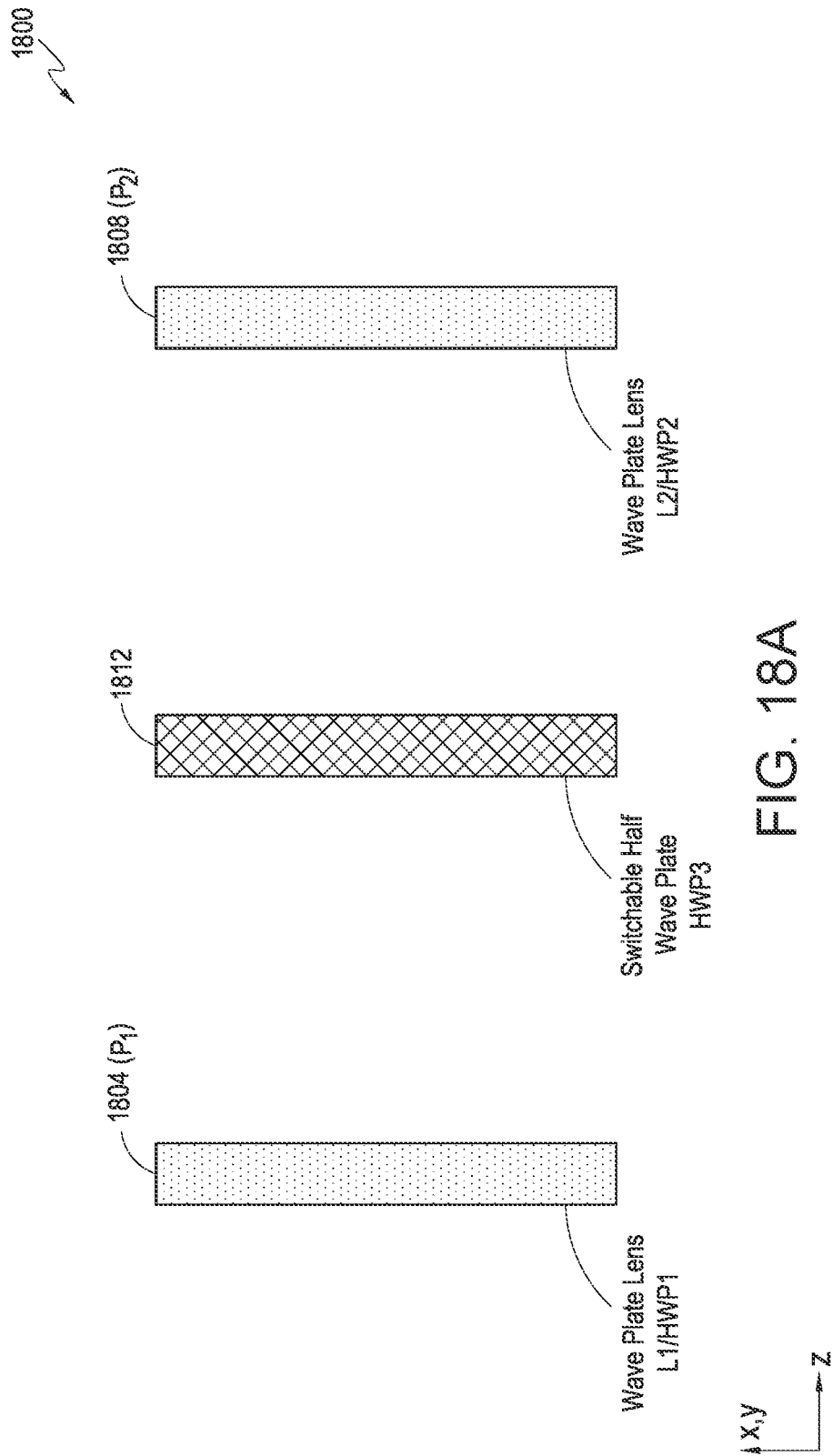
FIG. 18A illustrates an example of an adaptive lens assembly comprising waveplate lenses and a switchable waveplate.
Figure 18B:
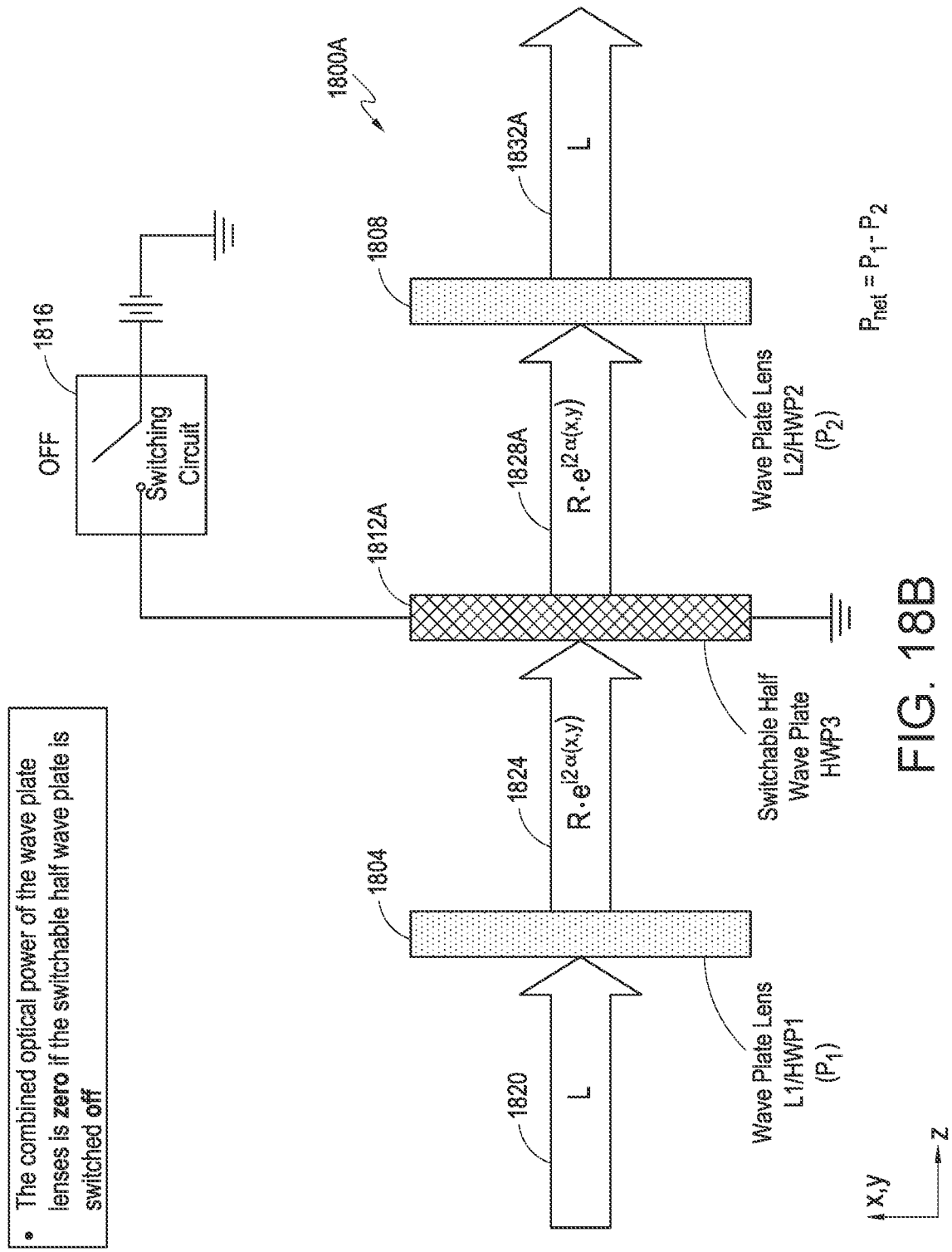
FIG. 18B illustrates an example of the adaptive lens assembly of FIG. 18A in operation with the switchable waveplate deactivated.
Figure 18C:
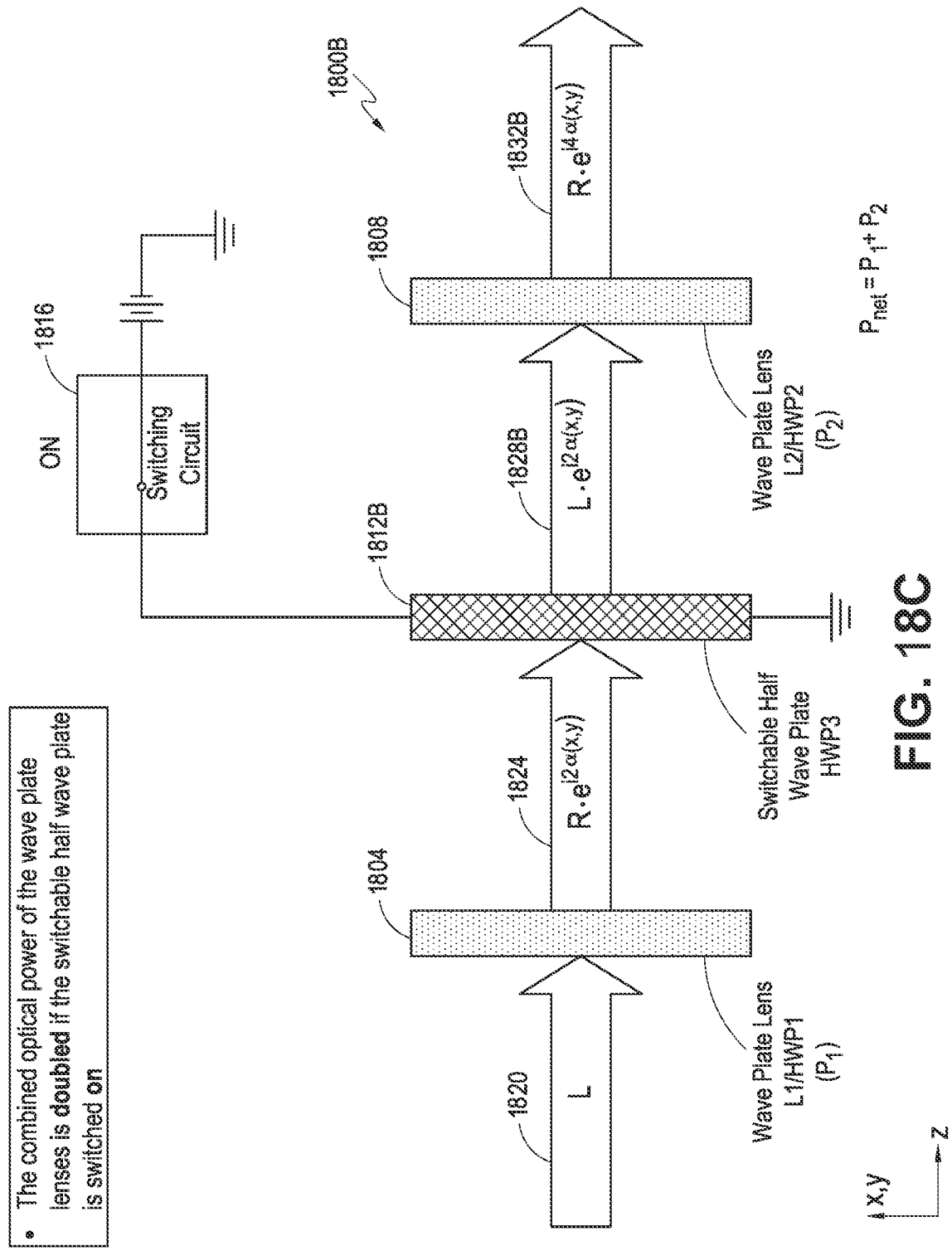
FIG. 18C illustrates an example of the adaptive lens assembly of FIG. 18A in operation with the switchable waveplate activated.
Figure 19:
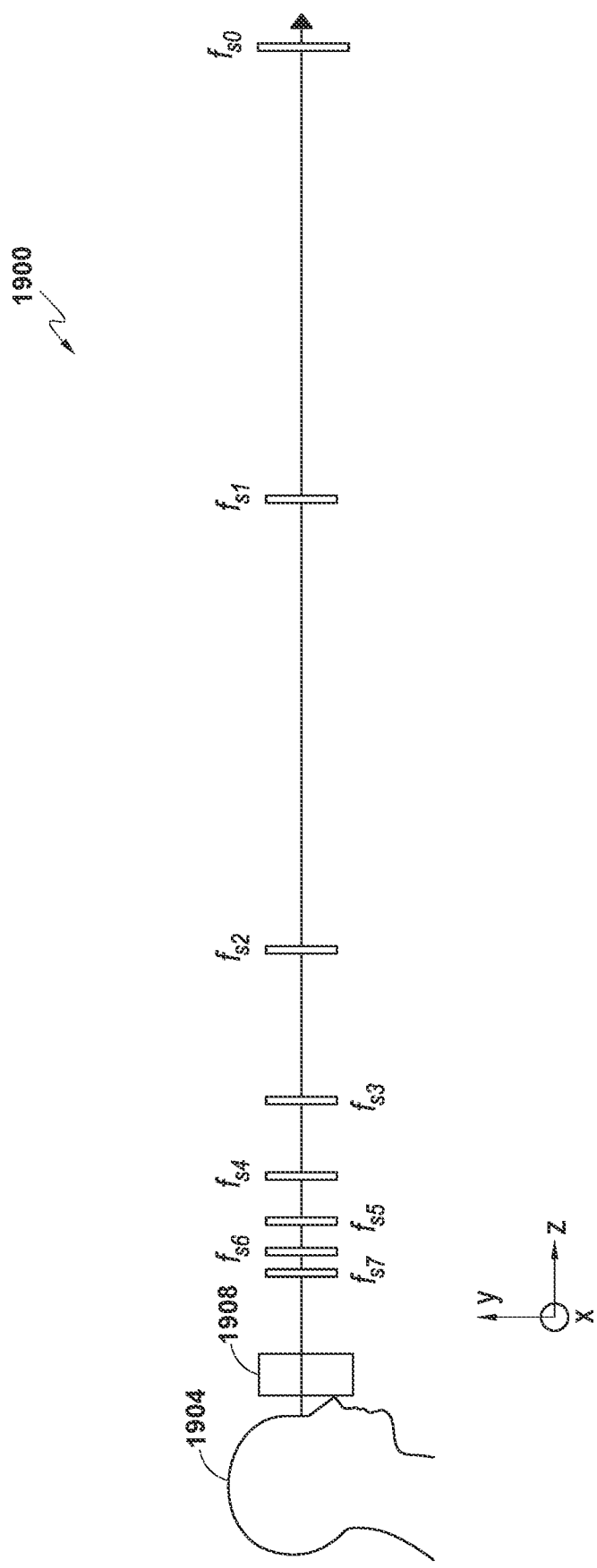
FIG. 19 illustrates an example of a plurality of virtual depth planes that may be generated using a display device.

FIG. 18A illustrates an example of an adaptive lens assembly comprising waveplate lenses and a switchable waveplate, according to some embodiments. FIG. 18B illustrates the switchable waveplate assembly 1800A in operation when the switchable waveplate of the adaptive lens assembly 1800 illustrated in FIG. 18A is deactivated, whereas FIG. 18C illustrates the switchable assembly 1800B in operation when the switchable waveplate of the adaptive lens assembly 1800 illustrated in FIG. 18A is activated. The adaptive lens assembly 1800 is configured to couple and to transmit therethrough the light from the transparent emissive display 1010 discussed herein. The adaptive lens assembly 1800 comprises a first waveplate lens (L1/HWP1) 1804, e.g., a first half-waveplate lens, a second waveplate lens (L2/HWP2) 1808, e.g., a second half-waveplate lens, and a switchable waveplate (HWP3) 1812, e.g., a switchable half waveplate.

In various embodiments, each of the L1/HWP1 1804 and L2/HWP2 1808 is configured to serve as a lens and a half waveplate. As described above with respect to FIGS. 17A and 17B, when configured as a half-waveplate, each of the L1/HWP1 1804 and L2/HWP2 1808 is configured to convert light having a circular polarization of first handedness (first HCP) to light having a circular polarization of second handedness (second HCP). That is, each of the L1/HWP1 1804 and L2/HWP2 1808 is configured to convert light passing therethrough from light having LHCP or RHCP, and to convert light having RHCP or LHCP, respectively.

In various embodiments, each of the L1/HWP1 1804 and L2/HWP2 1808 is configured to serve as a lens, for a given polarization, having a first lensing effect or a second lensing effect opposite the second lensing effect. That is, each of the L1/HWP1 1804 and L2/HWP2 1808 is configured to either converge or diverge light passing through. In various embodiments, each of the L1/HWP1 1804 and L2/HWP2 1808 may be configured to have opposite lensing effects depending on the polarization state of the incident light. For example, each of the L1/HWP1 1804 and L2/HWP2 1808 may be configured to focus light incident thereon having a first HCP while being configured to defocus light incident thereon having a second HCP.

In some embodiments, the L1/HWP1 1804 and L2/HWP2 1808 are configured to have the same lensing effect for light having a given HCP. That is, both of the L1/HWP1 1804 and L2/HWP2 1808 may be configured to focus light having LHCP, focus light having RHCP, defocus light having LHCP or defocus light having RHCP.

In some embodiments, each of the L1/HWP1 1804 and L2/HWP2 1808 may comprise liquid crystal molecules that are elongated and rotated such that liquid crystals at a given radius from a central axis of the respective waveplate lenses 1804, 1808 have the same angle (ϕ) of rotation, as described above with respect to FIGS. 17A and 17B. Each of the first and second waveplate lenses 1804, 1808 is configured to alter a polarization state, e.g., invert a polarization state, of light passing therethrough. The switchable waveplate 1812 is configured to alter a polarization state, e.g., invert a polarization state, of light passing therethrough when electrically activated, while being configured to substantially pass light without altering the polarization state of light passing therethrough when deactivated. The electrical signal, e.g., a current signal or a voltage signal, for switching the switchable waveplate 1812 may be provided by a switching circuit 1816 electrically connected thereto.

In various embodiments, when activated, e.g., electrically activated using a voltage or a current signal provided by the switching circuit 1816, the HWP3 1812B (FIG. 18C) serves as a half waveplate. That is, when activated, the HWP3 1812B (FIG. 18C) serves as a half waveplate configured to convert light passing therethrough from light having LHCP or RHCP to light having RHCP or LHCP, respectively. Thus, each of the L1/HWP1 1804, the L2/HWP2 1808, and the HWP3 1812B when activated (FIG. 18C) is configured to convert light having a circular polarization of first handedness (first HCP) to light having a circular polarization of second handedness (second HCP).

In various embodiments, when deactivated, e.g., electrically deactivated using a voltage or a current signal provided by the switching circuit 1816, e.g., by removing the voltage or the current signal, the HWP3 1812A (FIG. 18B) serves as transmitting medium for light without affecting the polarization or providing any lensing effect.

In some embodiments, a single waveplate lens 1804 and/or 1808 may function both as a waveplate lens and as a switchable half waveplate. In such embodiments, the dedicated switchable half waveplate 1812 may be omitted.

FIG. 18B illustrates an example of the adaptive lens assembly of FIG. 18A in operation with the switchable waveplate deactivated, according to some embodiments. The adaptive lens assembly 1800A may be deactivated when the switchable waveplate 1812 is deactivated, e.g., when no current or voltage is applied to the switchable waveplate 1812 by the switching circuit 1316. The adaptive lens assembly 1800A may correspond to a first adaptive lens assembly (on the world side) or a second adaptive lens assembly (on the user side). Each of the L1/HWP1 1804 and L2/HWP2 1808 may be configured to have a first lensing effect, e.g., diverging effect, on light having a first HCP, e.g., LHCP, passing therethrough. Each of the L1/HWP1 1304 and L2/HWP2 1308 may also be configured to have a second lensing effect opposite the first lensing effect, e.g., converging effect, on light having the opposite HCP, e.g., RHCP, passing therethrough.

By way of example only, the light beam 1820 having a first HCP, e.g., LHCP, travels, e.g., in a positive z-direction, until the beam 1820 impinges on the L1/HWP 1804, to be transmitted therethrough. The L1/HWP1 1804 converts the light beam 1820 having LHCP into a light beam 1824 having RHCP. Because the L1/HWP1 1804 is also configured as a lens, the L1/HWP1 1804 also diverges the light beam 1820 according to a first optical power P1 of the L1/HWP1 1804.

The light beam 1824 having RHCP is subsequently incident on the HWP3 1812A in the deactivated state. Because the HWP3 1812A is deactivated, the light beam 1824 having RHCP transmits through the HWP3 1812A without being substantially affected in terms of polarization or lensing effect, to be incident on the L2/HWP2 1808, as light beam 1828A having RHCP. When configured as an adaptive lens assembly on the user side, the L2/HWP2 1808 is configured similarly to L1/HWP1 1804 in the illustrated embodiment, i.e., to convert the polarization and to diverge light having LHCP while converging light having RHCP. Thus, the light beam 1828A having RHCP is converted back to light beam 1832 having LHCP. Thus, when HWP3 1812A is deactivated, the L1/HWP1 1804 and the L2/HWP2 1804 transmit light beams having opposite polarizations, such that the L1/HWP1 1304 and the L2/HWP2 1808 have opposite lensing effect on light passing therethrough. That is, because the light beam 1828A incident on the L2/HWP2 1804 has RHCP, the light beam 1832A exiting the L2/HWP2 1808 is converged according to a second optical power P2, unlike the light beam 1824 exiting the L1/HWP1 1804 that is diverged according to a first optical power P1. Thereafter, upon exiting the adaptive lens assembly 1800A in the deactivated state, the light beam 1832A may be viewed by the eye.

In some embodiments, when the HWP3 1812A is deactivated, the first optical power P1 of L1/HWP1 1804, which may be negative (i.e., diverging), and the second optical power P2 of L2/HWP2 1808, which may be positive (i.e., converging), may have substantially the same or matched magnitudes. In these embodiments, the net optical power Pnet of the adaptive lens assembly 1800A, which may be approximately P1+P2, may be substantially zero because of the compensation of the lensing effects of the L1/HWP1 1804 and the L2/HWP2 1808. However, embodiments are not so limited, and the first and second optical powers P1, P2 may have different magnitudes, such that the net optical power Pnet may have a nonzero value. For example, in some embodiments, the nonzero Pnet may be equal to an eyeglass prescription of the user, thereby allowing for corrections to focusing errors (e.g., refractive focusing errors) of the eyes of the user.

It will be appreciated that, while in the illustrated embodiment, the incident light beam 1820 has LHCP, a similar outcome would result when the incident light beam 1820 has RHCP. That is, when the light beam 1820 has RHCP, the light beams 1824 and 1828A have LHCP, and unlike the illustrated embodiment, the light beams 1824 and 1828A are converged relative to the light beam 1820. Likewise, the L2/HWP2 1808 diverges the light beam 1828A converged by the L1/HWP1 1804, such that the net optical power Pnet may be substantially zero.

The lensing effects of the L1/HWP1 1804 and L2/HWP2 1808 and the selectivity of the lensing effects to the polarization state of incident light beams described above with respect to FIG. 18B serves as but one example, and other configurations are possible. For example, while in FIG. 18B, the L1/HWP1 1804 and L2/HWP2 1808 is configured to diverge light having LHCP while converging light having RHCP, in other embodiments, the L1/HWP1 1804 and L2/HWP2 1808 may be configured to converge light having LHCP while diverging light having RHCP.

In summary, in some embodiments, when the HWP3 1812A of the adaptive lens assembly 1800A is in a deactivated state, the exiting light beam 1832A may have the same HCP as the incident light beam 1820, and may be substantially matched to the incident light beam 1820 in terms of the lens effect because of the compensation of the lens effects between P1 of L1/HWP1 1804 and P2 of L2/HWP2 1808. As a result, for example, when the user is not viewing virtual content, the view of the world is relatively unaffected by the presence of the adaptive lens assemblies.

FIG. 18C illustrates an example of the adaptive lens assembly of FIG. 18A in operation with the switchable waveplate activated, according to some embodiments. The adaptive lens assembly 1800B may be activated when the switchable waveplate 1812B is activated, e.g., when a current or a voltage is applied to the switchable waveplate 1812B by the switching circuit 1816. The adaptive lens assembly 1800B may, e.g., correspond to a first adaptive lens assembly (on the world side) or a second adaptive lens assembly (on the user side).

When configured as the second adaptive lens assembly on the user side, each of the L1/HWP1 1804 and L2/HWP2 1808 may be configured to diverge light having one of HCP, e.g., LHCP, passing therethrough. Each of the L1/HWP1 1804 and L2/HWP2 1808 may also be configured to converge light having the other HCP, e.g., RHCP, passing therethrough.

The light from the transparent emissive display 1010 may be incident on the switchable lens assembly 1800B as a circularly polarized light beam 1820 having LHCP. In some implementations, one or more polarizers and/or polarization control elements (e.g., one or more linear polarizers, retarders, or combinations thereof and/or circularly polarizers) may be included to provide a suitable polarization of light (e.g., circularly polarized light in some cases). For example, one or more polarizers or and/or polarization control elements (e.g., one or more linear polarizers, retarders, or combinations thereof and/or circularly polarizers) may be disposed with respect to the transparent emissive display 1010 to convert the light output from the transparent emissive display, which may, for example, be unpolarized, into a suitable polarization (e.g., circularly polarized light in some cases). Other polarizers and/or polarization control components and/or configurations thereof may be included and the locations may vary. The light beam 1820 travels, e.g., in a positive z-direction, until the light beam 1820 impinges on the L1/HWP 1804, to be transmitted therethrough. The L1/HWP1 1804 converts the light beam 1820 having LHCP into a light beam 1824 having RHCP. Because the L1/HWP1 1804 is configured to diverge light having LHCP, the light beam 1824 is also diverged according to the first optical power P1 of the L1/HWP1 1804.

The light beam 1824 having RHCP is subsequently incident on the HWP3 1812B in the activated state. Unlike the deactivated HWP 1812A illustrated above with respect to FIG. 18B, because the HWP3 1812B is activated, the light beam 1824 having RHCP transmitting through the HWP3 1812B is converted to light beam 1828B having LCHP. Subsequently, the light beam 1828B having LHCP is incident on the L2/HWP2 1808. Because, unlike the light beam 1828A illustrated above with respect to FIG. 18B, the light beam 1828B incident on the L2/HWP2 1808 has LHCP, the L2/HWP2 1808 further diverges the light beam 1828B according to a second optical power P2 into light beam 1832B having RHCP. That is, unlike the deactivated state of HWP 1812A illustrated with respect to FIG. 18B, because the HWP 1812B is activated, L1/HWP1 1804 and the L2/HWP1 1804 are configured to transmit light beams having the same polarization, LHCP. Thus, unlike the L1/HWP1 1804 and the L2/HWP2 1808 having the compensating effect illustrated with respect to FIG. 18B, the L1/HWP1 1804 and the L2/HWP2 1808 in FIG. 18C have additive lensing effect on the light passing therethrough. That is, because the light beam 1820 incident on L1/HWP1 and the light beam 1828B incident on L2/HWP2 1804 both have LHCP, light beam 1832B exiting the L2/HWP2 1808 will be further diverged, in addition to being diverged by the L1/HWP1 1804. Thereafter, upon exiting the adaptive lens assembly 1800B in the activated state, the light beam 1832A may be viewed by the eye.

In some embodiments, the first optical power P1 of L1/HWP1 1804 and the second optical power P2 of L2/HWP2 1808 may both be negative (i.e., diverging) and may have substantially the same or matched magnitudes. In these embodiments, the net optical power Pnet of the adaptive lens assembly 1800B, which may be approximately P1+P2, may be substantially double that of P1 or P2 because of the additive lens effect of the combination of L1/HWP1 1804 and L2/HWP2 1808. However, embodiments are not so limited, and the first and second optical powers P1, P2 may have different magnitudes.

While in the illustrated embodiment, the incident light beam 1820 has LHCP, parallel outcome will result when the incident light beam 1820 has RHCP. That is, when the light beam 1820 has RHCP, unlike the illustrated embodiment, the resulting light beam 1832B has LHCP and is converged by L1/HWP1 1804 and L2/HWP2 1808 according to a net optical power Pnet, which has a magnitude that is approximately a sum of the magnitudes of the first and second optical powers P1 and P2.

It will be appreciated that the lensing effects of the L1/HWP1 1804 and L2/HWP2 1808 and the dependence of the lensing effects on the polarization state of incident light beams described above with respect to FIG. 18C serves as but one example, and other configurations are possible. For example, while in FIG. 18B, the L1/HWP1 1804 and L2/HWP2 1808 are configured to diverge light having LHCP while converging light having RHCP, in other embodiments, the L1/HWP1 1804 and L2/HWP2 1808 may be oppositely configured to diverge light having LHCP while converging light having RHCP.

Consequently, in some embodiments, when the switchable half waveplate 1812B of the adaptive lens assembly 1800B is in an activated state, the exiting light beam 1832B has the opposite HCP relative to the incident light beam 1820, and may be diverged according to additive optical powers P1 of L1/HWP1 1804 and P2 of L2/HWP2 1808. As a result, when the user is viewing a virtual content, the virtual content is focused into the eye 210 according to a net optical power whose value is approximately Pnet=P1+P2.

In the above, the adaptive lens assembly in the activated state has been described when configured as the second adaptive lens assembly on the user side in the display device described supra. As described supra, however, activating the second adaptive lens assembly to display virtual content to the user's eye 210, without any compensating effect, may result in a defocusing or distortion of the view of the real world, which may be undesirable. Thus, it may be desirable to configure the first adaptive lens assembly on the world side to at least partially compensate or negate the lens effect of the second adaptive lens assembly when activated to display the virtual content.

Referring to FIG. 18C, when configured as the first adaptive lens assembly on the world side to negate the lens effect of the second adaptive lens assembly on the user side, components of the adaptive lens assembly 1800B may be configured such that, as light transmitted from the world 510 to the eye 210 traverses the first and second adaptive lens assemblies, each may be configured as described above with respect to the adaptive lens assembly 1800B described with respect to FIG. 18C. In operation, as described above, the polarization of the light transmitted from the world through the first adaptive lens assembly is converted from a first polarization state to a second polarization state, e.g., from RHCP to LHCP. Subsequently, the polarization of the light transmitted through the second adaptive lens assembly is converted back from the second polarization state to the first polarization state, e.g., from LHCP to RHCP. Furthermore, the light transmitted from the world through the first adaptive lens assembly undergoes a first lens effect, e.g., converging effect, according to a first net optical power Pnet1=P1+P2 having a first sign, e.g., positive sign. Subsequently, the light transmitted through the second adaptive lens assembly undergoes a second lens effect opposite to the first lens effect, e.g., diverging effect, according to a second net optical power Pnet2=P1'+P2' having a second sign, e.g., negative sign, because the light incident on the second adaptive lens assembly has an opposite polarization as the light incident on the first adaptive lens assembly. When Pnet1 and Pnet2 have substantially similar magnitudes, the overall lens effect, approximated by P=Pnet1+Pnet2 may be substantially zero. As a result, when the user is viewing virtual content by activating the second lens assembly, as well as viewing real objects in the surrounding world, the view of the world is relatively unaffected by the compensating effect of the first lens assembly. As discussed above, in some implementations, one or more polarizers and/or polarization control elements (e.g., one or more linear polarizers, retarders, or combinations thereof and/or circularly polarizers) may be included to provide a suitable polarization of light (e.g., circularly polarized light in some cases). For example, one or more polarizers and/or polarization control elements (e.g., one or more linear polarizers, retarders, or combinations thereof and/or circularly polarizers) may be disposed with respect to the world or environment in front of the user to convert the light therefrom, which may, for example, be unpolarized, into a suitable polarization (e.g., circularly polarized light in some cases). Other polarizers and/or polarization control components and/or configurations thereof may be included and the locations may vary.

In various embodiments, when activated, each of the first and second adaptive lens assemblies may provide, for example, a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters. Other values outside these ranges as well as other ranges are also possible.

Multiple lenses or lens assemblies, possibly multiple switchable lenses assemblies, may be employed to obtain a wide range of values of optical power. In some configurations a plurality of optical powers may be selectively provided by switching such as switching using electrical signals applied to optical elements such as lenses and/or waveplates or otherwise. FIG. 16 schematically illustrates an example of a default virtual depth of image fs0 and first to sixth virtual image depths fs1-fs6 that may be selected for a user 1604, by selecting one or more of substacks 1508-1, 1508-2, 1508-3 in the second adaptive lens assembly 1508 in the display device disclosed herein. In addition, a selected one of the substacks 1508-1, 1508-2, 1508-3 in the second adaptive lens assembly 1508 is paired with a corresponding substack one of the substacks 1504-1, 1504-2, 1504-3 in the first adaptive lens assembly 1504, such that undesirable defocusing or distortion of the views of the real world is reduced or minimized.

Other designs and configurations providing optical power are possible. For example, reflective optical elements such as reflective liquid crystal elements such as cholesteric liquid crystal optical elements may be employed.

As described herein, some display devices comprise an eyepiece configured to asymmetrically project light world-ward (e.g., away from the user's eye 4 toward the world) and then an optical structure (e.g., reflective waveplate lens or lenslet array 1410 of FIGS. 14-16 that reverses (e.g., by reflection or diffraction) the direction of the light back toward the user's eye 4.

Figure 20C:
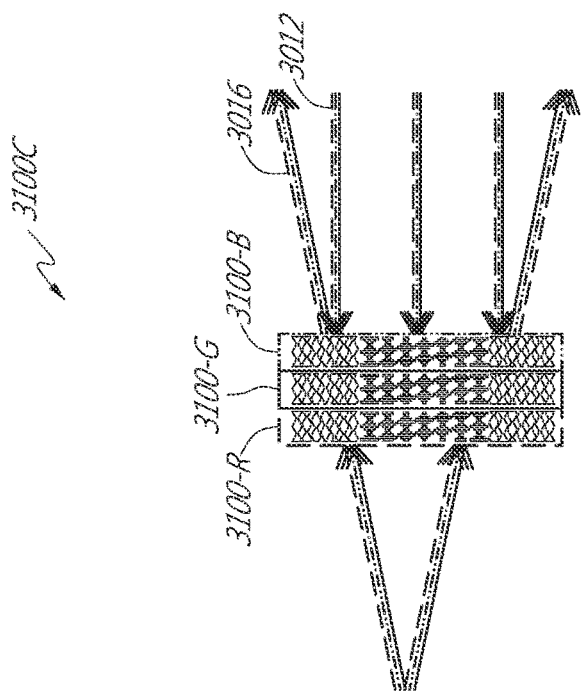
FIGS. 20A-20C illustrate example reflective diffraction lenses that can be implemented as part of a display device, where the reflective diffraction lenses are formed of patterned cholesteric liquid crystal (CLC) materials serving as a reflective polarizing mirror.
Figure 20B:
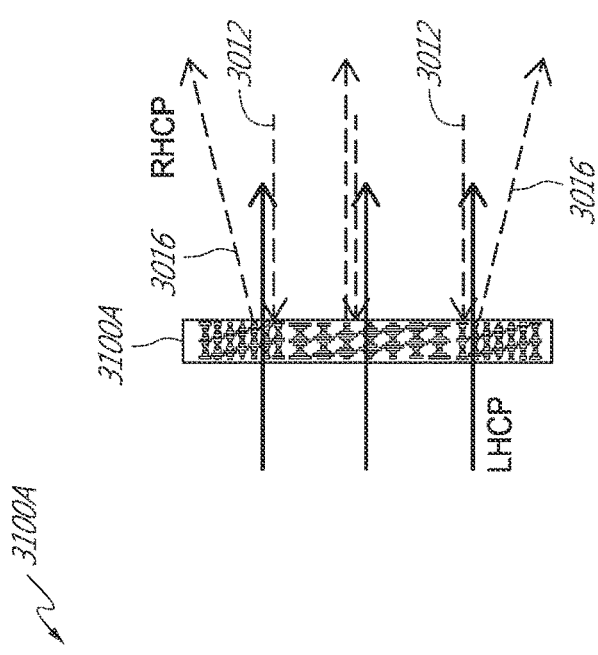
Figure 20A:
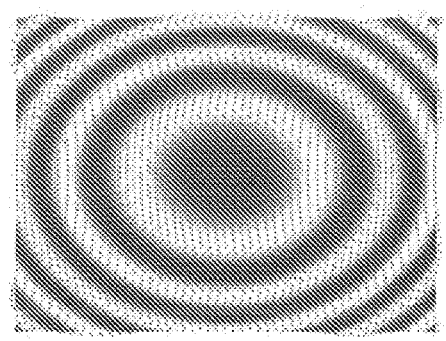

FIGS. 20A and 20B illustrate a reflective diffraction lens 3100A that can be implemented as part of a display device, where the reflective diffraction lens 3100A is formed of patterned CLC materials serving as a reflective polarizing mirror. FIG. 20A illustrates local orientations of liquid crystal directors (arrows) on top of a Fresnel pattern (e.g., binary Fresnel lens pattern). Accordingly, the CLC lens 3100A can be configured to have optical power (which may be adjustable such as by an applied electric field). Embodiments of the CLC lens 3100A can be used to provide reflectivity and optical power in the displays of FIG. 14-16.

Referring to FIG. 20B, when the lens 3100A is illuminated with circularly polarized incident light 3012 having a circular polarization that corresponds to (e.g., having the same handedness as) the handedness of the CLC chirality (e.g., RHCP), the reflected light 3016 exhibits lens effects similar to transmissive lenses. On the other hand, light with the orthogonal polarization (e.g., LHCP) is transmitted without interference. The lens 3100A can be configured to have a bandwidth in a range of less than about 10 nm, less than about 25 nm, less than about 50 nm, less than about 100 nm, or some other range.

FIG. 20C illustrates a reflective diffraction lens 3100C comprising a plurality of reflective diffraction lenses 3100-R, 3100-G and 3100-B. In the illustrated embodiment, the reflective diffraction lenses 3100-R, 3100-G and 3100-B are in a stacked configuration and are configured to reflect light within a range of wavelengths Δλ within the red, green and blue spectra, respectively. When the lens 3100C is illuminated with circularly polarized incident light 3012 having a circular polarization that corresponds to the handedness of the CLC chirality (e.g., RHCP) and a wavelength within a range of wavelengths Δλ within the red, green and blue spectra, the reflected light 3016 exhibits lens effects similar to transmissive lenses. On the other hand, light with the orthogonal polarization (e.g., LHCP) is transmitted without interference.

Figure 21B:
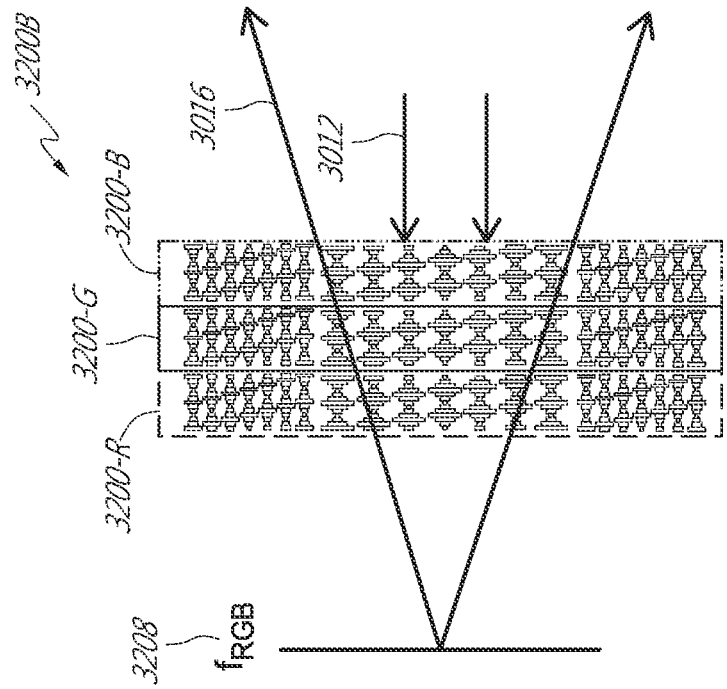
FIG. 21B illustrates an example reflective diffraction lens comprising a plurality of reflective diffraction lenses in a stacked configuration.
Figure 21A:
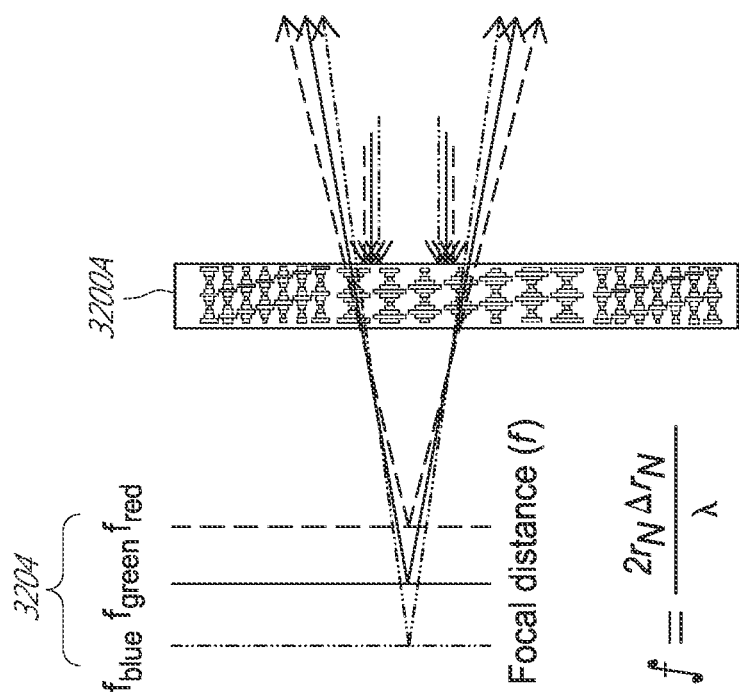
FIG. 21A illustrates an example of chromatic aberration observed in diffractive lenses.

Diffractive lenses (e.g., Fresnel-based/Fresnel lens) often suffer from severe chromatic aberration as the focal distances 3204 vary depending on the wavelength of light. This is illustrated in FIG. 21A with respect to a diffractive lens 3200A, which shows incident red, green, and blue light being focused at different distances from the lens 3200A.

With benefit of moderate bandwidth of CLC materials, a stack of lenses can be implemented to have substantially the same focal distance for different colors. FIG. 21B illustrates a reflective diffraction lens 3200B comprising a plurality of reflective diffraction lenses 3200-R, 3200-G and 3200-B in a stacked configuration similar to the reflective diffraction lens 3100C illustrated with respect to FIG. 20C. As shown in FIG. 21B, the three individual lenses 3200-R, 3200-G and 3200-B are designed to have substantially the same focal distance or optical power for red, green, and blue wavelengths, respectively. Since the bandwidth of CLC materials is in many implementations around 50 nm to 100 nm, cross-talk between the three wavelengths can be reduced or minimized. Although 3 CLC layers are shown, fewer or greater numbers of layers can be used corresponding to the colors of light incident on the lens 3200B.

Waveplate lens or lenslet arrays may be created by producing a plurality of such lenses (e.g., liquid crystal lenses), laterally spaced, for example, in an array such as a rectangular array. Transmissive waveplate lens or lenslet arrays may be created by producing a plurality of transmissive waveplate lenses laterally spaced, for example, in an array such as a rectangular array. Reflective waveplate lens or lenslet arrays may be created by producing a plurality of reflective waveplate lenses laterally spaced, for example, in an array such as a rectangular array. These lenses in a lens array may be smaller, in some implementations, than single lens implementations.

A wide range of variations are possible. For example, as illustrated, lenses such as single lenses 1018, 1016 or lens arrays 1030, 1020, 1014, 106 may be used. Reflectors with or without power may also be used. As illustrated, reflective lenslets 1410 may be used. In some implementations, a single lens 1018, 1016 or reflector (proximal and/or distal) may be used although lens or lenslet arrays or reflective lens or lenslet arrays may be employed. Liquid crystal lenses and/or reflectors may be included in the system. Waveplate lenses or lenslet arrays may be used. These waveplate lenses or lenslet arrays may be reflective or transmissive. Any combination is possible. Any of the elements may also be excluded from the system. For example, the lenslet array 1020, 1030, 1012, 1014 or single lens 1016, 1018 (proximal and/or distal) may be used without a varifocal lens (proximal or distal). Additionally, the order can vary. For example, the varifocal array(s) 1040, 1050 (proximal or distal) may possibly be closer to the transparent emissive array 1010 than the other single lenses 1016, 1018 or lenslet arrays 1020, 1030, 1012, 1014 (proximal or distal) in some implementations. A wide range of other variations are also possible.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display system comprising: a head-mountable display configured to project light to a viewer to display image information on one or more depth planes, the display comprising:
- a light-emitting panel configured to produce the light, wherein the light-emitting panel is further configured to allow light from objects in a surrounding environment to pass therethrough to the viewer;
- a first variable focus lens assembly between the light-emitting panel and a first eye of the viewer;
- a second variable focus lens assembly between the light-emitting panel and the surrounding environment; and
- at least one sensor configured to monitor one or more characteristics of the viewer; at least one processor communicatively coupled to the light-emitting panel and the at least one sensor, wherein the at least one processor is configured to:
  - receive output data from the at least one sensor indicating one or more characteristics of the viewer; and
  - adjust an optical power of the first and second variable focus lens assemblies based on the output data received from the at least one sensor,
- wherein the first and second variable focus lens assemblies comprise:
  - one or more waveplate lenses configured to provide a first optical power for light having a first polarization, and to provide a second optical power for light having a second polarization; and
  - one or more switchable waveplates in an optical path, wherein each of the one or more switchable waveplates is configured to selectively alter a polarization state of light passing therethrough, and
- wherein the first and second variable focus lens assemblies are configured to provide a respective optical power that is adjustable upon application of a respective electrical signal.

2. The display system of claim 1, wherein the at least one processor is configured to adjust the optical power of the first and second variable focus lens assemblies depending on a depth plane for displaying the image information.

3. The display system of claim 1 wherein the at least one processor is configured to adjust an optical power of the second variable focus lens assembly in response to an optical power of the first variable focus lens assembly.

4. The display system of claim 1, wherein one or more emitters in the light-emitting panel are configured to project divergent light to the viewer to display the image information.

5. The display system of claim 1, wherein the at least one sensor comprises at least one camera configured to monitor a positioning of the first eye of the viewer.

6. The display system of claim 1, wherein an optical power of the first and/or second variable focus lens assembly is adjusted in accordance with a prescription for correcting the viewer's vision at two or more distances.

7. The display system of claim 1, wherein the first and/or second variable focus lens assemblies comprises a layer of liquid crystal sandwiched between two substrates.

8. The display system of claim 7, wherein the first and/or second variable focus lens assemblies comprise electrodes for altering a refractive index of the liquid crystal layer upon application of a voltage.

9. The display system of claim 7, wherein the substrates comprise glass.

10. The display system of claim 1, wherein the at least one processor is further configured to vary the refractive index of the first and/or second variable focus lens assembly by application of an electrical current or voltage.

11. The display system of claim 1, wherein the light-emitting panel comprises an organic light-emitting diode (OLED) film.

12. The display system of claim 11, wherein the display further comprises an array of lenses optically coupled to the OLED film.

13. The display system of claim 12, wherein the lens array is positioned between the OLED film and the first variable focus lens assembly.

14. The display system of claim 13, wherein the lens array comprises an array of microlenses.

15. The display system of claim 13, wherein the lens array comprises an array of waveplate lenses.

16. The display system of claim 13, wherein the lens array comprises an array of wavelength-selective lenses.

17. The display system of claim 13, wherein the display further comprises another array of lenses positioned between the OLED film and the second variable focus lens assembly, wherein the two lens arrays have optical powers with opposite signs.

18. The display system of claim 12, wherein the lens array is positioned between the OLED film and the second variable focus lens assembly.

19. The display system of claim 13, wherein the lens array comprises an array of cholesteric liquid crystal reflective waveplate lenses.

20. The display system of claim 13, wherein the display further comprises a quarter waveplate positioned between the OLED film and the array of cholesteric liquid crystal reflective waveplate lenses.

21. The display system of claim 12, wherein each lens in the lens array is optically coupled to a respective set of pixels of the OLED film.

22. The display system of claim 21, wherein the at least one processor is configured to control two or more sets of pixels of the OLED film optically coupled to two or more respective lenses in the lens array according to a same illumination pattern.

23. The display system of claim 21, wherein each set of pixels of the OLED film is configured to display image information from a different perspective.

24. The display system of claim 1, wherein the display further comprises one or more layers of liquid crystal positioned between the light-emitting panel and the first variable focus lens assembly, wherein the at least one processor is configured to apply an electrical current or voltage to pixels of the one or more layers of liquid crystal to selectively occlude portions of incident light.

25. The display system of claim 24, wherein the at least one processor is configured to apply pulses of electrical current or voltage to pixels of the one or more layers of liquid crystal at a particular modulation frequency.

26. The display system of claim 25, wherein the particular modulation frequency is at least 60 Hz.

27. The display system of claim 1, wherein the at least one processor is configured to cause the first and second variable focus lens assemblies to synchronously switch between different states in a manner such that the first and second variable focus lens assemblies impart a substantially constant net optical power to ambient light from the surrounding environment passing therethrough.

* * * * *